United States Patent
Dudley et al.

(10) Patent No.: US 12,083,744 B2
(45) Date of Patent: Sep. 10, 2024

(54) SECURITY FEATURES AND ANTI-COUNTERFEITING AND PART TRACKING SYSTEM FOR 3D PRINTED PARTS

(71) Applicant: Orange Maker LLC, Westlake Village, CA (US)

(72) Inventors: Kurt Dudley, Westlake Village, CA (US); Shawn Mengel, Douglassville, PA (US)

(73) Assignee: Orange Maker, LLC, Glenside, PA (US)

( * ) Notice: Subject to any disclaimer, the term of this patent is extended or adjusted under 35 U.S.C. 154(b) by 880 days.

(21) Appl. No.: 16/937,564

(22) Filed: Jul. 23, 2020

(65) Prior Publication Data

US 2020/0353684 A1 Nov. 12, 2020

Related U.S. Application Data

(60) Continuation-in-part of application No. 15/877,314, filed on Jan. 22, 2018, now Pat. No. 11,141,908,
(Continued)

(51) Int. Cl.
*B29C 64/124* (2017.01)
*B29C 64/135* (2017.01)
(Continued)

(52) U.S. Cl.
CPC .......... *B29C 64/241* (2017.08); *B29C 64/124* (2017.08); *B29C 64/135* (2017.08);
(Continued)

(58) Field of Classification Search
CPC ... B29C 64/124; B29C 64/135; B29C 64/241; B29C 64/10; B29C 64/264;
(Continued)

(56) References Cited

U.S. PATENT DOCUMENTS

| 5,247,180 A | 9/1993 | Mitcham et al. |
| 5,360,329 A * | 11/1994 | Lemelson ........... B29C 37/0032 |
| | | 264/328.14 |

(Continued)

FOREIGN PATENT DOCUMENTS

| EP | 3385013 A1 | 10/2018 |
| WO | WO2006/055239 A2 | 5/2006 |
| WO | WO2014/165265 A1 | 10/2014 |

OTHER PUBLICATIONS

International Search Opinion and Written Opinion, Application No. PCT/US2020/043625 mailed Nov. 6, 2020.
(Continued)

*Primary Examiner* — Monica A Huson
*Assistant Examiner* — Kelsey C Grace

(57) ABSTRACT

Set forth are methods for preparing encoded three-dimensional objects. Magnetic particles or particles containing compounds that emit identifiable spectra, or combinations of multiple different magnetic and/or spectral emitting particles are embedded in the 3D object during formation. The particles can be added into the build material before construction, injected in a controlled manner into the 3D object during formation or added to the surface of the object during or after formation. The embedded material allows information regarding when and how the product was manufactured and the materials used to produce the product.

29 Claims, 29 Drawing Sheets

Related U.S. Application Data which is a continuation-in-part of application No. 15/088,365, filed on Apr. 1, 2016, now Pat. No. 9,937,665, which is a division of application No. 14/207,353, filed on Mar. 12, 2014, now Pat. No. 9,321,215.

(60) Provisional application No. 62/877,700, filed on Jul. 23, 2019, provisional application No. 61/778,285, filed on Mar. 12, 2013.

(51) Int. Cl.
  *B29C 64/153*  (2017.01)
  *B29C 64/241*  (2017.01)
  *B29C 64/245*  (2017.01)
  *B29C 64/264*  (2017.01)
  *B33Y 10/00*  (2015.01)
  *B33Y 30/00*  (2015.01)

(52) U.S. Cl.
  CPC .......... *B29C 64/153* (2017.08); *B29C 64/245* (2017.08); *B29C 64/264* (2017.08); *B33Y 10/00* (2014.12); *B33Y 30/00* (2014.12); *B29K 2909/08* (2013.01)

(58) Field of Classification Search
  CPC ..... B29C 64/153; B29C 64/245; B33Y 30/00; B33Y 80/00; B33Y 10/00; B33Y 70/00; B29K 2909/08
  See application file for complete search history.

(56) References Cited

U.S. PATENT DOCUMENTS

| | | |
|---|---|---|
| 6,429,443 B1 | 8/2002 | Mankos et al. |
| 6,482,576 B1 | 11/2002 | Farnworth et al. |
| 2004/0046860 A1 | 3/2004 | Beier et al. |
| 2006/0104328 A1 | 5/2006 | Crews |
| 2012/0028834 A1* | 2/2012 | Kwon .................... B82Y 25/00 |
| | | 977/773 |
| 2013/0287933 A1 | 10/2013 | Kaiser et al. |
| 2015/0102531 A1 | 4/2015 | El-Siblani et al. |
| 2016/0375676 A1 | 12/2016 | Ritchie et al. |
| 2017/0014910 A1 | 1/2017 | Ng et al. |
| 2018/0292331 A1 | 10/2018 | Gold et al. |

OTHER PUBLICATIONS

Search Report and Written Opinion of International Application No. PCT/US2018/014750, issued May 4, 2018.

* cited by examiner

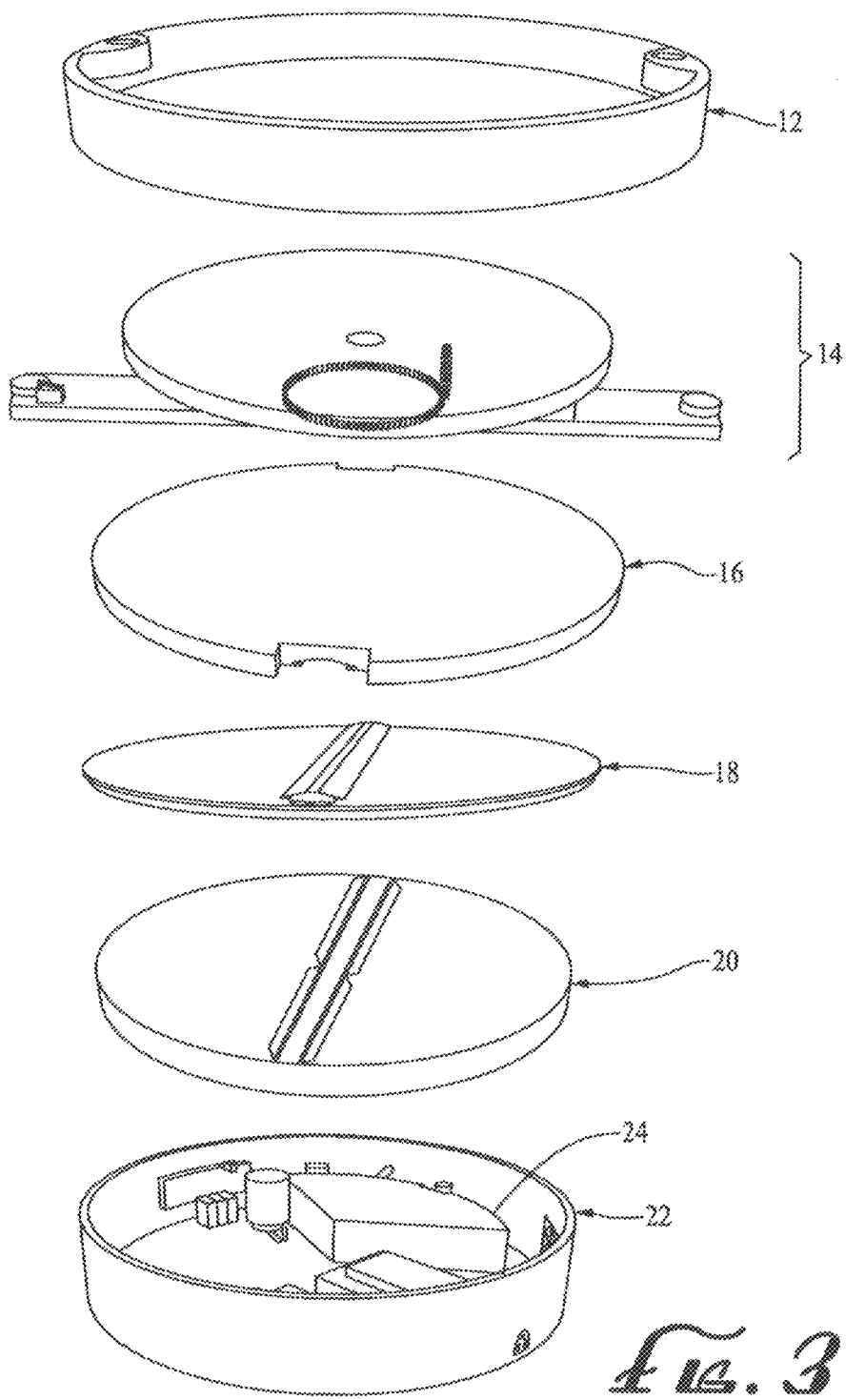

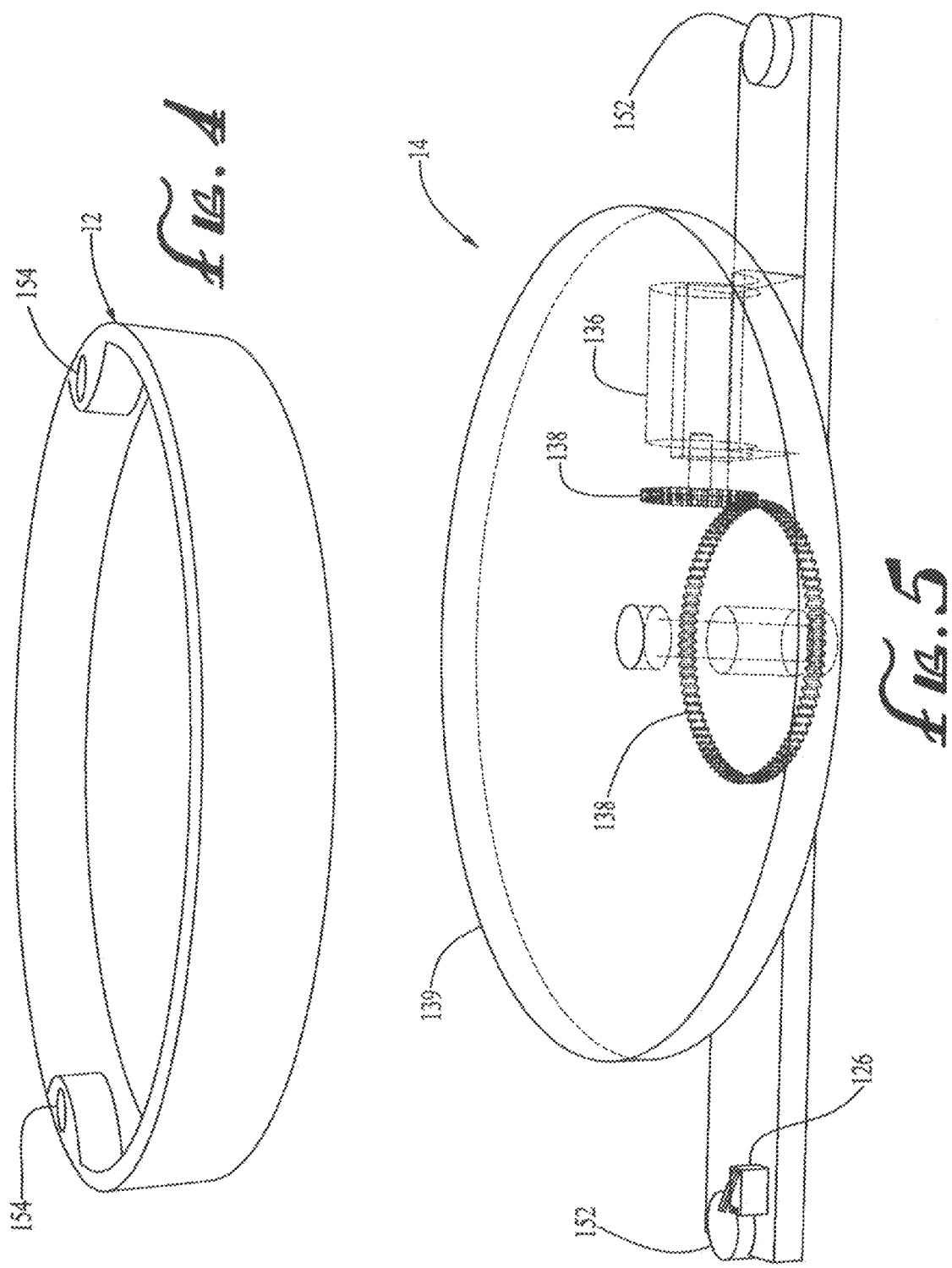

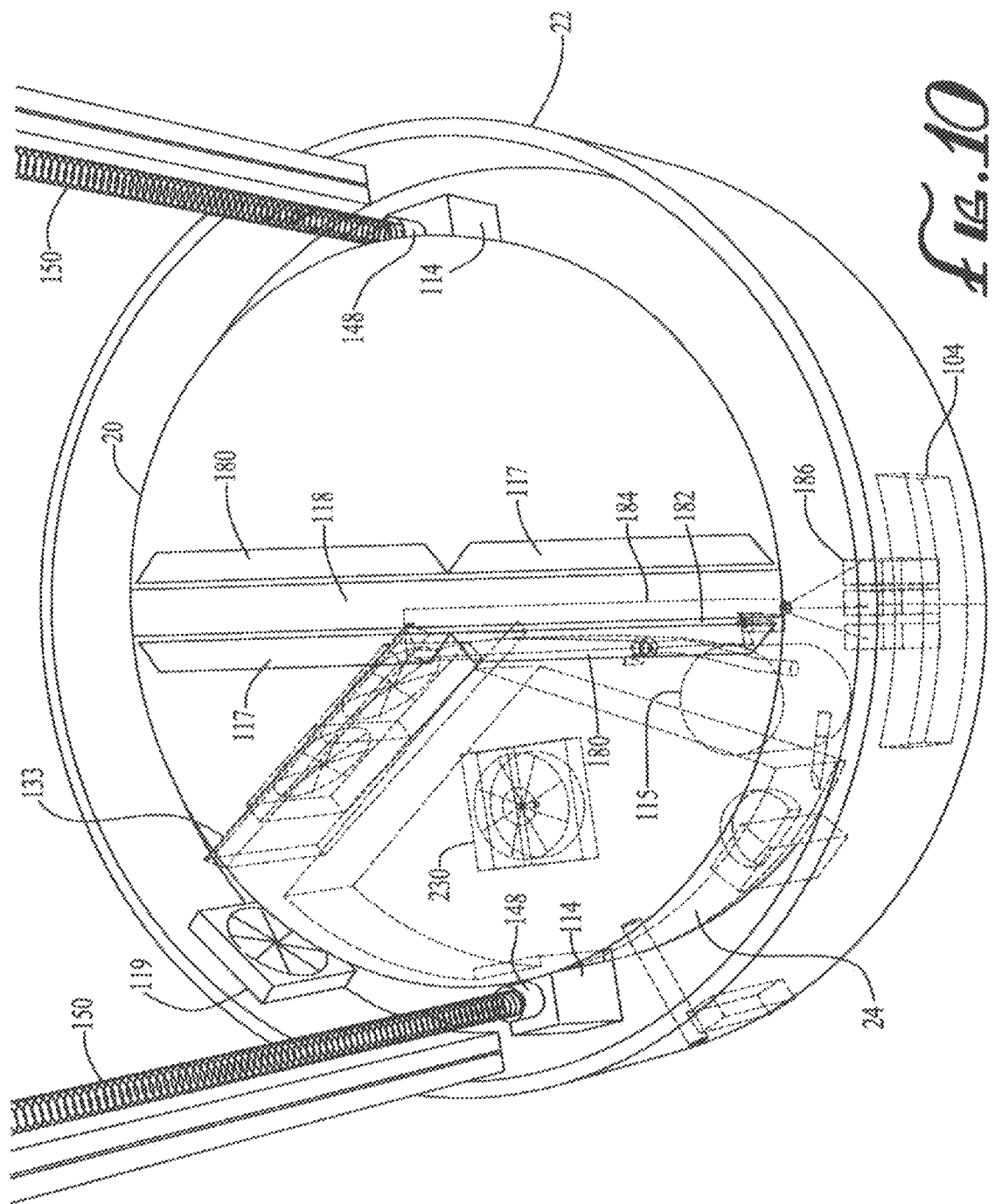

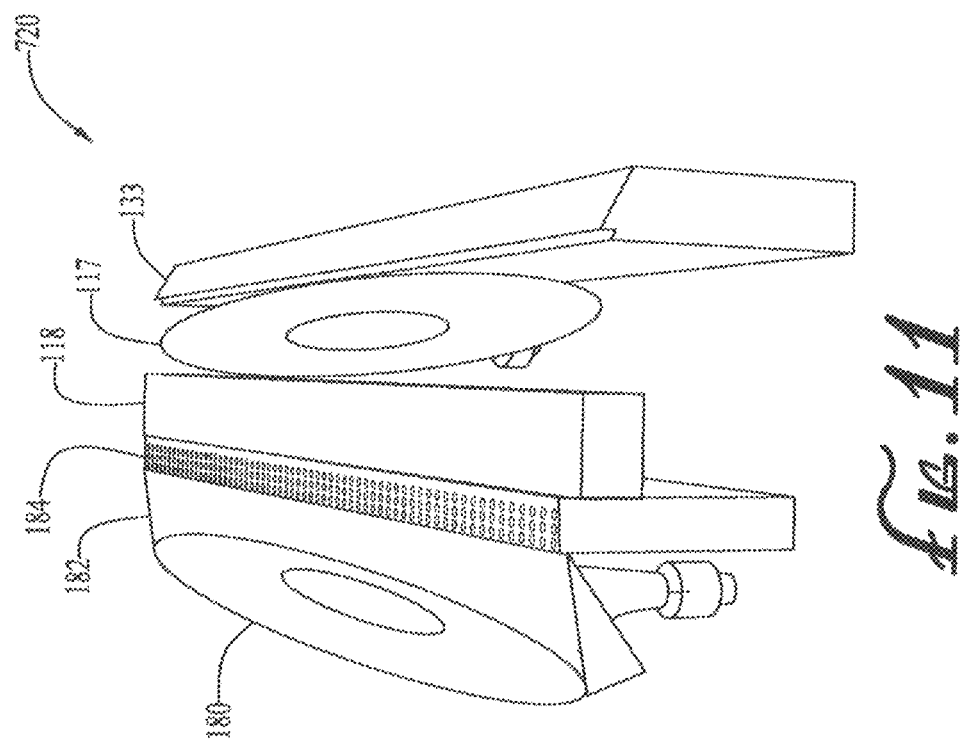

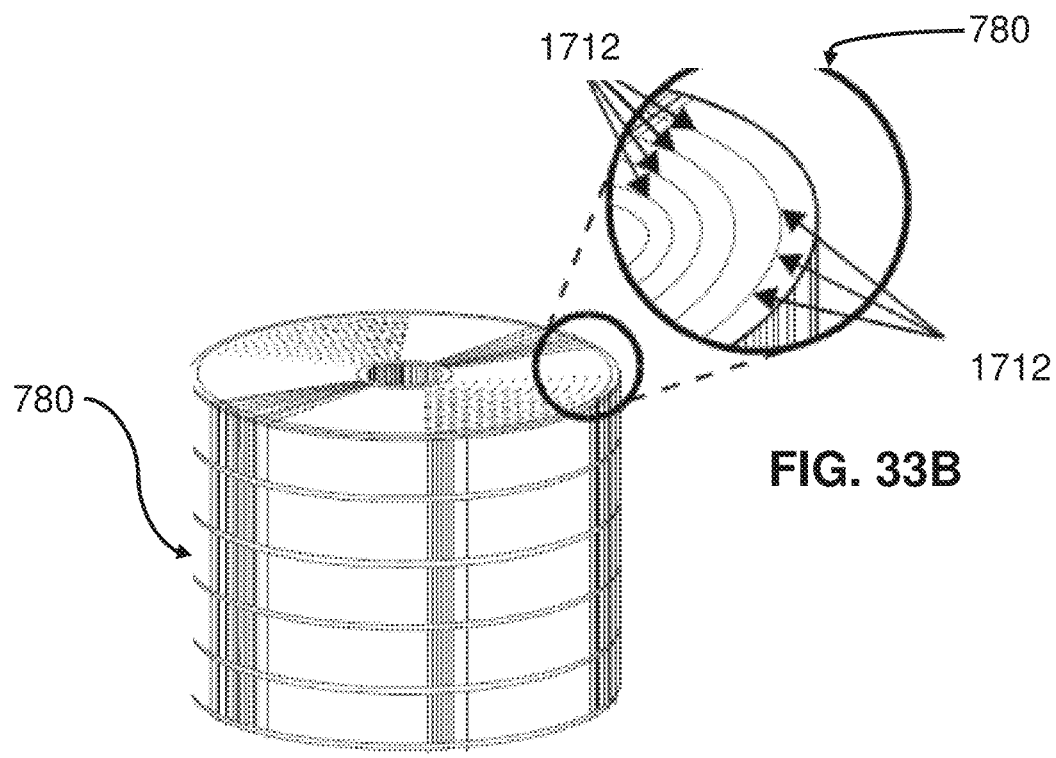
FIG. 33B
FIG. 33A
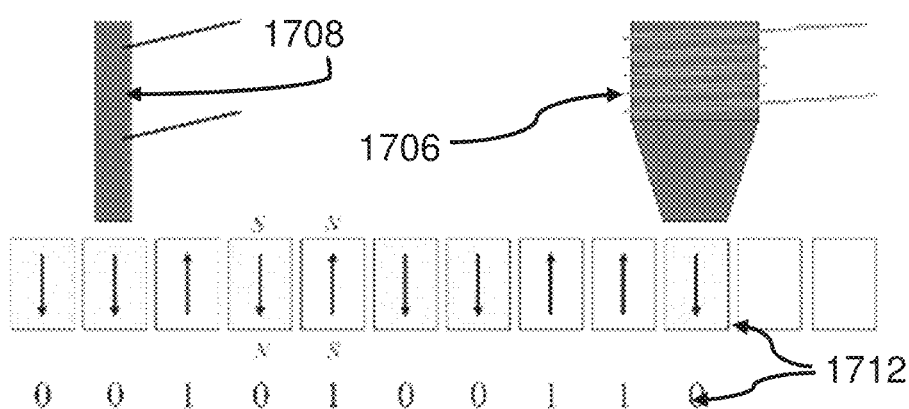
FIG. 34

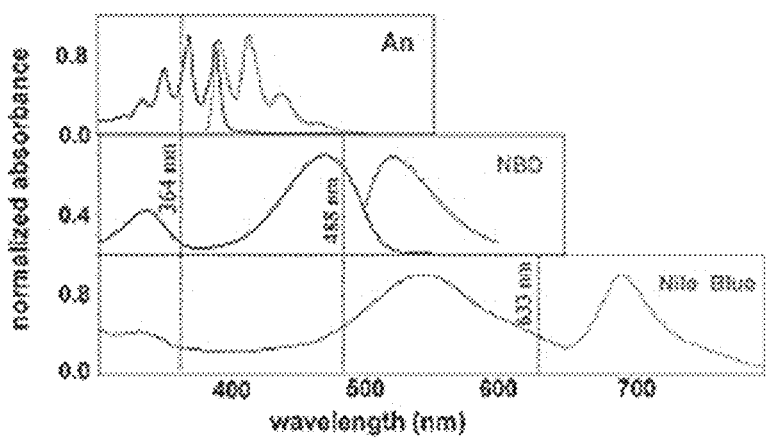
FIG. 35A
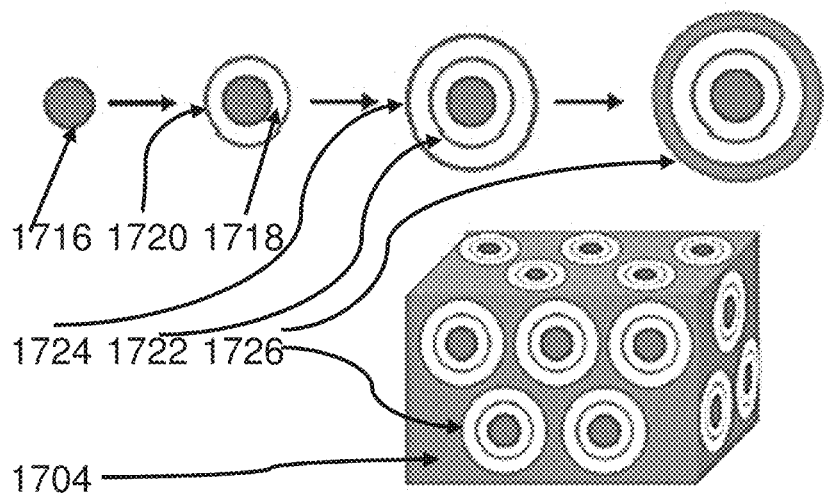
FIG. 35B
FIG. 35C

SECURITY FEATURES AND ANTI-COUNTERFEITING AND PART TRACKING SYSTEM FOR 3D PRINTED PARTS

CROSS REFERENCE TO RELATED APPLICATIONS

This application claims priority from U.S. Provisional Application Ser. No. 62/877,700 filed Jul. 23, 2019. This application is also a continuation-in-part of U.S. Ser. No. 15/877,314 filed Jan. 22, 2018, which is a continuation-in-part of Ser. No. 15/088,365, filed Apr. 1, 2016, now U.S. Pat. No. 9,937,665 which is a divisional of U.S. patent application Ser. No. 14/207,353, filed Mar. 12, 2014, now U.S. Pat. No. 9,321,215, which claims the benefit of U.S. Provisional Application Ser. No. 61/778,285, filed on Mar. 12, 2013. Each of these applications are hereby incorporated herein in their entirety by reference.

BACKGROUND

Described herein are methods, procedures and devices for forming three-dimensional (3D) objects from a wide variety of media, such as a polymeric, biological or metallic material. The methods, procedures and devices are programmed to produce desired three-dimensional (3D) structures using polymerization, crosslinking, curing, sintering, melting or solidification and other techniques available in the art to convert disbursed, flowable materials into solid three-dimensional structures of predetermined shapes. Equipment, components, systems, methods and techniques described herein constitute improvements over conventional stereolithographic, photocurable, or other 3D object forming techniques.

The embodiments, methods and materials described herein further provide techniques suitable for rendering 3D objects produced through the devices described herein, as well as other additive manufacturing processes, identifiable and trackable by encoding the 3D objects produced with imbedded markers without negatively affecting the printing process, the structural integrity of the 3D objects produced or the cosmetic appearance of the objects produced. The methods, techniques and materials further allow for the information to be encoded on multiple levels allowing for rich information density to be encoded, the encoded information being capable of being read in multiple different ways and retrieved even if portions of the 3D object are missing or damaged.

For example, with reference to a particular embodiment, the build platform 16,18 can be rotated, spreading liquid photo-active material resin over a solidification area, depositing and evenly spreading the photopolymer to a desired layer thickness. In some embodiments, the preferred photopolymer thickness is between 0.001 and 0.1 mm in thickness. A secondary material dispenser can be used to infuse the dispensed photopolymer material with additional additives, pigments, dyes, coloring agents, etc. as more fully described herein into the primary photopolymer prior to curing. In an alternative embodiment, the secondary material can be a material reactive with the first material to effect solidification. It is understood that while some of the embodiments described herein set forth a rotatable build platform 16,18 and stationary material dispensers and solidification areas, the reverse configuration, as well as various combinations of fixed and moveable components are also contemplated within the scope of this application. For example material dispensers and solidification areas rotating under a stationary build platform 16,18 is an alternative embodiment. Alternatively, the material dispenser, solidification and build platform 16,18 can be simultaneously or alternatively moved in a programmed manner.

FIG. 27 and FIG. 28 show an alternative means to feed build material 1704 to the build and curing portion of a 3D printing system. Such an arrangement can be used for the delivery and curing of build materials 1704 or simultaneously or substantially simultaneously delivering multiple different build materials 1704, or the same build material 1704 containing, different coloring agents, additives, or particles, such as metal, magnetic, or x-ray detectable particles or encoded materials identifiable by various spectra detection techniques, so as to provide a 3D object comprising a combination of materials, agents or inclusions for monitoring or identification purposes In recent years, 3D printing has been demonstrated to be an effective technique for accurately forming 3D objects, such as for the purpose of prototyping and manufacture. In its most general sense, 3D printing typically utilizes a 3D scanner and/or computer software to generate an image map of a desired object. That image map is then translated into a grid-like structure such that a fabrication device can deposit a flowable material, such as a plastic, polymer, biomaterial or resin, via an additive process, which is simultaneously solidified creating a 3D object. Various existing 3D printing methodologies which provide unique advantages and also each have their own disadvantages.

One such methodology is stereolithography, credited as being developed by Charles W. Hull and set forth, for example, in U.S. Pat. No. 4,575,330. Stereolithography aims to create three-dimensional objects based on the successive linear formation of layers of a fluid-like medium adjacent to previously formed layers of medium and the selective solidification of those layers according to cross-sectional data representing successive slices of the desired three-dimensional object in order to form solid layers. Stereolithography technology uses a liquid medium that is typically a melted thermoplastic or a photopolymer which is selectively solidified. The thermoplastic solidifies by exposure to a lower temperature; the photopolymer is solidified by exposing it to radiation usually in the UV or visible wavelengths causing the polymer to crosslink or cure. Typical methods for directing this radiation onto photocurable materials include motor-controlled scanning mirrors, mask systems or lasers wherein the smallest physical resolution is the size of the laser beam or, within the mask, the size of a pixel.

Stereolithography-based machines solidifying photopolymer-based resins typically utilize a singular, focused laser point which is scanned in the X-Y plane using a physical gantry system or is otherwise directed by electromechanically-driven highly reflective surfaces such as galvanometers or rotating polygon mirrors. Because of this, print speed is inversely proportional to both layer density and layer volume.

A method of using the "singular point" type of stereolithography to solidify photopolymers includes utilizing a laser and controllable mirror configuration is described in U.S. Pat. No. 4,575,330 to Hull. The process utilizes incrementally submerging a build-platform in a vat of photocurable material, wherein a layer of material that covers the build platform 16,18 is solidified via targeted radiation from a laser using two controllable mirrors which direct the radiation in a x/y plane along the surface of the material. Areas are selectively solidified corresponding to cross-sectional data represented in a cross-sectional bitmap image of a slice of a virtual three-dimensional model representing an object. Lines are traced over the liquid surface to solidify the photocurable material. The process is repeated multiple times by lowering the build platform 16,18 into the vat of material by an amount correlating to the next desired layer height. After new material is deposited over the construction area, the process of solidification repeats to form the individual stacked layers to form a three-dimensional object.

Another method, which utilizes a "plane exposure" type stereolithography, is the use of a Digital Micromirror Device (DMD)-based variation on the stereolithography process. These variations provide significant improvements in print speed and create a constant build time independent of layer density for a given layer volume, because DMD arrays can expose and direct entire planes of focused light at once rather than a singular point which must be scanned to create a layer. A typical 720×480 DMD array can expose 345,600 individual "pockets" of solidified resin, also known as voxels, all at once in a single layer exposure. Typical layer exposure times can range from 0.2-10+ seconds, depending on a variety of factors. DMD-based processes can work very well for small print sizes, but once a critical layer area is surpassed, the suction force generated by layer-peeling mechanism will inhibit buildup of the 3D object.

There are several limitations to the above processes. For example, resolution is proportional to the focusable point size of the laser; if it is desired to increase the resolution, a smaller point size must be used. This has the consequence of increasing the total amount of lines to be traced in a given area, resulting in longer construction times. Additionally, the process of submerging a platform in a vat of material is both limiting to the functional size of the object that can be created and also requires exposure of large volumes of photocurable materials to construct the 3D object.

Furthermore, the above method of subjecting a fluid surface to radiation poses its own set of issues with regards to consistent layer heights and errors that can be caused from disturbances to the liquid surface. These disturbances can result from both internal and external sources of vibration. The layer height, and therefore the vertical resolution of the object, is also dependent on the viscosity and surface tension of the material used. This limits the vertical resolution that is attainable with a given range of materials.

Recently, an inverted sterolithographic process has been developed that introduces the additional factor of surface adhesion resulting from a newly solidified layer adhering to the bottom of a vat. This adhesion force increases as a function of the size of the solidified layer. However, before the construction process can resume, the adhesion force must be removed and the build platform 16,18 raised to allow new material to be placed prior to the solidification of the next additional layers of material, for example, via use of prying, tilting, peeling and sliding.

These processes for removal of the adhesion force place the vat, the build platform 16, 18, the raising element for the build platform 16,18 and the newly solidified geometries of the printed object under high stress loads that can decrease the functional life of the machine and its components, as well as causing deformations and delamination of the object being constructed. A method to reduce this surface adhesion in large area solidification is described in European patent application EP 2419258 A2, where a single layer is broken into sub component images that are solidified and separated individually. This method, however, doubles the construction time and increases the chance for product failure due to delamination caused by increasing the amount of unsupported areas to be solidified.

Common areas where all rapid manufacturing systems can be improved upon comprise increasing resolution, enhancing scalability of constructible parts, increasing the ability to construct difficult geometries, such as hollow cavities and overhangs, and increasing the ability to construct and preserve small and fragile geometries, such as those having little surrounding support. Time to construct individual layers and total construction time are other important factors relating to the efficiency of the construction process of every system each of which has to its own set of unique limiting factors that dictate how long it will take to construct of a given object. Efficient methods and devices that address these conventional inefficiencies while utilizing a single compact device is therefore needed. Additionally, conventional light sources utilized in 3D printers have their own limitations and improved light sources allowing for faster cure times is also desirable.

SUMMARY

Described herein are methods, devices and systems for efficient 3D printing that address inefficiencies and deficiencies of currently existing 3D printing systems utilizing a single device. For ease of explanation and to provide an efficient nomenclature, the formation of 3D structures using the new techniques, procedures and devices set forth and incorporating features of the present invention are referred to as heliolithography. Heliolithography provides solutions to the above-mentioned inherent problems associated with traditional prototyping techniques. It allows 3-dimensional solid physical products to be made directly from computer-driven data and reproduced with very high and accurate levels of detail, in a short time using a completely automated process. Certain aspects of Heliolithography are similar to stereolithography. Both Heliolithography-based and stereolithography-based processes can utilize a variety of materials as their base material, and these materials are solidified into physical parts through various solidification techniques, such as a free radical polymerization of photopolymers upon exposure to a precisely directed and focused actinic photon source of sufficient energy density. However, there are several key differences between heliolithography and stereolithography-based printing processes.

Heliolithography utilizes the best of "singular point" and "plane exposure" concepts discussed above to continuously solidify the building material, such as a photopolymer material, in thin lines by a spiral buildup. When these lines are oriented as radii in a build area, for example, in a circular-shaped build area revolving symmetrically around a single center point, then a continuous printing process can be performed in a helical fashion. The build platform 16,18 (upon which solidified material is deposited to form the physical object) in one embodiment is continually rotated and simultaneously raised in a very gradual manner while the material to be solidified, such as a photopolymer is deposited as a liquid in a thin line on a transparent platform. A stationary line of focused actinic radiation delivered from a position below the platform is directed into the liquid photopolymer to produce a single continuous "layer" of the now solidified material deposited and bonded to adjacent previously or simultaneously deposited material in a helical fashion. Alternatively, heliography can also be implemented by slowly raising the build platform 16,18 without rotation while a line of focused radiation "spins" beneath in a programmed manner, curing liquid photopolymer continuously. In a further embodiment, the platform can be periodically or continuously rotated and at the same time the actinic light can be periodically or continuously reposition during the buildup and curing process.

Methods and systems incorporating features of the present invention seek to solve the issue of having both simultaneously high construction resolutions while still preserving the ability to print large structural objects in a faster more economical way than can be achieved by the prior art. Such systems can utilize a continuous method for depositing and solidifying materials, for example, photocurable materials, in a rotational manner that results in a spiral build-up of material.

In some embodiments of an apparatus incorporating features of the present invention, a rotating build platform 16,18 with an elevation that can be controlled along a Z-axis is utilized. This build platform 16,18 is lowered onto at least one solidification area which comprises at least one material dispenser, at least one transparent substrate, for example, from which a material flows and is held against the build platform 16,18 during solidification, at least one drainage system to remove unused material and at least one excess material stripper for collecting and removal and recycling of unsolidified materials. In a photopolymerization process, electro-magnetic radiation emitted from a source below the transparent substrate, is directed onto the photocurable construction material 1704, also referred to as build material 1704 in specifically targeted regions that coincide with point data derived from a three-dimensional object that is stored in the machines memory system.

In the use of photopolymers, both construction materials 1704 and irradiation sources are selected to provide a near instantaneous cure of the construction material 1704. The solidified material adheres to the rotating build platform 16,18 resulting in the continuous or semi-continuous spiral build-up of material to construct an object substantially similar in appearance to a desired three-dimensional object. In utilizing these processes incorporating features of the present invention, vertical resolution of a constructible object can correspond to the layer height or layer pitch angle of a continuous spiral layer of material and can be controlled by altering the relative distance at which the inverted build platform 16,18 is suspended above the photocurable material that is held on a transparent substrate.

In some embodiments, Vertical-cavity surface-emitting lasers (VCSELs) are utilized as highly efficient light sources. These VCSELs can be incorporated into a material dispensing component, such as a print head, and can be configured with rotational components to allow for rotation of the VCSEL arrays to customize curing. In some embodiments, thermoelectric coolers (TAC) and/or fluid-based coolers can be utilized with the VCSELs to provide cooling.

In one embodiment, a device for three-dimensional (3D) printing of structures in a vertical orientation can comprise a construction area and a material dispenser with a flowable build material 1704 in the material dispenser. The material dispenser can be positioned to deliver the flowable material onto an exposure zone of an upper surface of the construction area. The device can also comprise one or more vertical-cavity surface-emitting laser (VCSEL) chips on or adjacent the material dispenser, the VCSEL chips positioned to deliver radiation to solidify the flowable material located on the exposure zone.

In another embodiment, a device for three-dimensional (3D) printing of structures in a vertical orientation can comprise a construction frame, a material dispenser with a flowable build material 1704 in the material dispenser, and a construction area and a separate build platform 16,18 both positioned horizontally within the construction frame and configured for inverted build of a solidified 3D structure there between. The build platform 16,18 can be moveable vertically within and configured to rotate within the construction frame and the material dispenser can be positioned to deliver the flowable material onto an exposure zone of an upper surface of the construction area. The device can also comprise one or more vertical-cavity surface-emitting laser (VCSEL) chips positioned to deliver radiation to selectively solidify the flowable material located on the exposure zone and the build platform 16,18 can be configured to receive and retain the build material 1704 delivered on to the upper surface of the construction area as the build material 1704 solidifies and to move vertically upward and to rotate within the construction frame.

In yet another embodiment, a device for three-dimensional (3D) printing of structures in a vertical orientation can comprise a construction frame, a material dispenser with a flowable build material 1704 in the material dispenser, and a construction area and a separate build platform 16,18, both positioned horizontally within the construction frame and configured for inverted build of a solidified 3D structure there between. The build platform 16,18 can be moveable vertically within and configured to rotate within the construction frame and the material dispenser can be positioned to deliver the flowable material onto an exposure zone of an upper surface of the construction area. The device can also comprise one or more vertical-cavity surface-emitting laser (VCSEL) chips positioned to deliver radiation to solidify the flowable material located on the exposure zone, wherein the material dispenser is on a rotary table configured to rotate in relation to a fixed base and the build platform 16,18 can be configured to receive and retain solidifying build material 1704 delivered on to the upper surface of the construction area and to move vertically upward and to rotate within the construction frame.

These and other further embodiments, features and advantages of the systems, devices and methods described herein would be apparent to those skilled in the art based on the following detailed description, taken together with the accompanying drawings.

Historically the tracking of parts produced in manufacturing systems has been done by creating a physical Identification number or mark on a portion of an object or labels attached thereto. Some methods require the physical alteration of the part themselves such as providing printing voids or changing other physical features of the constructed object. Some of these methods require undesirable changes that affect the structural integrity, form, function or ascetics of the part being produced and can also be easy to replicate and forge onto unauthorized copies of the objects. Most of these methods allow access to anyone to read the information that in some cases would ideally remain hidden and encrypted. Previous methods also do not ensure that information can be retrieved even if the part is severely damaged or intentionally altered specifically to remove the identifying elements.

With the increasing adoption of additive manufacturing systems, the simple method of printing a physical barcode structure, or serial number is not sufficient to guarantee that a part is genuine or that the part has proper traceability.

Also with the increasing prevalence of 3d scanners that can capture the shapes and features of physical objects, coupled with the already wide spread use of peer to peer data sharing and online 3d model file sharing sites currently available, the ability to copy and distribute physical objects represents a major concern for the uncontrolled dissemination and distribution of counterfeit parts and products or ideas covered by some IP protection.

Additionally, as new additive manufacturing processes and materials enter the market there is a need to establish reliable and universal standards for the performance of parts produced through additive manufacturing methods and to identify the reproductions as authorized by the original parts manufacturer and meet the manufacturing standards established for the part. The establishment of these emerging standards and the ability to certify a part was created by a trained operator on a certified machine with appropriate and approved materials, has become increasingly more important as a result of the establishment of governmental established standards and the adoption of these standards by regulated industries such as auto, aerospace, dental, and medical industries.

To create and maintain the high standards necessary for a broader adoption of parts produced using additive methods, there is a great need for parts to be traceable through their functional life cycles so that improvements can be made and defects can be tracked back to a specific source of goods as well as all the data regarding the manufacture of each item. This is of the utmost significance with regard to being able to locate and replace products once a defect is found in one part then all other parts that could share a common defect can be identified and recalled to prevent a part failure in critical systems.

For the greater adoption of additive components especially in regulated applications such as aerospace or biomedical fields, traceability is imperative to the development of trust and accountability on behalf of all aspects of the additive manufacturing industry that have a direct hand in the production of a part. The methods and systems described herein provide the means to ensure that from the time a construction material 1704 is produced to when a part is produced and to when the part has a final inspection after being completed, that all relevant information through the process is recorded and traceable to the individual part that is being produced.

BRIEF DESCRIPTION OF THE DRAWINGS

FIG. 3 is a cross-sectional exploded view of components of a 3D printer device incorporating features of the present invention.

FIG. 4 is a perspective view of an imaging component of a 3D printer incorporating features of the present invention.

FIG. 5 is a perspective view of a z-axis elevator stage of a 3D printer incorporating features of the present invention.

FIG. 10 is a partial internal perspective view of a base material storage and construction area of a 3D printer incorporating features of the present invention.

FIG. 11 is a perspective view of a complete solidification area of a 3D printer incorporating features of the present invention.

FIG. 33A and FIG. 33B illustrate multiple stacked layers of a helically built 3D object where FIG. 33B is an enlarged cutaway portion of showing circumferentially deposited encoding materials.

FIG. 34 is another example of illustrating an electromagnetic alignment structure orienting a magnetic particle and a separate magnetic reader for determining the orientation of the aligned magnetic particles.

FIG. 35A comprises graphs showing the absorption versus emission wave lengths of three different dyes that can be use in combination to provide an encoded information in a 3D object.

FIG. 35B illustrates the buildup of a microcapsule including the three different dyes shown in the graphs of FIG. 35A.

FIG. 35C shows a representation of a 3D object including dye containing microcapsules.

DETAILED DESCRIPTION

Figure 1:
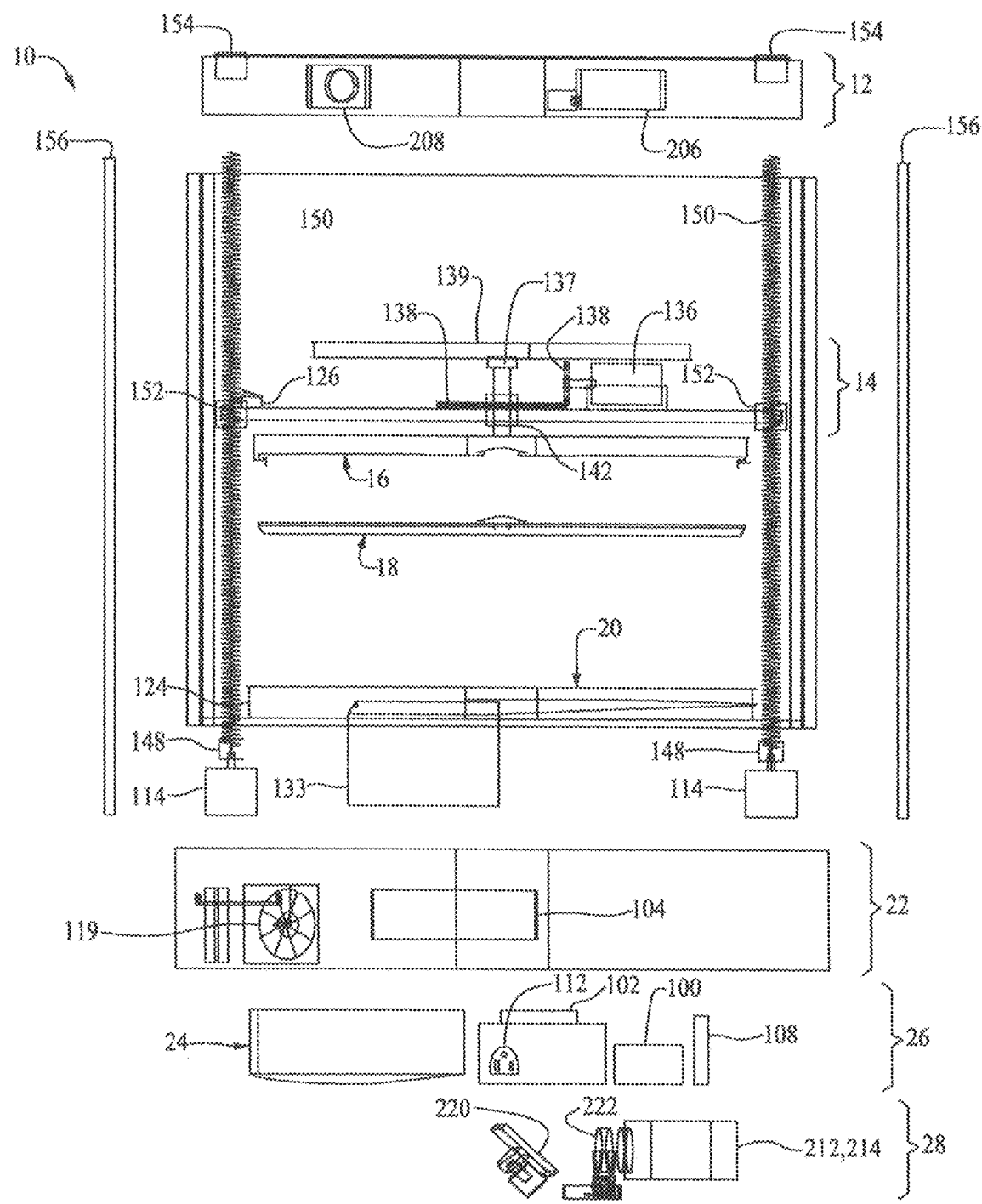
FIG. 1 is a cross-sectional exploded view of a 3D printer device incorporating features of the present invention.

The present disclosure sets forth methods and devices for efficient 3D printing that address conventional inefficiencies and deficiencies while utilizing a single compact device. As illustrative of such methods and 3D production devices, the dispensing of a photocurable substance onto transparent substrate, the selective curing and solidified of such materials and the retrieval of the solidified product is described. However, one skilled in the art, based on the teachings herein, will recognize that the apparatus and techniques described herein are not limited to the use of photopolymers along with the irradiation sources suitable to effect solidification, but can be readily adaptable to a broad range of flowable materials that can be rapidly solidified for the continuous formation of solid, three dimensional objects.

Throughout this disclosure, the preferred embodiments herein and examples illustrated are provided as exemplars, rather than as limitations on the scope of the present disclosure. As used herein, the terms "invention," "method," "system," "present method," "present system" or "present invention" refers to any one of the embodiments incorporating features of the invention described herein, and any equivalents. Furthermore, reference to various feature(s) of the "invention," "method," "system," "present method," "present system," or "present invention" throughout this document does not mean that all claimed embodiments or methods must include the referenced feature(s).

It is also understood that when an element or feature is referred to as being "on" or "adjacent" another element or feature, it can be directly on or adjacent the other element or feature or intervening elements or features that may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for the purpose of describing particular embodiments only and is not intended to be limiting of the invention. As used herein, the singular forms "a," "an," and "the" are intended to include the plural forms as well, unless the context clearly indicates otherwise. For example, when the present specification refers to "a" source of radiation or "a" material it is understood that this language, in the first instance, encompasses a single source or a plurality or array of radiation sources and, in the second instance, single or multiple sources of materials. It will be further understood that the terms "comprises," "comprising," "includes" and/or "including when used herein, specify the presence of stated features, integers, steps, operations, elements, and/or components, but do not preclude the presence or addition of one or more other features, integers, steps, operations, elements, components, and/or groups thereof.

It should be further recognized that reference to "solid" 3D structures refers to the materials of construction becoming solid and that the 3D product produced is not necessarily a solid structure and may include products with unfilled or hollow spaces therein or, if intended, an open, porous or lattice-like structure and may in fact include spaces therein enclosing a liquid or non-solid filling material.

Figure 22:
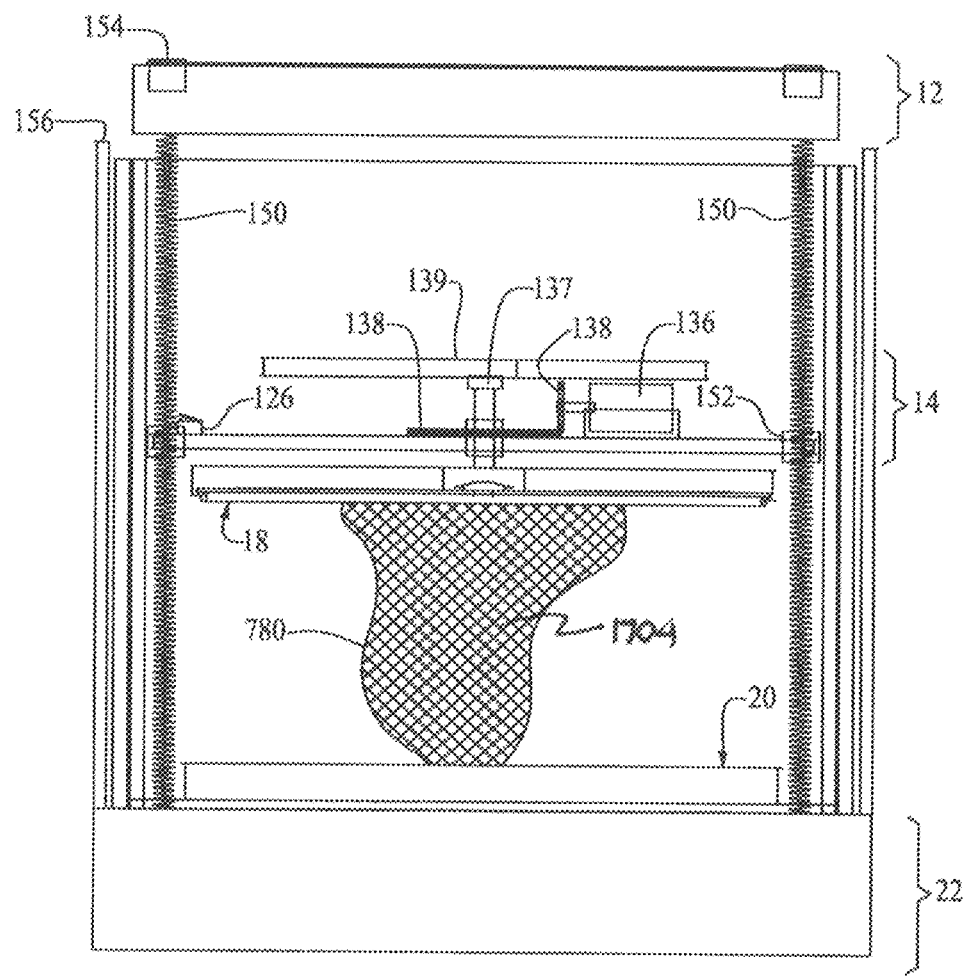
FIG. 22 is a side view of the 3D printer device of FIG. 1, with a 3D structure in the process of being printed.

For the purpose of describing the construction procedure, the term "inverted" or "inverted build" refers to the method and procedure of building a 3D structure which is suspended below a horizontal assembled build structure 16, 18 with a portion sometimes referred to as the "base" of the 3D structure attached to the build platform 16,18 insert. The assembled build structure 16, rises vertically from and above the construction/solidification area 20, as it prints a 3D structure 780 such as shown in FIG. 22.

In some embodiments, the basic essential functionality of the Heliolithography process can be carried out through the use of 3D model software files, which produces an image map that is sectionalized into spiral or helical structures using computer assisted drawing (CAD)-type computer programs. The spiral structure can be converted into segmented images or bit data corresponding to points along the surface areas of the intended printed object that are to be solidified by the controllable projection of radiation onto exposed areas to selectively solidify the materials of construction.

The solidification method can utilize any build material 1704 capable of changing from a liquid or flowable state to a solid in response to a stimulus. For example, solidification can be the result of providing a radiative source which has the appropriate physical characteristics to cure or react the irradiated reactive liquid photopolymer material positioned on the rotating build platform 16, 18. In some embodiments, the build material 1704 comprises a photopolymer solution containing at least one photoinitator. The photoinitator absorbs radiation at specific wavelengths producing free radicals which cause the rapid polymerization in the localized irradiated regions. Representative chemistries that can be used can comprise unsaturated polyesters, styrene-Polyenes, Thiols-Acrylates, and methacrylates-Cycloaliphatic epoxides. Alternatively, a second reactive material can be dispensed to cause a crosslinking of a primary polymer. Further, thermoplastics can be heated to liquefy and then rapidly cooled to solidify. As a still further alternative powdered metals or thermoplastics can be dispensed and "spot welded" use a heat source or laser beam.

A typical formulation for a photoreactive material used in such a process comprises one or more monomers (molecules of low weight that provide the specific desired properties and adhesion), Oligomers (medium length polymer chains that contribute additional properties such as increased tensile strength, stiffness, and elongation), photoinitiators (light sensitive materials that trigger free radical production to initiate the polymerization process), and additives such as fillers, pigments, dyes, adhesion promoters, abrasion resistant materials, UV light stabilizers and chemical stabilizers.

One example of a photopolymer formulation that can be used in the process described comprises a solution of monomer such as 1,6-Hexanediol ($HOCH_2(CH_2)4CH_2OH$) and Polyethylene Glycol Diacrylate ($C_3H_3O)\cdot(C_2H_4O)_n\cdot(C_3H_3O_2)$) with one or more photo-initiators, phenyl bis(2, 4,6-trimethyl-benzoyl)-phosphine-oxide $[CH_3)_3C_6H_2CO]$ $2P(O)C_6H_6$ and Diphenyl (2,4,6trimethyl benzoyl) phosphine oxide $(CH_3)_3C_6H_2COP(O)$ $(C_6H_5)_2$ at concentrations between 2 and 8 percent by weight.

Figure 2:
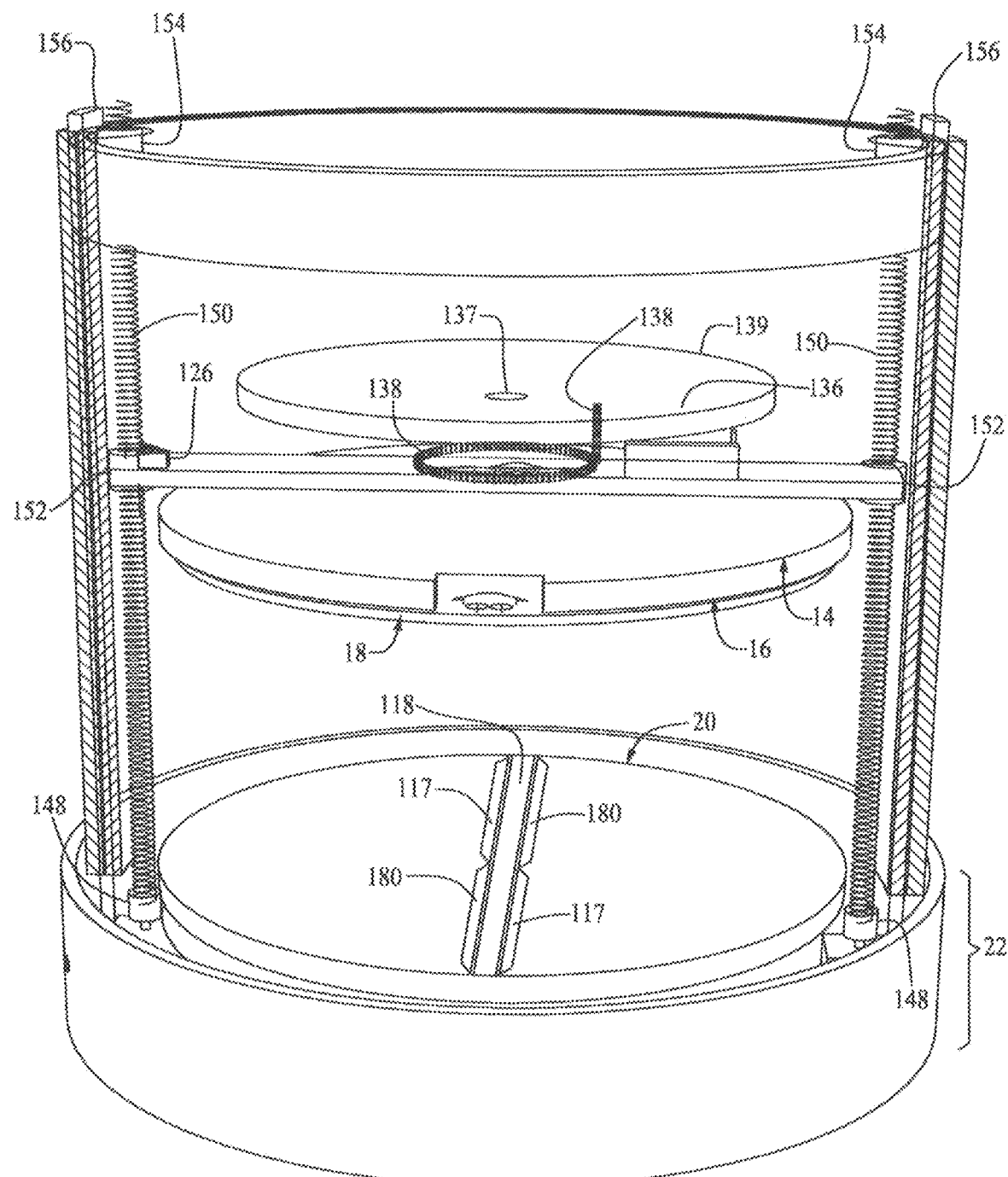
FIG. 2 is a front perspective view of the 3D printing device of FIG. 1 incorporating features of the present invention.

FIGS. 1-2 show a sectional and front perspective views respectively, of some of the major functional components of an example 3D printer 10 incorporating features of the present invention. The 3D printer 10 comprises an imaging unit 12, a z-axis elevator stage 14, also referred to as the construction frame, a build platform 16,18, and a build platform 16,18 insert which is configured to fit together with the build platform 16,18, to provide an assembled build platform 16,18 (as shown in FIG. 2). Although the present disclosure sets forth a configuration utilizing both a build platform 16,18 and a build platform 16,18 insert, it is understood that the use of the methods and devices incorporating features of the present invention can utilize the build platform 16,18 alone without the build platform 16,18 insert. Below the assembled build platform 16,18 is a construction/solidification area 20, a material storage area 22, a material cartridge/reservoir 24, electronic components 26, and a solidification mechanism 28. These components and their various sub components are discussed in greater detail throughout the present disclosure.

With reference to FIGS. 1 and 2, a 3D file (corresponding to a desired 3D object to be produced (the "print task")) is loaded into the memory of a print processor 100, which is configured to operate in conjunction with a CPU and solid state memory storage, to control the 3D printer 10. This print task can be transferred through the CPU and into solid state storage in a variety of ways know in the art. For example, it can be transferred from a remote server or program using internet protocol (through its Ethernet or WiFi connection 102), or it can be loaded manually by the user using a control interface 104 and/or universal serial bus (USB) data transfer ports. Control interface 104 can be any control interface known in the art. In the embodiment shown, control interface 104 is a touch screen interface, such as an LCD touch screen interface. The data can be uploaded to the apparatus which performs self-tests and priming functions to ready the machine for printing. Motor drivers 108, work in conjunction with the print processor by receiving low-voltage signals from the print processor 100 and generating controlled current signals needed to properly drive the various motors used throughout the printer. Other electronics within the electronics component assembly 26 of the 3D printer 10 include a power supply 112, which can transform voltage input to provide regulated power to all the components of the electronic component assembly 26. It is understood that while the power supply 112 is depicted as comprising an outlet, any suitable power supply known in the art, for example, battery- or generator-based power supplies, are within the scope of the present disclosure.

The printer comprises a build platform 16,18 and a construction area 20. Build platform 16,18 can be permanently installed or replaceable, e.g. being removable connected to z-axis elevator stage 14. The build platform 16,1816 can be rotatable clockwise and/or counterclockwise or otherwise moveable in one or more directions and can have a variety of shapes including any regular or irregular polygon or can be circular or substantially circular. The build platform 16,18 can be lowered towards the solidification area 20 using z-axis stepper motors 114; a sensor 124 can be used to determine when the desired layer-height of an object to be produced has been reached. The printer will then begin the print cycle by first ensuring all moveable axes are in the correct starting position. For the z-axis, the starting position is typically one-layer height above the cure zone (above the home position). However, it is understood that other starting positions can be designated as needed for a particular print task and/or as newer technology becomes available and is incorporated into devices and methods according to the present invention. For the rotation axis, the starting position is the same as the home position.

The homing process, which establishes the '0', or start position of each axis, uses sensors 124, such as hall effect sensors, in a closed-feedback system to determine the hard limits of each axis. Hall effect sensors are known in the art and typically comprise a transducer that varies its output voltage in response to a magnetic field. Hard limits for each axis can be driven from a pair of linear sensors, such as hall effect proximity sensors 124, positioned at each limit. When utilizing hall effect sensors, one or more small magnets 126 can be embedded in the moveable z-axis carriage 14. Because the sensors have a linear analog output directly proportional to magnetic flux, each sensor can be calibrated with its own trigger voltage.

Once hard limits are determined, printer firmware maintains in its memory the current position of each axis relative to its home position. When the printer is powered on, it can be programmed to re-home each axis before accepting new print tasks, for example, to compensate for situations wherein an axis has been moved while the printer was powered off. The current position of each axis can be stored as an integer number of motor steps from zero. In these configurations, moving the axis "up" will increase this internal counter, and moving the axis downwards will decrease the counter.

Soft limits can also be put in place to configure the printer such that the printer will never allow a motor movement that will send the axis below the lowest position or past the maximum allowed value, which is specific to each axis' length. If an axis is directed to exceed these preset limits the printer controller will halt the print task and issue an appropriate error message. Also, if there is ever a programming error and the printer attempts to move past the soft limit, the hard limits built into each axis will halt the axis movement and the print task before any damage to the printer occurs, requiring entry of an appropriate soft reset.

The material storage area 22 can hold a replaceable material cartridge 24. The material cartridge contains electronically stored information which can be read by the 3D printer 10 to determine the amount of material in the cartridge 24 and other specifics about the material in the cartridge. An agitator mechanism, such as a magnetic stirring device 230, as shown in FIG. 10, can also be included and be located below the cartridge 24 to ensure materials are uniformly mixed prior to dispensing. One or more atmospheric control mechanisms 119, such as an electronic heating mechanism and/or a fan and/or humidifying control systems can also be used to alter the temperature of construction material 1704 in the material cartridge 24 or control the exposure to moisture if needed, for example, to reach a desired viscosity or reduce detrimental moisture prior to dispensing. A thermal sensor and/or humidity sensor can also be used to monitor when a desired material temperature is reached or that no excess moisture is present.

Referring to FIG. 10 a material pump 115 can be used to move photocurable build materials 1704, such as liquid-state photocurable materials, from the material reservoir 24 to a material depositor. At least a minimal amount of material needed for a proper thickness coating on the build surface can then be dispensed. A material such as photopolymer resin can be introduced to the print area by the printer's internal plumbing system, driven by a small pump. With reference to FIG. 1, as resin is introduced, it flows down resin supply channels in a print head and flows over the cure zone and into resin return channels 117. Excess liquid resin is continuously pulled from the resin return channels 117, filtered and returned to the resin tank or discarded, if appropriate.

The assembled build platform 16,18 can then be rotated, which spreads liquid resin over the solidification area, depositing and evenly spreading the photopolymer to a desired layer thickness. In some embodiments, the desired thickness is between 0.001 and 0.1 mm in thickness. A secondary material dispenser can optionally be used to infuse the primary material with additional additives, pigments, dyes, coloring agents into the primary photopolymer prior for curing. In an alternative embodiment, the secondary material can be a material reactive with the first material to effect solidification. It is understood that while the embodiments described herein set forth a rotatable build platform 16,18 and stationary material dispensers and solidification areas, the reverse configuration would also work and be within the scope of the present application, wherein material dispensers and solidification areas rotate under a stationary build platform 16,18. In an alternative embodiment, the material dispenser, solidification and build platform 16,18 can be simultaneously or alternatively moved in a programmed manner.

Once a continuous resin flow is established, the assembled build platform 16,18 begins to rotate before the solidification process begins to establish a uniform flow of material across a material spreader. The rotation of the assembled build platform 16,18 is performed with the use of a variable speed motor 136 that drives a central shaft 137 with engaged 90° gears 138 that rotate both the scanner and assembled build platform 16,18 that are suspended on one or more bearings 142 connected to the z-stage 14. The build platform 16,18 can be set to spin for set number of rotations, also known as the "spin-up" period. The rotation of the assembled build platform 16,18 helps to draw new material over the cure zone and ensures that no air is trapped. Without pausing rotation, the printer begins the printing process by activating the solidification mechanism to begin the photocure process.

Continued rotation of the build surface (or movement of the feed mechanisms or other components programmed to move) advances the print materials onto an across an exposure/cure zone 118, which is preferably glass or another sturdy, transparent and preferably low adhesion medium. The exposure zone 118 can be treated with a non-stick and abrasion resistant coating, which prevents or retards cured material from adhering to its surface. Selective solidification of the segment of material deposited between the build platform 16,18 and the transparent construction surface, is carried out by one of a number of possible combinations of radiation sources and radiation directing mechanisms used to direct the radiation through the transparent substrate portion of the solidification area onto and into the liquid construction materials 1704. Material level sensors in the material cartridge 24 are also used to monitor material levels and are capable of pausing or slowing a print cycle if material levels become critically low.

The data stored in the memory of the printer is transmitted to the solidification mechanisms 28 in a programmed manner to selectively expose portions of the photopolymers through the transparent substrate, solidified in a manner corresponding to the structural information relating to specific segments of the 3D model which is being constructed. The Heliolithography process, which appears to be continuous can actually comprise many small cumulative "steps" for each full rotation of the build platform 16,18, pausing at each step for a small amount of time, typically between 5-10 milliseconds required to allow the polymerization reaction to progress past a critical "degree of cure" (i.e., a level of solidification) needed to sufficiently attach to the build platform 16,18 and firmly adjacent previously solidified portions of structure being formed. As an alternative the build platform 16,18 can comprise a removable retention means added to the lower surface thereof which can be incorporated onto the first layers of the product being built so as to allow removable attachments of that structure, once completed, from the build platform 16,18. In some embodiments, referring to FIG. 8, the holes can be shaped to add alternative retention structures 770 such as inverted cones or additional structures 770 can be added to provide further retention of the structure being built. Unsolidified material is simultaneously removed and recycled back into the reservoir.

As the portion of the structure being built is sufficiently solidified, the rotating assembled build platform 16,18 continuously removes the solidified material from the exposure zone 118 and provides new construction material 1704 spreading across the construction area 20. Solidified material is also, at the same time, rotated towards a recycling area comprising a drain 132, such as an excess materials stripper, that removes any unsolidified materials from the growing structure which are then filtered and recycled back into the construction reservoir 24, and a further curing mechanism 133, if necessary.

As each additional step of the build process is reached, new information is provided to the curing mechanism 133, so as to solidify the resin where and when needed. As the assembled build platform 16,18 rotates, it is continually raised by the linear actuators in a ratio such that the assembled platform 16, 18 is raised one layer height for each revolution. In some embodiments, one layer height corresponds to the number of radii of an intended curing piece of the structure. For example, in embodiments utilizing one material while curing down the diameter (i.e. radii) a full layer would be cured during every 180 degree rotation of the build platform 16,18. In some embodiments utilizing multiple cure areas, but still utilizing a single material, a single layer can be cured faster with less rotation, for example, at approximately 360 degrees/number of cure radii. The linear actuators include stepper motors 146 that are coupled via coupling devices 148 to fasteners, such as lead screws 150, so as to raise the z-stage which is connected with fastener acceptor, such as a lead screw nut 152, when rotated. Bearings 154 and linear guide rails 156 mounted in the z-stage 14 stabilize this vertical movement.

This cycle is repeated until the spirally deposited and solidified material is built up and the constructed three-dimensional object suspended below the assembled build platform 16,18 but above the construction/solidification surface 20 is completed. This process is repeated in a continuous fashion until, cumulatively, the total height of the printed object has been reached. Once this is accomplished and the cure mechanism has no remaining information in its input buffer, the curing mechanism (the photon source) is shut off and the rotation of the build platform 16,18 is stopped. The resin flow is shut off and all remaining liquid resin drains back into the material cartridge. The machine initiates a motion sequence raising the build platform 16,18 to its upper soft limit and brings the rotation of the platform to its homing '0' position.

In addition to utilizing preexisting software print modules, methods and devices incorporating features of the present invention can also utilize scanning and other imaging units. In some embodiments, objects can be placed on a scanner platform 139 and the printer 10 can be instructed to begin scanning. The z-stage 14 raises the object to an initial height to begin a scan. A pattern imaging device 206, such as a projector, or laser can be used to project a known geometric pattern on the surface of the object. A recording device 208 can then record the distortions to this known geometric pattern as the scanner platform 139 rotates driven by the same variable speed motor 136 and drive gears 138 as the build platform 16,18. The height of the object can be raised or lowered using the linear actuators to perform subsequent passes to generate greater coverage of the object geometry to include under cuts and over hangs. This information is then sent to the processor 100 and transmitted via Ethernet, WiFi or wired connection 102 to a computer or cloud system for the reconstruction of the scanned object.

Many different solidification mechanisms can be utilized with methods and devices according to the present disclosure. A solidification mechanism 28 used in the device of FIG. 1 can include any radiation source such as high power diodes 212, 214, with the radiation directed through correcting and focusing optics 222 and onto a motor controlled mirror scanning system 220 for directing the radiation through the exposure zone 118 of the cure zone. Other solidification mechanisms are discussed further below.

FIG. 3 shows an exploded view of an imaging unit 12, a z-axis elevator stage 14, a build platform 16,18, a build platform 16,18 which is configured to fit together with the build platform 16,18 to form an assembled build platform 16,18 (as shown in FIG. 2), a construction/solidification area 20, a material storage area 22, and a material cartridge/reservoir 24. FIG. 3 shows these components aligned in correct configuration according to some embodiments incorporating features of the present invention, such as the embodiment 10 depicted in FIGS. 1-2 of the present application. FIG. 4 shows an enlarged view of the imaging unit 12, which comprises a pattern imaging device 206 and a recording device 208 as discussed above. The imaging unit 12 can be connected to z-axis elevator stage 14 via bearings 154 as shown in FIG. 1.

FIG. 5 shows a more detailed view of z-axis elevator stage 14, which comprises magnets 126, which can interact with hall effect sensors to relay the position of the z-axis stage 14, a variable speed motor 136 that drives a central shaft 137 with engaged 90 degree gears 138, a scanner platform 139 and fastener acceptors 152. These components can function as set forth above.

Figure 6:
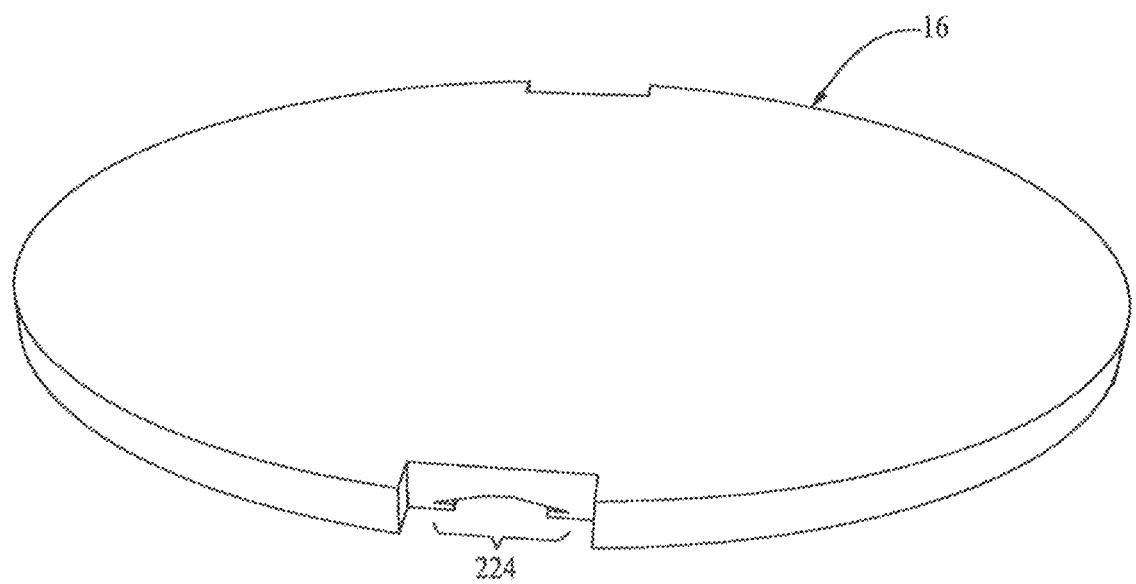
FIG. 6 is a perspective view of a build platform 16,18 attachment plate for a 3D printer incorporating features of the present invention.
Figure 7:
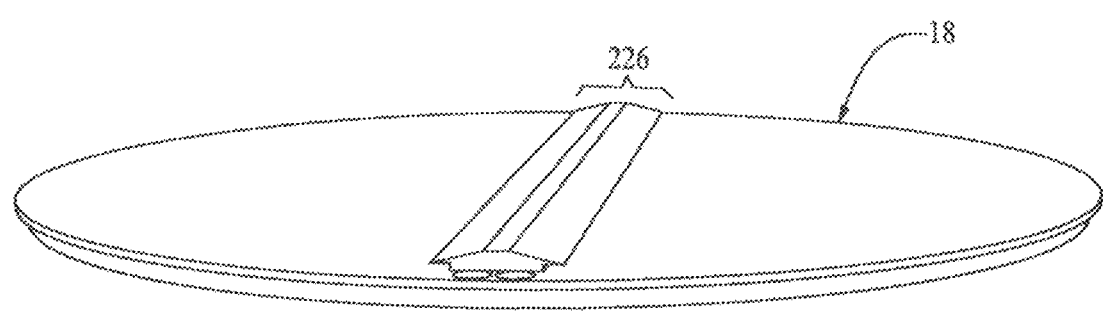
FIG. 7 is a perspective view of a removable build platform 16,18 insert for a 3D printer incorporating features of the present invention.
Figure 8:
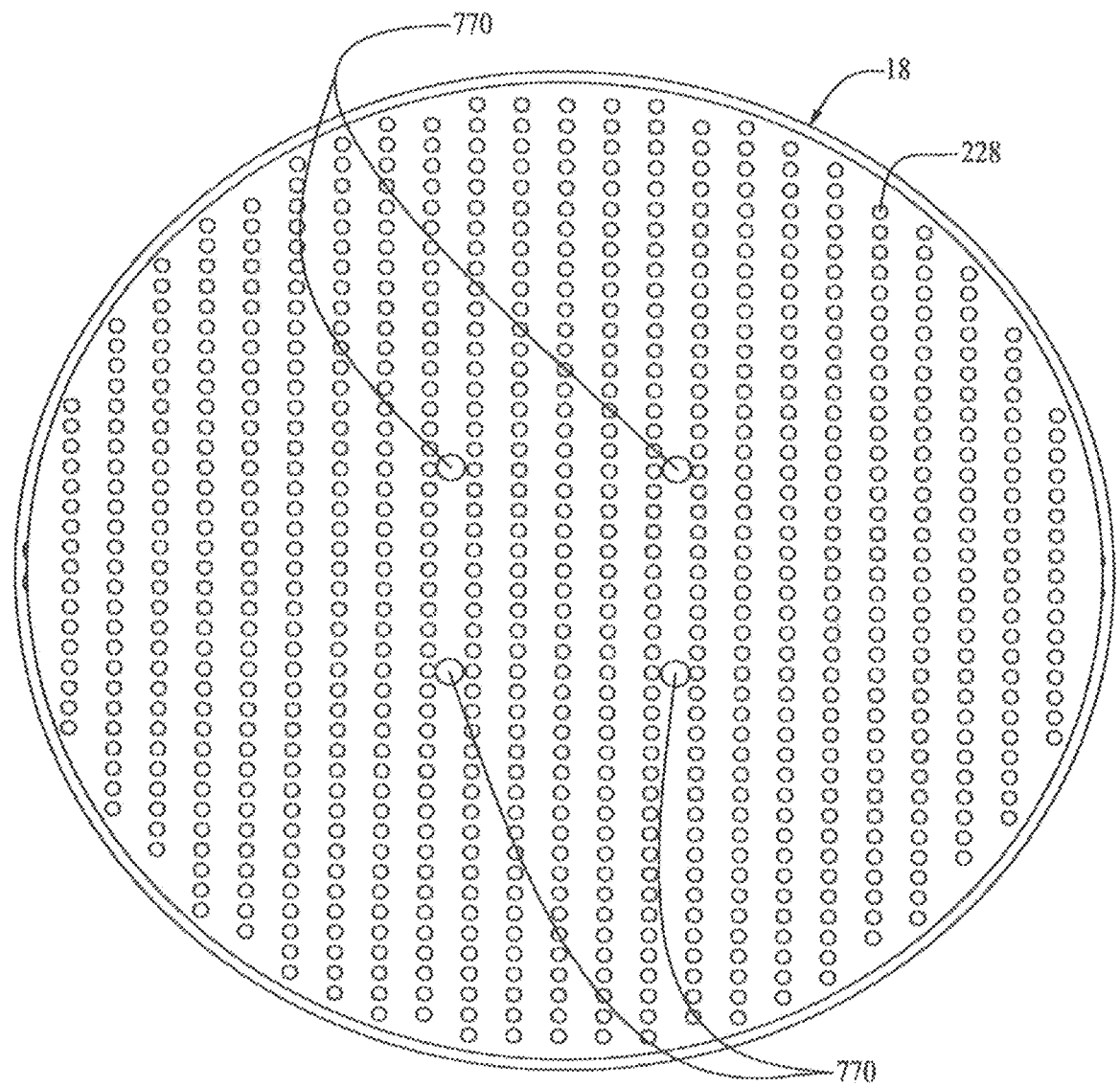
FIG. 8 is a bottom view of a removable build platform 16,18 insert for a 3D printer incorporating features of the present invention.

FIG. 6 shows an enlarged view of the build platform 16,18. One aspect more clearly shown in FIG. 6 is the insert accepting portion 224. FIG. 7 shows the build platform 16,18 and the inset connecting portion 226. The insert accepting portion 224 of the build platform 16,18 as shown in FIG. 6 can be configured to interact or mate with the inset connecting portion 226 of build platform 16,18 shown in FIG. 7 such that the two components can be connected into an assembled build platform 16,18 (as shown in FIG. 2, for example). This allows the build platform 16,18 to be readily removed and replaced in the device. FIG. 8 shows a bottom view of the build platform 16,18 comprising arrays of holes 228 allowing increased surface area for building materials. The removable build platform 16,18 or a removable attachment to the build platform 16,18 can be separated from the complete product or remain as a piece of the complete product.

Figure 9:
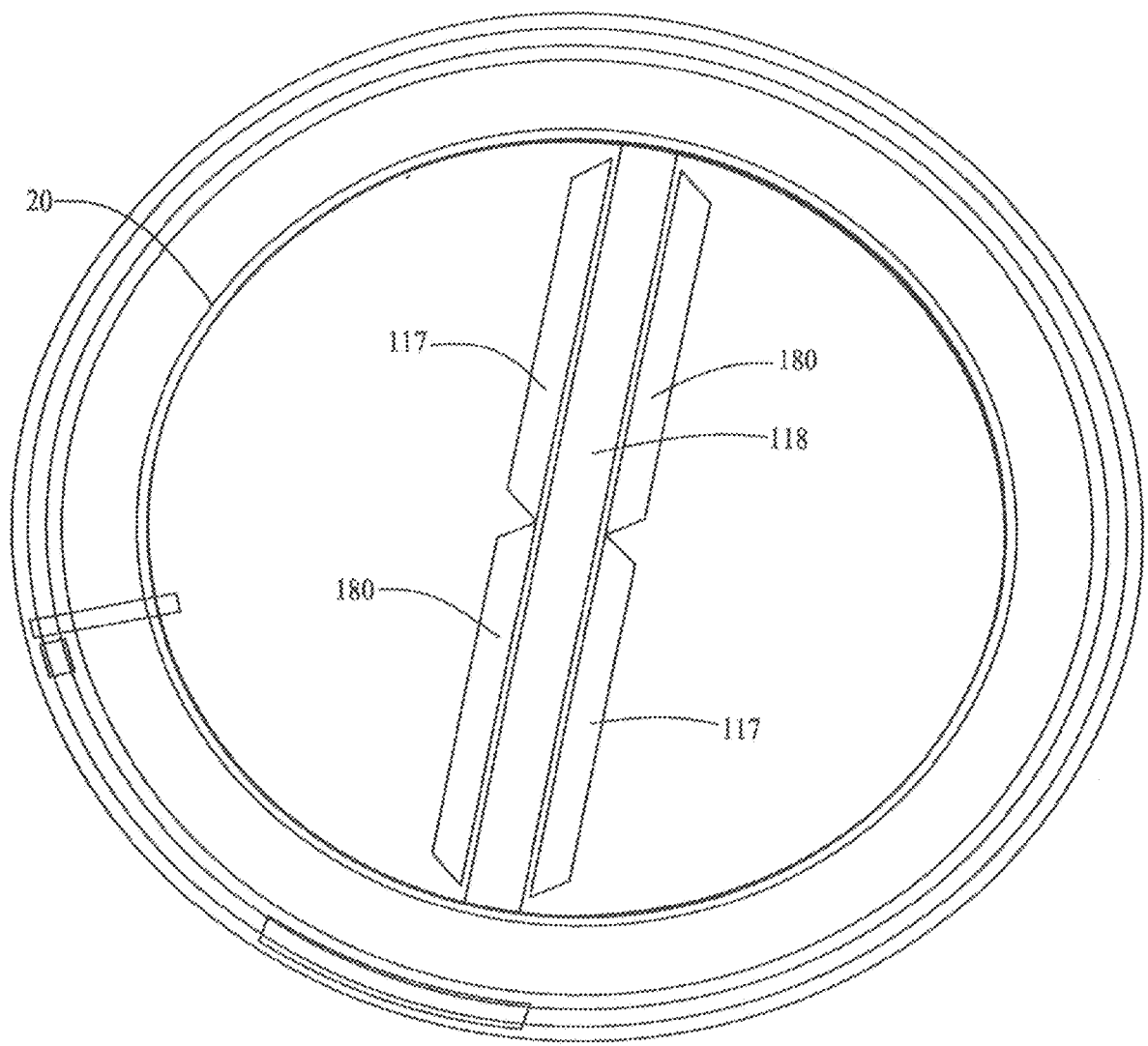
FIG. 9 is a top view of a view of an expanded solidification area/vat for a 3D printer incorporating features of the present invention.

FIG. 9 shows an enlarged view of the construction/solidification area 20, comprising a primary material dispenser 180, a cure zone 118, resin return channels 117, a material spreader 182, and a curing mechanism 133, such as an excess materials stripper, these components functioning as set forth above.

FIG. 10 shows an enlarged top perspective view of the material storage area 22 and the material cartridge reservoir 24. Also shown in FIG. 10 are the control interface 104, a material pump 115, resin return channels 117, an exposure/cure zone 118, which is a transparent substrate, an atmospheric control mechanisms 119, curing mechanisms 133, a coupling devices 148 attached to fasteners 150, linear guide rails 156 within the coupling devices, a primary material dispenser 180, a material spreader 182, a secondary material dispenser 184 and a magnetic stirring device 230. FIG. 10 also shows additive material cartridges 186 which can be configured to feed secondary material through primary material dispenser 180 and/or a secondary material dispenser 184.

Figure 12B:
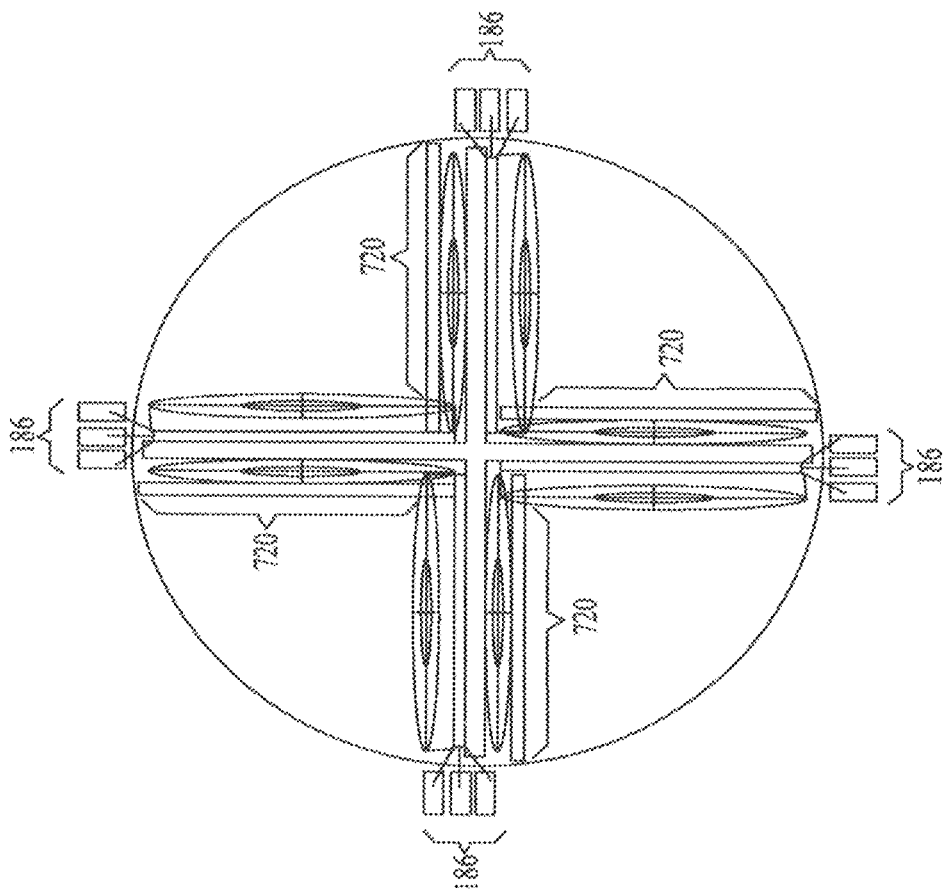
FIG. 12B depicts multiple items under construction radiating from the center of the build chamber floor of a 3D printer incorporating features of the present invention.
Figure 12A:
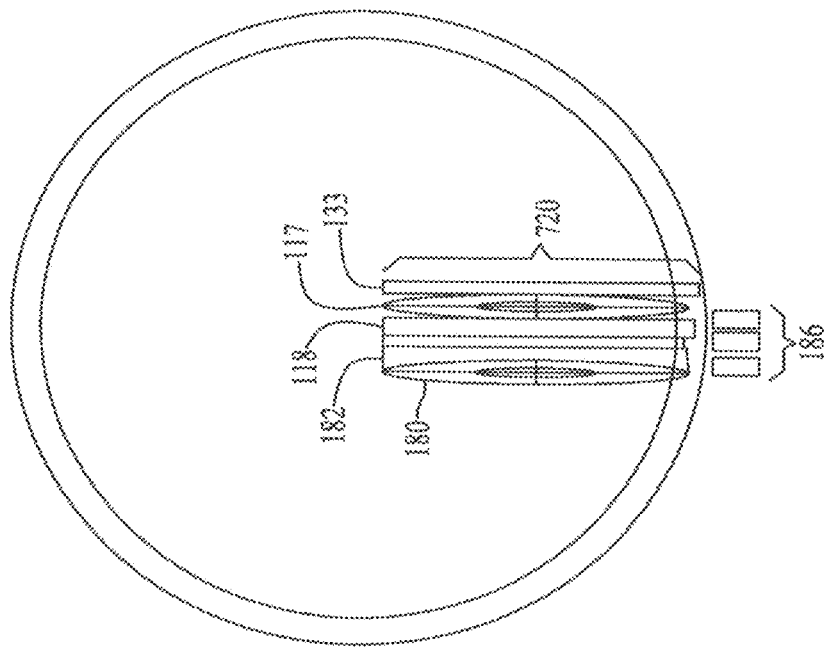
FIG. 12A depicts a single item being constructed radiating from the center of the build chamber floor of a 3D printer component incorporating features of the present invention.

FIG. 11 shows a condensed perspective view of a construction zone 720, comprising primary material dispenser 180, a material spreader 182, a secondary material dispenser 184, an exposure/cure zone 118, which is a transparent substrate, resin return channels 117 and curing mechanisms 133. The same structures are shown in FIG. 12A which shows a single construction zone 720 radiating from the center of the floor of the build chamber 21. FIG. 12A also shows an additive material cartridge structure 186. FIG. 12B shows an alternate configuration, wherein multiple construction zones 720 and additive material cartridge structures 186 radiate from the center of the floor of the build chamber 21.

Figure 13B:
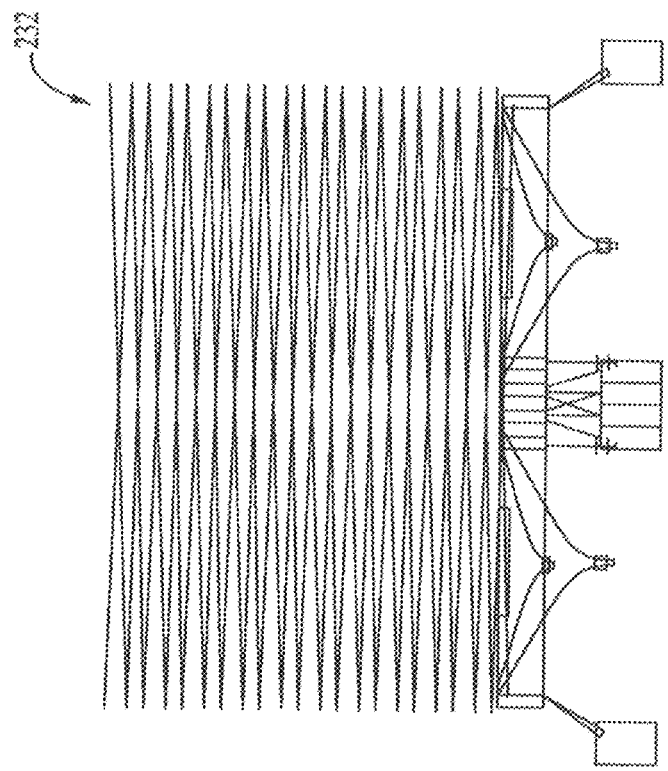
FIG. 13B is a side view a continuous spiral layer construction buildup utilizing multiple construction areas of a 3D printer incorporating features of the present invention.
Figure 13A:
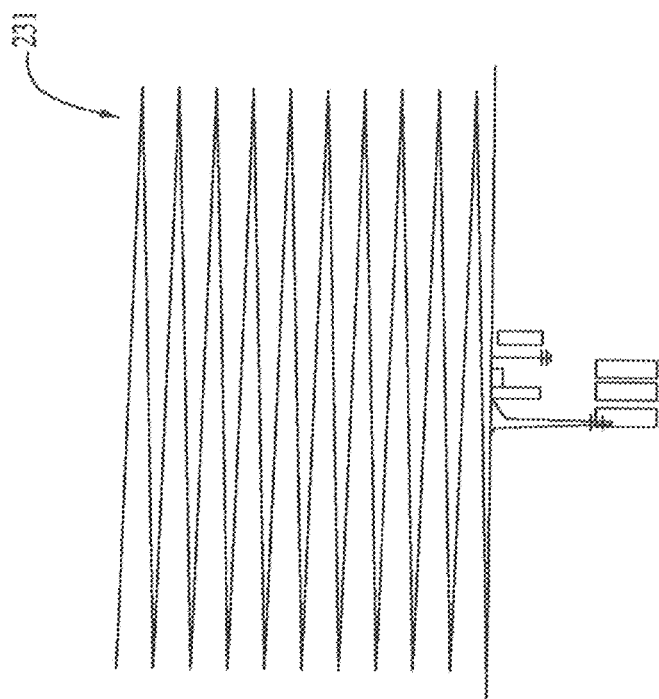
FIG. 13A is a side view of a continuous spiral layer construction utilizing a single construction buildup area of a 3D printer incorporating features of the present invention.

For illustrative purposes, FIGS. 13A and 13B are side views of a spiral layer printing construction for a single construction area 231 and for multiple construction areas 232, respectively. The use of multiple construction areas further provides the benefits of simultaneous layer creation or the expanded ability for a greater range of construction material 1704 options wherein each construction area can dispense and solidify a unique range of materials into a single layer. For depositing into a single construction layer the subsequent heights of the construction substrates can also match the pitch of the spiral layer to be created and insure consistent layer thickness at each construction area. However, this is not necessary to achieve the desired color accuracy. This process can also be utilized wherein the build platform 16,18 is rotated but raised only after one complete rotation is accomplished. This is of particular value where multiple construction areas of the same height are used. In such instance a consistent layer height for each material segment can be efficiently achieved. In actual operation the depicted expanded spiral can never occur as proper solidification techniques adhere and solidify together adjacent subsequent layers of the spiral laydown as they are formed.

Figure 14:
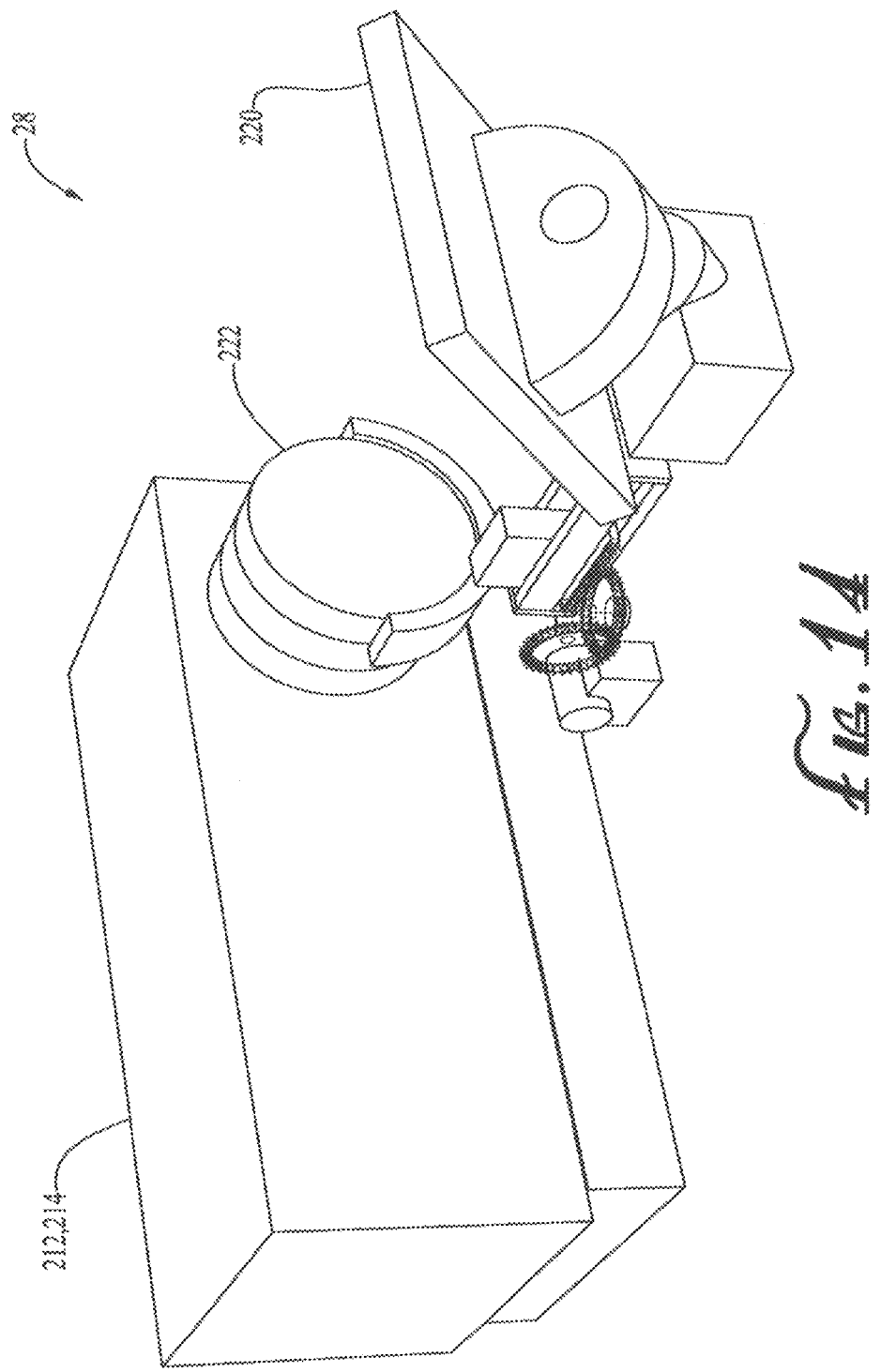
FIG. 14 is a perspective view of a radiation source for a 3D printer component incorporating features of the present invention.

Various solidification mechanisms and radiative sources can be utilized with devices and methods incorporating features of the present invention. FIG. 14 shows the solidification mechanism 28 of FIG. 1. When a photopolymer is used solidification mechanisms 28 can include various radiation sources such as high-power diodes, LEDs or lasers 212, 214. In a particular embodiment the radiation is directed through correcting and focusing optics 222 and onto a controlled scanning mirror system 220 adapted to scan the incident light such as by use of a motor drive for directing the radiation through the exposure zone 118. The solidification mechanisms 28 can further incorporate a DMD Chip Micro mirror device (not shown).

Figure 15:
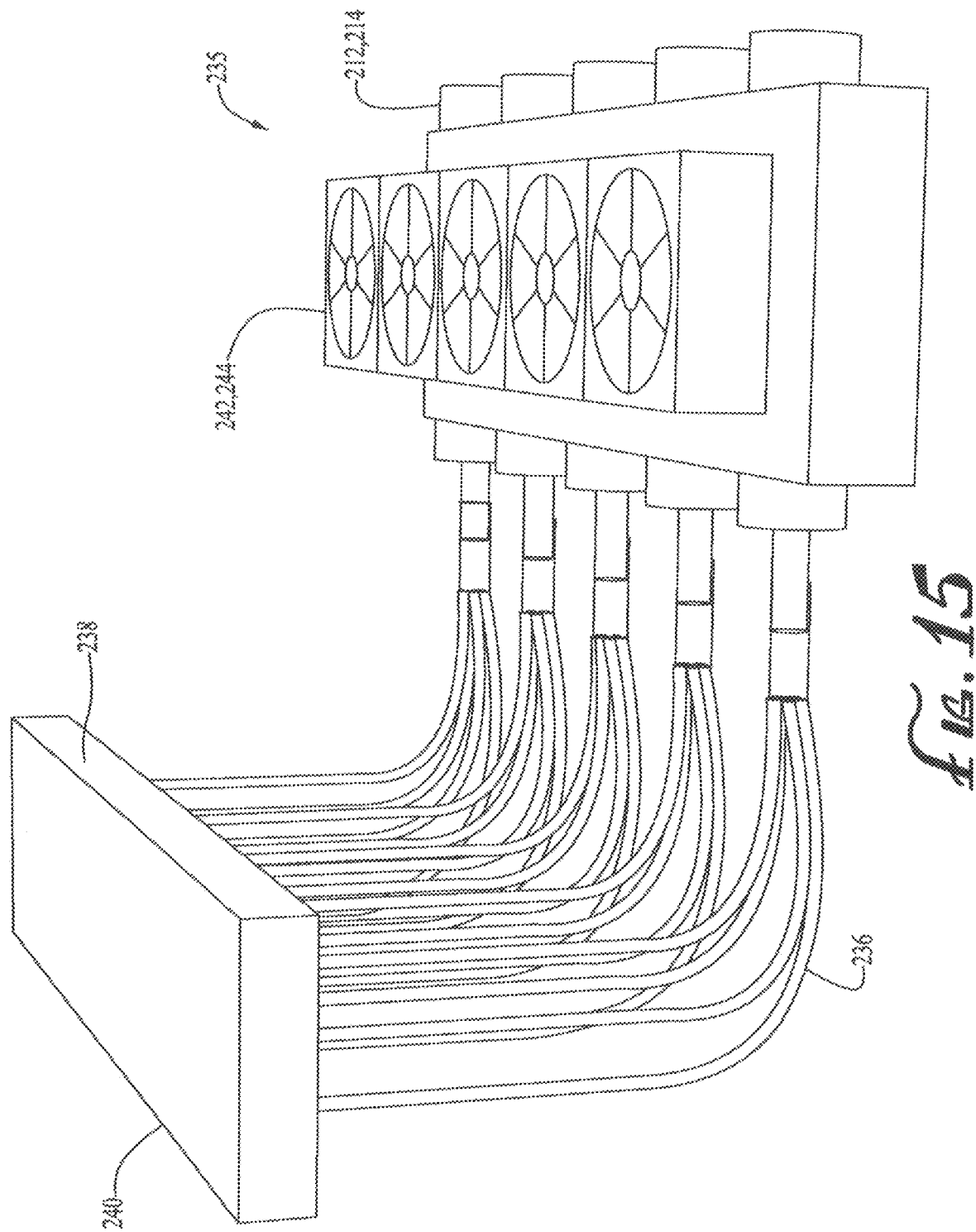
FIG. 15 is a perspective view of an alternative radiation source for a 3D printer incorporating features of the present invention.

FIG. 15 depicts a solidification mechanism 235 utilizing a Microelectromechanical systems (MEMS) or light valve switches. Depicted are high power diodes 212, 214, similar to the diodes that can be utilized with solidification mechanisms 28 described above, coupled to light/wave guides 236 in an optics system 238 for focusing onto a light switch 240 assembly. The light switch 240 is a mechanism allowing radiation to pass through at desired locations arranged in an overlapping hexagonal grid system. Fans and heat sinks 242 and a TEC temperature control system 244 can also be utilized for temperature control.

Figure 16:
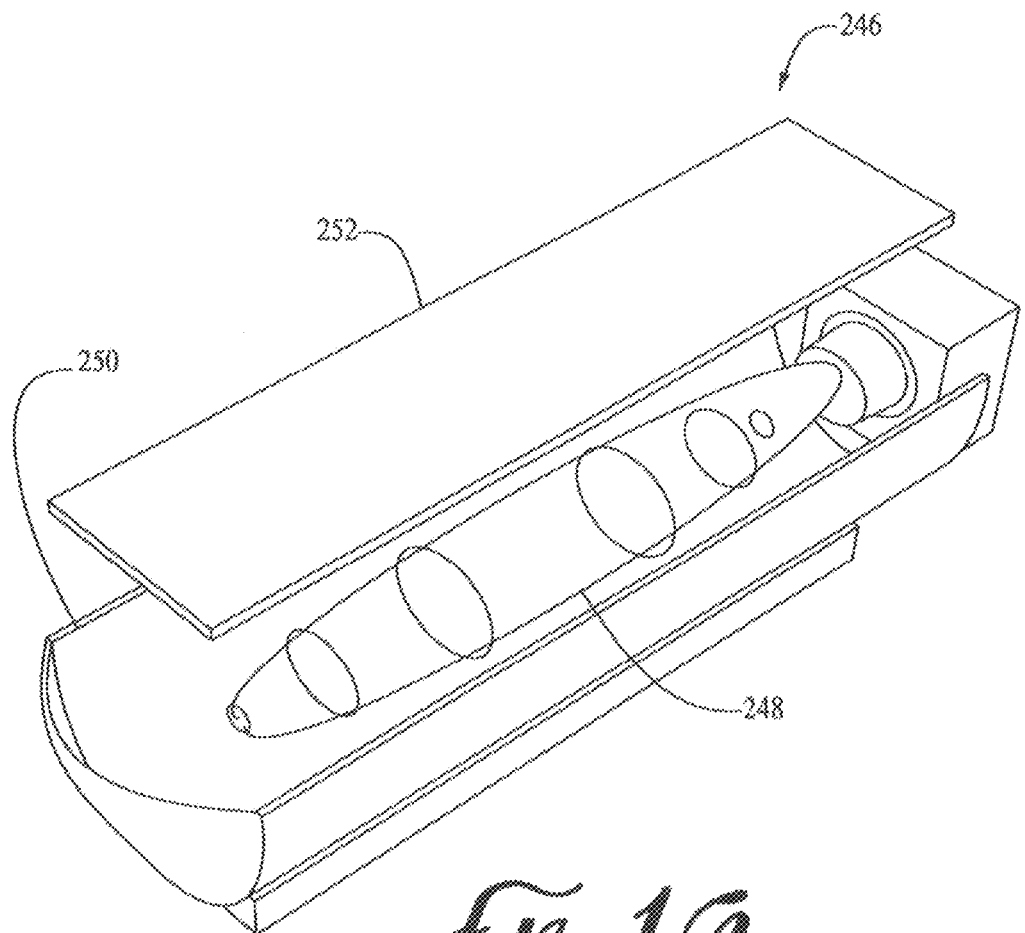
FIG. 16 is an expanded perspective view of another radiation source for a 3D printer incorporating features of the present invention.

FIG. 16 shows an alternative solidification mechanism comprising a board radiation source 246 such as an ultra-high performance (UHP) Mercury Vapor lamp 248. This mechanism uses a convex reflector 250 for focusing the radiation from the source 246 towards a digital mask 252 such as a LCD screen. The digital mask controls radiation passing through according to a pixel matrix programmed to block or transmit the radiation flowing there through.

Figure 17:
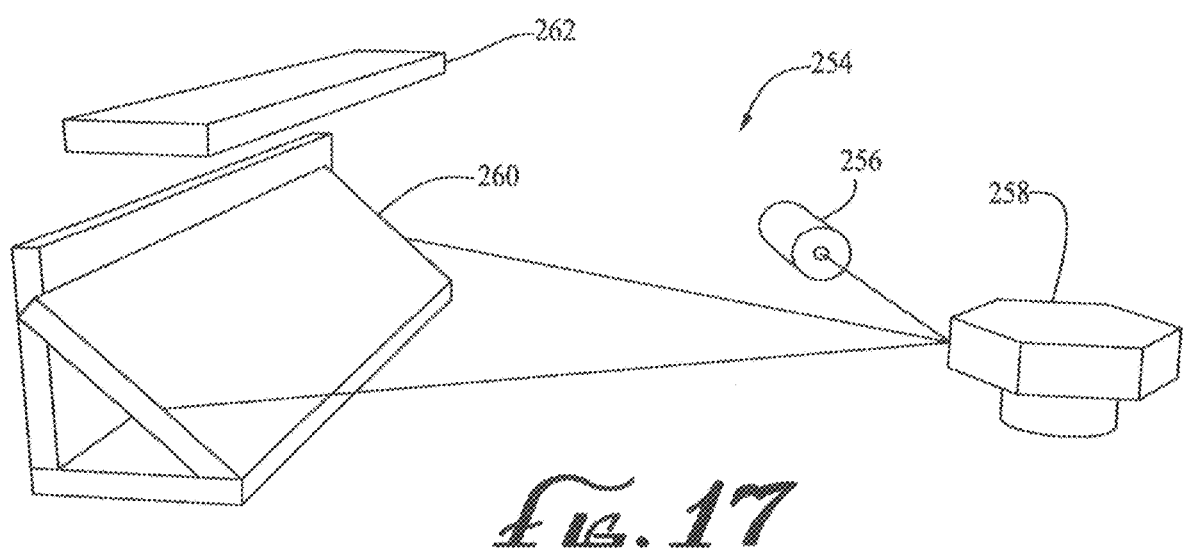
FIG. 17 is a perspective view of a fourth radiation source for a 3D printer incorporating features of the present invention.
Figure 18:
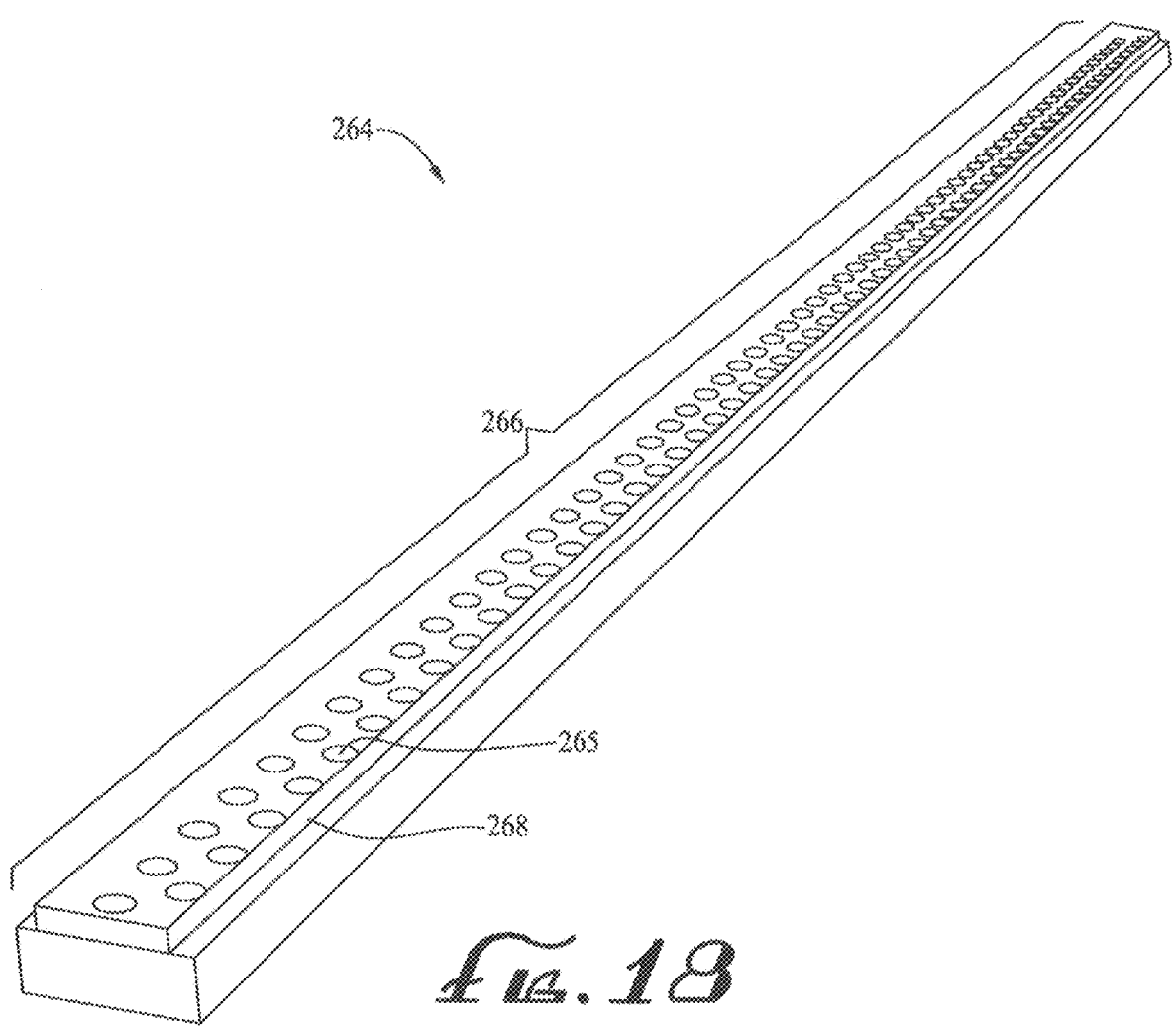
FIG. 18 is a perspective view of a fifth radiation source for a 3D printer incorporating features of the present invention.

FIG. 17 is a further alternative solidification mechanism using a radiation source 254 comprising a high power diode 246 and a motor controlled mirror, such as a polygonal multi-sided mirror 258. The mirror is rotated in relation to the diode, or vice versa, to scan the radiation in a linear direction corresponding to its angle of rotation. A 45° secondary mirror 260 is used to reflect the radiation towards an exposure zone such as the transparent substrate of the cure zone 118. This secondary mirror 260 can be motor controlled to provide a second dimension of scanning. An optics system 262 is also used to correct for distortions and scanning angles. In some FIG. 18 shows further alternative solidification mechanism 264 comprising an array of individually addressable diodes 265 such as a micro-LED array 266, that can be used independently to control the solidification of the construction material 1704. An optic system 268 can also be used to focus the radiation to a desired point size between 5 and 50 nm.

A still further alternative can be to use one or more laser beams, which may or may not require focusing mirrors, as the laser beams can be individually positioned or repositioned as necessary to deliver narrow, pinpoint beams of controlled frequency light to specific target locations.

With reference to FIG. 22 a specific product is constructed utilizing devices incorporating features of the invention. Using the scanning techniques described above, the dimensional features and surface characteristics of a three dimensional object measuring about less than about 10.5 inches in diameter and less than about 9.25 inches tall were scanned and the scanned data relating thereto was stored in the memory of a 3D build system such as shown in FIGS. 1-2. A photo photopolymer, preferably an acrylate methacrylate resin comprising 2-8% of a combination of diphenyl (2,4,6 trimethyl benzoyl) phosphine oxide, Thermoplastic Polyolefin (TPO), and/or Phenylbis (2,4,6-trimethylbenzoyl) phosphine oxide, was added to the material storage area 22. A light source suitable to effectively cure the photopolymer within 3-10 cc/sec comprising an array of micro LED (365-385 nm) to provide irradiation of the polymer over at least about 10.5" width or diameter (approximately 200-300 watts/cm$^2$). Additional light sources, including light sources utilizing one or more vertical-cavity surface-emitting lasers (VCSELs), are discussed in greater detail further herein.

The polymer was metered at a rate of about 3-10 cc per second which is dependent on the dimensions of the object being built distributed onto a 12 inch diameter construction area (cure surface) with a transparent exposure zone, which can be a smaller portion of the construction area, for example, a 1 inch wide portion that is transparent to a certain type of radiation, such as UV radiation, which can be made of glass. This exposure zone had been previously treated with a low adhesion material such as Fluorinated ethylene propylene (FEP) and/or Polytetrafluoroethylene (PTFE), know commercially as Teflon®, to retard or prevent adhesion of the cured polymer to the cure surface. The resultant liquid polymer film was about 20-100 microns thick. The rotation rate of the built platform is primarily dependent on size and density of the product being built and the solidification rate of the material of construction, which in turn is dependent on the intensity and frequency of the irradiation source. The platform was rotated at a rate of 2-12 rpm.

The speed of construction can be enhanced by use of multiple cure areas and multiple feeds. However, construction of a structure is dependent on the size of the structure and the thickness of build material 1704 that can be cured per exposure. A general equation for estimating build speed is as follows:

$$\text{Build Speed} = \frac{1}{(RPM * \text{Number of Radii})} \times \frac{\text{TOTAL HEIGHT}}{\text{LAYER HEIGHT}}$$

Accordingly, for a structure with an intended height of 9 inches (228.9 millimeters) with a layer height of 50 microns (0.05 millimeters), a rotation speed of 5 RPM and a single cure zone, a build time is estimated to be approximately 915.60 minutes, which is approximately 15.26 hours ([1/5] *[228.9/.05]). However, with four cure zones such as shown in FIG. 12B the build time is cut to 25% (approximately 3.8 hours). Depending on the build material 1704 additional cure zones can be added to further reduce the build time.

The method described herein of rotating the build platform 16,18 allows for a larger surface area to be exposed to the electromagnetic radiation used to solidify the deposited photocurable materials resulting in constructing of objects that are larger than the physical dimensions of individual solidification areas, thus allowing the construction of larger objects. By utilizing a small area for solidification, higher resolutions and power densities can be attained by concentrating the number of solidification points to a smaller and denser region, which through rotation, can irradiate entire portions of the build area. This reduced solidification area also results in a greater concentration of radiation to targeted areas which helps to provide a close to instantaneous cure of construction materials 1704, yielding faster construction of an object.

The method of curing or otherwise solidifying material between a build platform 16,18 and another substrate yields greater layer height uniformity, accuracy and consistency. This method also helps prevent errors during layer creation that can result from external factors such as vibration that might have otherwise disturbed materials that were not held in place between two substrates. This translates to greater reliability of the machine with particular benefits in constructing small, ultra high resolution, components so that they can be prevented from being deformed or distorted by internal or external disturbances on the 3D build device.

The problem of part delamination seen in many prior 3D build systems can be caused by forming successive individual layers of material which are inherently structurally weak along their horizontal axis's (i.e., where subsequent layers are in contact). The combined action of forcibly and repeatedly separating the solidified material from a vat floor and inadequate adhesion between layers can result in one or more layers separating causing a failed structure build. In particular, objects that contain dramatic changes in areas of increased solidification can result in fracturing of structurally weak areas that or in highly dense regions of solidified material due to the inability of the structures to provide adequate support and structural integrity and external forces applied to it during the construction process. Increasing the build area in these locations can further exacerbate the problems described above and result in greater risk for printed object fractures via delamination. The process and devices described herein provide reduced surface adhesion between solidified materials and the transparent build and as a result preserve the integrity of delicate geometries that are constructed and enhance the ability to use speeds in the construction process.

Methods incorporating features of the present invention including selectively solidifying the construction material 1704 in a relatively small area comparable to the total construction area serve to reduce adhesion forces by minimizing the physical area that generates the adhesion. The rotational motion of the build platform 16,18 serves to continually remove this adhesion force as it forms preventing adhesion force accumulation. This allows for the construction of a large area with only a small portion of the constructible area ever being subject to the adhesion of material to the substrate at any given time. The transparent substrate be composed of or being treated with non-stick materials, further reduces the effects of adhesion.

Methods which incorporate features of the present invention include rotating the build platform 16,18 about and above the solidification areas, providing for an innovative method for separating cured materials from a build substrate. The circular motion generated by the rotating build platform 16,18 provides a superior separation method that reduces damage to newly solidified material because less force is needed to separate or slide the solidified material off the transparent build substrate and less force is applied to the constructed part. This allows the construction of very delicate geometries that can be unsupported, small, tall, thin or isolated and that could otherwise have been damaged in the separation processes of prior art 3D build systems. The method for continuous or semi continuous construction utilizing a rotating mechanism for dispensing and solidifying of photocurable material against a build platform 16,18 that gradually moves upward along a z-axis results in the creation of at least one continuous spiral or helical shaped layer. This spiral buildup of material results in the formation of an objects with superior layer-to-layer strength characteristics which aides in diminishing the chance for part delamination and results in lower occurrences of failed structures.

The inverted construction process provides several benefits. In several prior art systems an object is built on a platform with a first layer on the platform and subsequent layers are added on top of the prior layers. While some prior systems may use an inverted build, in the present inverted build system, a first layer is continuously applied to a build platform 16,18 and solidified. However, the first layer is also continuously removed as a solid layer from the build platform 16,18 during the build process and new material is fed between the first layer and the build platform 16,18 so as to adhere to the rising prior layer while being continuously removed from the build platform 16,18. It allows for solidification of a large area with a relatively shallow layer of material needed, allowing for less material being used during the process compared to the amount of material needed to fill an entire vat. The vertical and inverted construction process utilizes gravity to drain excess material from previously solidified regions. The ability to form hollow cavities within the structure is very beneficial with regards to materials savings, and producing of objects with internal geometries. The use of a material stripper and drain help to further remove excess material for recycling, thus improving the economy of the machine and preventing the unintentional curing of excess material which can allow production an object that more closely resembles an intended product and has sharper details.

The method of utilizing rotational movement for construction, instead of lateral back and forth motion, as referred as oscillation, provides for increased scalability of the machine. Unlike oscillation, rotational elements that are in continuous motion in one direction do not have compensate for momentum resulting from the oscillating movement. Therefore, a machine that utilizes the described rotational technique can comprise larger and heavier components that would otherwise have significant negative impact on the construction process and operational speed. In this rotational method of construction speed is independent of construction volume. Increasing the size of the construction mechanism and the build platform 16,18 will result in a greater possible build volume, translating to comparatively faster construction from a given volume of material.

Embodiments of the invention are described herein with reference to different views and schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are contemplated to include deviations in shapes that result, for example, from manufacturing.

While devices, systems and methods incorporating features of the present invention are primarily directed to stereolithographic processes using liquid-based building materials. The techniques of the present invention can have application using other flowable materials and appropriate solidification technologies such as selective laser sintering (SLS), for the purposes of enhancing resolution, faster construction times, economic material use and the ability to form hollow cavities in a constructed object that would otherwise be filled with excess construction materials 1704. Such an embodiment can utilize heated construction materials 1704 which are then solidified. The use of a laser diode that emits radiation in the infrared spectrum a construction substrate also transparent to infrared radiation. Thermal and atmospherically control over the material and build chamber 21 is desirable for greater control over the reacting materials in the construction process.

Sintered materials such as metals or powdered polymers can be used with the above process along with a heating and/or radiation source for thermal heating and/or fusing of material. Main differences from the above recited processes can be the possible addition of an atmospheric control system that would fill the build chamber 21 with an inert gas like argon or nitrogen and a thermal control system like infrared heaters. Laser beams can be used to melt and fuse the construction material 1704.

Flowable sinterable materials or additives can also be used as, or as part of, the construction material 1704. The sinterable materials can then be bound in place by the curing of surrounding photopolymers or the melting or binding of a powdered polymers resulting in production of a "green object." This green object then requires the additional steps for converting the green object to create higher part densities, known as post furnace processing which can include unbinding which comprises placing the part in a furnace at a temperature that vaporizes or carbonized the binding material and promotes a controlled shrinkage or necking of the green build material 1704 to hold its shape while forming a solid structure.

Infiltration, which is a process for infusing the formed solid but porous part with another material, filling in the porous voids in the part. This infused material can have a lower melting point then the main construction material 1704. An example of one such material suitable for infiltration is copper. Molten copper can diffuse into iron powder particles creating swelling. By controlling the copper concentration, it is possible to offset the natural shrinkage of iron during sintering to help preserve part dimensions of the green object. Such a process can also be used to form structures from bio-compatible materials which can then be infused with other biomaterials to form biologically compatible implant structures.

Consolidation is a process which can occur during sintering that results in the product shrinking so as to increase the part density.

With the inclusion of a laser of sufficient power, direct thermal sintering of the construction materials 1704 or a concentration of additives contained in a dispensed formulation whose components are capable of fusion to each other and the build platform 16,18 is possible. This embodiment needs greater thermal control of the material and build chamber 21 as well as a means for regulating the atmosphere which would utilize blanketing of the solidification area with inert gases such as nitrogen and argon and a method for removing any gaseous byproducts.

Examples of sinterable additives are: 17-4 and 15-5 stainless steel, maraging steel, cobalt chromium, Inconel 625 and 718, titanium Ti6Alv4, titanium Ti64, Cobalt Chrome Alloy Co28Cr6Mo, Nickel Alloy In718 Theoretically, almost any alloy metal can be used in this process. Sintering typically involves induced binding, liquid phase sintering and/or full melting. These techniques are known in the art.

Figure 19:
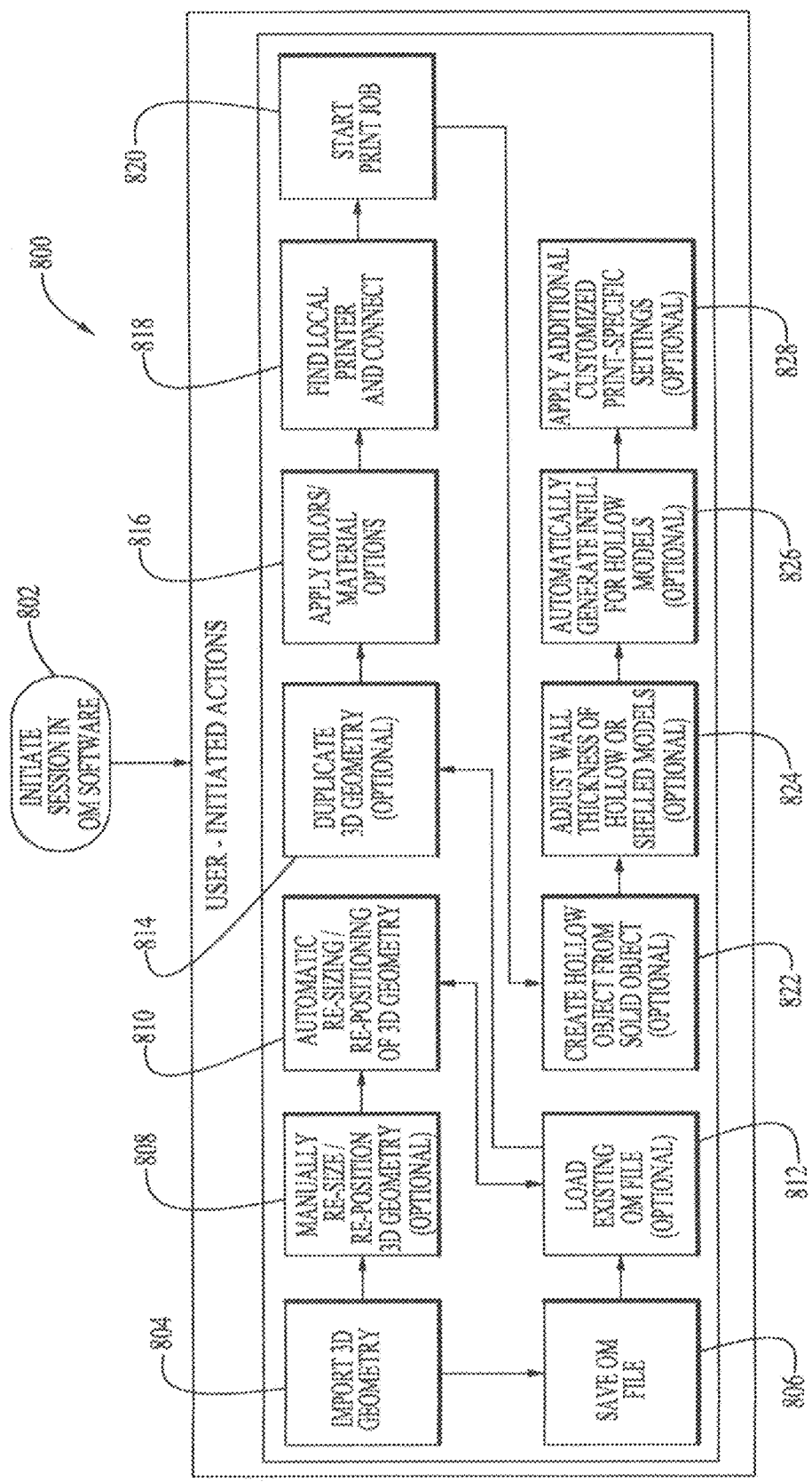
FIG. 19 is a process flow diagram for a specific embodiment for a product buildup using the 3D printer device shown and described herein.
Figures 20, 21:
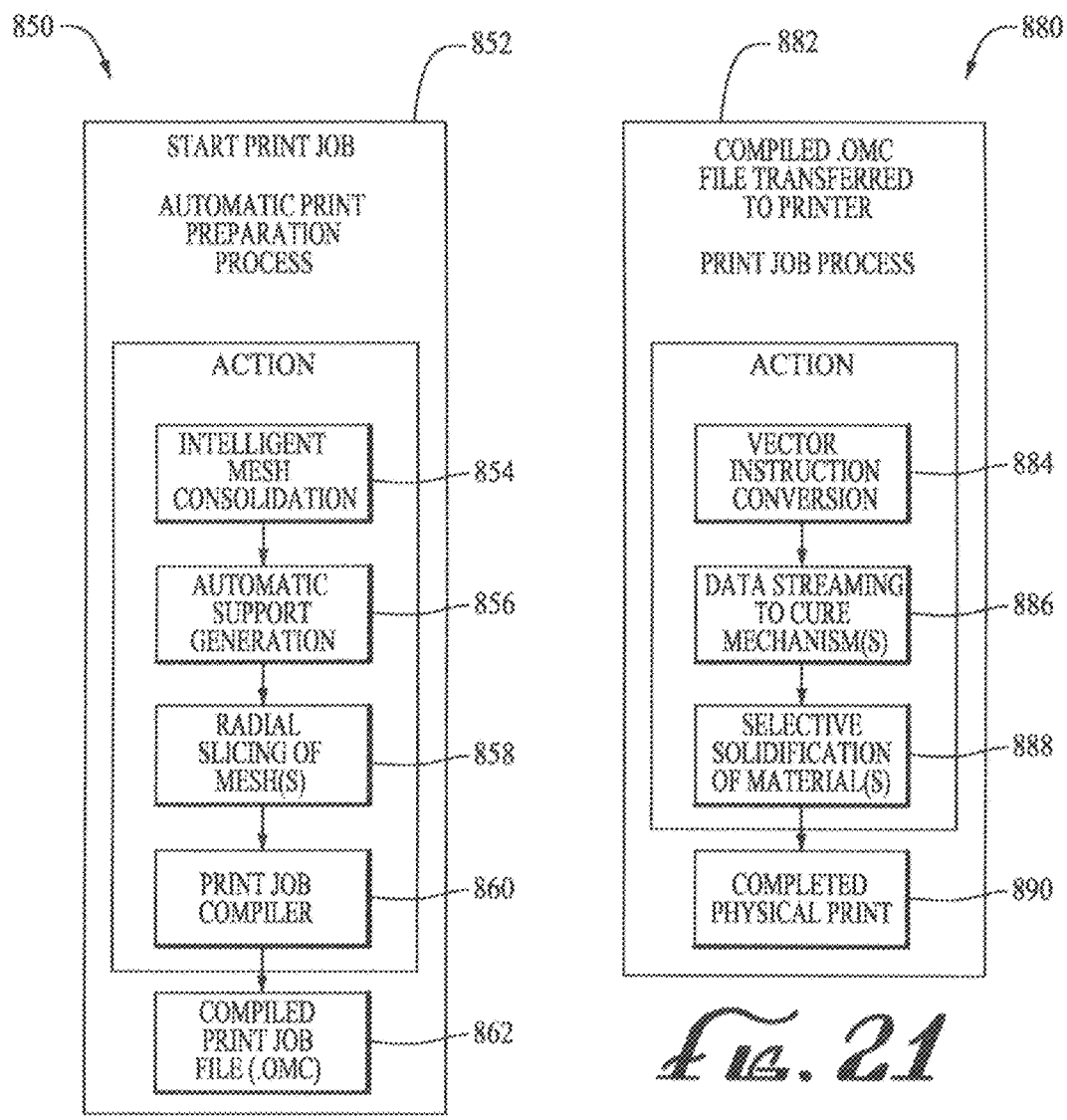
FIG. 20 is a process flow diagram for a specific embodiment for a product buildup using the 3D printer device shown and described herein.
FIG. 21 is a process flow diagram for a specific embodiment for a product buildup using the 3D printer device shown and described herein.

FIGS. 19-21 show a process flow diagram, which can incorporate computer software, for utilizing 3D printing devices incorporating features of the present invention. Regarding FIG. 19, which shows a user-initiated process 800, the session is started in an initiation step 802, which can include the initiation of software, such as OM (an Omicron Compiler File) software or other suitable software. A user can engage in and initiate a series of interrelated user actions. For example, a use can activate an import step 804, wherein the user imports 3D geometry, for example, from existing data or from recently scanned data. From this step, the user can elect to initiate a save step 806, in which the user can save the 3D geometry data, for example, an .OM software file. Alternatively, or in addition to initiating a save step 806, a user can initiate a manual re-size/reposition step 808 of the imported 3D geometry data. The 3D geometry data can then be automatically re-sized/repositioned in an automated adjustment step 810.

At any point, an existing file, for example, an existing .OM file saved in the save step 806 or a manually and automatically adjusted file from the manual and automatic adjustment steps 808, 810 can be loaded into the memory of a user interface in a load step 812. From the load step 812, several additional steps can be initiated. For example, a user can initiate a duplication step 814, wherein one or more aspects of the 3D geometry data can be duplicated. A user can then initiate an application step 816, wherein a user can alter and/or apply colors and other material options to the 3D geometric data. The user can then initiate a connection step 818, wherein the user can locate a local 3D printer and connect, after which the user can initiate a print step 820, wherein the 3D object begins to print.

During the setup process and compiling the print instructions for printing the 3D object in the print step 820, instructions can be provided to produce a solid or a hollow structure and additional steps can be initiated to further define the object. A user can initiate a hollowing step 822, whereby a hollow object is produced instead from, and instead of, an existing solid object. A user can then initiate a hollowness adjustment step 824, whereby the wall thickness of hollow or shelled products can be adjusted. An automated infill step 826 can also be initiated, wherein infill for hollow models is automatically generated. Finally, a user can initiate a customization step 828, wherein additional customized print-specific settings are applied to the 3D object.

It is understood that while the examples cited above specifically refer to .OM files, other software file formats can be utilized. For example, users can import 3D models formatted as AMF, STL, PLY<OBJ, or any other similar file known in the art. Support for auto-detecting colors and/or materials can be included. Each piece of unique imported 3D geometry data can be stored along with the transformation matrix (applied from the origin) and metadata describing color and material selections.

Referring now to FIG. 20, which shows a further process flow diagram 850 incorporating features of the present invention, an automated print preparation (scan) process 852 is initiated by the user or in response to a stimulus, for example, the printer being powered on or receiving a connection signal from a computer or other user interface. In a first step 854, intelligent mesh consolidation of an object being reproduced takes place. In some embodiments, an algorithm is utilized to consolidate all meshes in preparation for slicing. This first step 854 can be used in the production of separate combined meshes each organized by color and material. In a second step 856, the algorithm can, if necessary, automatically generate and add any support structures needed for each combined mesh. In a third step 858, radial slicing of the mesh can occur. In this step 858 one or more algorithms can radially slice the input mesh and produce encoded vector data describing the intended structure to be printed in real-world dimensions utilizing real-world units. This data can be stored and later compiled to machine-specific instructions. Layer height is taken into account at this stage and can be pre-set as a constant value for the entire print or vary throughout the print.

In a fourth step 860, the print job is compiled by one or more algorithms to produce a single compiled (machine-specific) print job file containing all the print information utilized by the printer. In a fifth step 862, this compiled print job file, which can be machine specific is transferred to the printer.

Referring now to FIG. 21, which shows an example of a process flow 880 after a step 882 wherein the print-job file is compiled and transferred to a printer (which can be a continuation of the fifth step 862 in FIG. 20 or proceed directly from a loaded externally or independent provided print file). In a first step 884, an algorithm translates vector instructions from real-world units into a binary arrangement (arrays of individual ones and zeroes) that is used by the printer. In a second step 886, the print processor of the printer streams data bits to the curing mechanism at a hardware-synchronized rate that coincides with the motor/mirror movement. In a third step 888, the actual heliography (curing) process occurs, utilizing continuous computer-controlled selective solidification. In a fourth step 890, a completed physical object mirroring the virtual 3D geometry is produced.

The present disclosure will now set forth various configurations utilizing VCSEL light sources, which have several distinct advantages. Various 3D printing techniques are based on photo-initiation from direct-emitted, single-transverse mode that is focused to a small spot of 1-100 microns diameter to locally start the polymerization process. The energy is absorbed by a photoinitiator, typically but not limited to an organic molecule that absorbs efficiently at the wavelength of interest to create free radicals, which then catalyzes the rest of the reaction—propagation steps, cross-linking and subsequent termination. Different photoinitiators may require different wavelengths of excitation for efficient initiation to take place. This requires a serial solidification process and limits the amount of energy that can be delivered precisely.

3D printing techniques including polymerization of liquid pre-polymer systems, sintering of powder materials, powder w/curable binder, polyjet technologies, etc. have been around for several decades, reaching limitations of scalability. Limiting factors for scaling include the amount of material that can be solidified at any given point in time, which is coupled to the amount of energy that can be delivered in precise quantity, usually done with a point source that is scanned. With this approach, print speed is inversely proportional to complexity because the spot size must be scanned serially point-to-point to cover all areas of the current layer.

Some systems use Digital Micromirror Device (DMD) chips consisting of rectilinear arrays of tiltable mirrors, to expose a plane of pixels at once. This accomplishes parallelization of cure and the entire layer can be exposed in the same amount of time regardless of the specific cross section—however, the energy density delivered to the cure area is an inverse square function, with energy decreasing as the square root of the build area. In practicality, this combined with the power handling limitations of the DMD chip, limits the size of the cure area that can be exposed in a single image without requiring excessively long layer exposure times.

In contrast, the disclosed VCSEL configurations accomplish both parallelization of cure and infinitely scalable energy input by utilizing arrays of semiconductor by utilizing VCSELs to precisely direct energy into the cure area, pixel-for-voxel. These VCSEL arrays are built using standard semiconductor batch manufacturing and processing techniques, and represent significant advancements in light engine scalability, reliability, and ease of processing, when compared to conventional edge-emitting laser systems. Additionally, the light is directly coupled in preferably a 1:1 magnification ratio (or other) from the chip into the cure zone, and as a result does not require complex optical systems to project light from a small source to a large area. The resulting system is extremely compact and optomechanically simplified.

Most solid-state lasers, which are of an edge-emitting structure variety, which are not conducive to assembling large linear areas due to the corresponding difficulties of cleaving and assembly. In contrast, VCSELs can be grown in an array of any size, shape, and quantity on a single die, tested on the die, and then diced into individual chip "tiles" which can then be assembled together to provide a seamless (100% fill factor) linear array of arbitrary size. Semiconductor lasers comprise layers of semiconductor material grown on top of each other on a substrate (the "epi"). For VCSELs and edge-emitters, this growth is typically done in a molecular-beam-epitaxy (MBE) or metal-organic-chemical-vapor-deposition (MOCVD) growth reactor. The grown wafer is then processed accordingly to produce individual devices.

VCSELs, however, are semiconductor lasers, more specifically laser diodes with a monolithic laser resonator, where the emitted light leaves the device in a direction perpendicular to the chip surface. The resonator (cavity) is realized with two semiconductor Bragg mirrors (→distributed Bragg reflector lasers). Between those, there is an active region (gain structure) with (typically) several quantum wells and a total thickness of only a few micrometers.

In most cases, the active region is electrically pumped with a few tens of milliwatts and generates an output power in the range from 0.5-5.0 mW, or higher powers for multi-mode devices. The current is often applied through a ring electrode, through which the output beam can be extracted, and the current is confined to the region of the resonator mode using electrically conductive (doped) mirror layers with isolating material around them. In a VCSEL, the active layer is sandwiched between two highly reflective mirrors (distributed Bragg reflectors, or DBRs) made up of several quarter-wavelength thick layers of semiconductors of alternating high and low refractive index. The reflectivity of these mirrors is typically in the range 99.5-99.9%. As a result, the light oscillates perpendicular to the layers and escapes through the top (or bottom) of the device. Current and/or optical confinement is typically achieved through either selective oxidation of an Aluminum-rich layer, ion-implantation, or even both for certain applications. The VCSELs can be designed for "top-emission" (at the epi/air interface) or "bottom-emission" (through the transparent substrate) in cases where "junction-down" soldering is required for more efficient heat-sinking for example.

In contrast, edge-emitters are made up of cleaved bars diced from the wafers. Because of the high index of refraction contrast between air and the semiconductor material, the two cleaved facets act as mirrors. Hence, in the case of an edge-emitter, the light oscillates parallel to the layers and escapes side-ways. This simple structural difference between the VCSEL and the edge-emitter has important implications.

Since VCSELs are grown, processed and tested while still in the wafer form, there is significant economy of scale resulting from the ability to conduct parallel device processing, whereby equipment utilization and yields are maximized and set up times and labor content are minimized. In the case of a VCSEL (see FIG. 1), the mirrors and active region are sequentially stacked along the Y axis during epitaxial growth. The VCSEL wafer then goes through etching and metallization steps to form the electrical contacts. At this point the wafer goes to test where individual laser devices are characterized on a pass-fail basis. Finally, the wafer is diced and the lasers are binned for either higher-level assembly (typically >95%) or scrap (typically <5%).

In a simple Fabry-Perot edge-emitter, the growth process also occurs along the Y axis, but only to create the active region as mirror coatings are later applied along the Z axis. After epitaxial growth, the wafer goes through the metallization step and is subsequently cleaved along the X axis, forming a series of wafer strips. The wafer strips are then stacked and mounted into a coating fixture. The Z axis edges of the wafer strips are then coated to form the device mirrors. This coating is a critical processing step for edge emitters, as any coating imperfection will result in early and catastrophic failure of the devices due to catastrophic-optical-damage (COD). After this coating step, the wafer strips are diced to form discrete laser chips, which are then mounted onto carriers. Finally, the laser devices go into test.

It is also important to understand that VCSELs consume less material: in the case of a 3" wafer, a laser manufacturer can build about 15,000 VCSEL devices or approximately 4,000 edge-emitters of similar power levels. In addition to these advantages, VCSEL also demonstrate excellent dynamic performances such as low threshold currents (a few micro-amps), low noise operation and high-speed digital modulation (10 Gb/s). Furthermore, although VCSELs have been confined to low-power applications—a few milli-Watts at most—they have the inherent potential of producing very high powers by processing large 2-D arrays. A 2-D VCSEL array with several thousand emitters can emit several hundred watts of total optical power. In contrast, edge-emitters cannot be processed in 2-D arrays.

An important practical advantage of VCSELs, as compared with edge-emitting semiconductor lasers, is that they can be tested and characterized directly after growth, i.e. before the wafer is cleaved. This makes it possible to identify quality problems early on, and to react immediately. Furthermore, it is possible to combine a VCSEL wafer with an array of optical elements (e.g. collimation lenses) and then dice this composite wafer instead of mounting the optical elements individually for every VCSEL. This allows for cheap mass production of laser products. Feature of VCSELs is the long lifetime, as there is no facet which can be damaged by high optical intensities.

Unlike conventional semiconductor lasers, which emit from the side, VCSELs emit from the surface, which allows on-wafer testing arrays of devices. This provides many advantages. The lasing wavelength in a VCSEL is very stable, since it is fixed by the short (1-1.5-wavelength thick) Fabry-Perot cavity. Contrary to edge-emitters, VCSELs can only operate in a single longitudinal mode. Growth technology has improved such that VCSEL 3" wafers are produced with less than a 2 nm standard deviation for the cavity wavelength. This allows for the fabrication of VCSEL 2-D arrays with little wavelength variation between the elements of the array (<1 nm full-width half-maximum spectral width). By contrast, edge-emitter bar-stacks suffer from significant wavelength variations from bar to bar since there is no intrinsic mechanism to stabilize the wavelength, resulting in a wide spectral width (3-5 nm FWHM).

The emission wavelength in VCSELs is ~5 times less sensitive to temperature variations than in edge-emitters. The reason is that in VCSELs, the lasing wavelength is defined by the optical thickness of the single longitudinal-mode-cavity and that the temperature dependence of this optical thickness is minimal (the refractive index and physical thickness of the cavity have a weak dependence on temperature). On the other hand, the lasing wavelength in edge-emitters is defined by the peak-gain wavelength, which has a much stronger dependence on temperature. As a consequence, the spectral line-width for high-power arrays (where heating and temperature gradients can be significant) is much narrower in VCSEL arrays than in edge-emitter-arrays (bar-stacks). Also, over a 20° C. change in temperature, the emission wavelength in a VCSEL will vary by less than 1.4 nm (compared to ~7 nm for edge-emitters).

Additional advantages provided by utilizing VCSEL configurations over edge-emitters include that because VCSELs can operate reliably at temperatures up to 80° C., they can be operated without refrigeration. Thus, the cooling system becomes very small, rugged and portable with this approach. Edge emitters deliver a maximum of about 500 W/cm2 because of the gap between bar to bar which has to be maintained for coolant flow, while VCSELs are delivering ~1200 W/cm2 now and can deliver 2-4 kW/cm2 in the near future. VCSELs emit a circular beam. Through proper cavity design VCSELs can also emit in a single transverse mode (circular Gaussian). This simple beam structure greatly reduces the complexity and cost of coupling/beam-shaping optics (compared to edge-emitters) and increases the coupling efficiency to the fiber or pumped medium. This has been a key selling point for the VCSEL technology in low-power markets. Because VCSELs are not subject to catastrophic optical damage (COD), their reliability is much higher than for edge-emitters. Typical FIT values (failures in one billion device-hours) for VCSELs are less than 10. VCSEL do not have the failure mode of traditional edge emitting diodes such as line defects.

Manufacturability of VCSELs has been a key selling point for this technology. Because of complex manufacturing processes and reliability issue related to COD (catastrophic optical damage), edge-emitters have a low yield (edge-emitter 980 nm pump chip manufacturers typically only get ~500 chips out of a 2" wafer). On the other hand, yields for VCSELs exceed 90% (corresponds to ~5000 high-power chips from a 2" wafer). In fact, because of its planar attributes, VCSEL manufacturing is identical to standard IC Silicon processing. Enables the use of traditional semiconductor manufacturing equipment to keep fabrication costs down. This also allows for good integration ability, as VCSEL are compatible with detectors and other circuitry. VCSELs can also be tested and burned in while still in wafer form, which increases the manufacturing yield and lowers cost. For high-power applications, a key advantage of VCSELs is that they can be directly processed into monolithic 2-D arrays, whereas this is not possible for edge emitters (only 1-D monolithic arrays are possible). In addition, a complex and thermally inefficient mounting scheme is required to mount edge-emitter bars in stacks. Mounting of large high-power VCSEL 2-D arrays in a "junction-down" configuration is similar to micro-processor packaging, making the heat-removal process very efficient, as the heat has to traverse only a few microns of AlGaAs material. Record thermal impedances of <0.16K/W have been demonstrated for 5 mm×5 mm 2-D VCSEL arrays. With the simple processing and heat-sinking technology, it becomes much easier to package 2-D VCSEL arrays than an equivalent edge-emitter bar-stack. The established existing silicon industry heat-sinking technology can be used for heat removal for very high power arrays. This will significantly reduce the cost of the high-power module. Currently, cost of the laser bars is the dominant cost for the DPSS lasers.

The most common emission wavelengths of VCSELs are in the range of 750-980 nm (often around 850 nm), as obtained with the GaAs/AlGaAs material system. However, longer wavelengths of e.g. 1.3, 1.55 or even beyond 2 µm can be obtained with dilute nitrides (GaInNAs quantum wells on GaAs) and from devices based on indium phosphide (InAlGaAsP on InP). The use of these wavelengths can be employed to thermal cure, sinter, melt, or cause photo curing with appropriate photoinitiators that produce free radicals in those wavelengths. Harmonic Generation via crystal nonlinear processes can create other shorter wavelengths that otherwise may not be produced directly from the semiconductor. Using nonlinear crystals such as KTP, MgO, PPLN, etc—conversion is proportional to intensity and the crystal structure allows, via varying periodicity of phase within crystal, tuning of the optical resonance of the crystal to achieve different output wavelengths. For a given VCSEL, simply changing the nonlinear crystal can change the output wavelength. For example, an 808 nm source could be doubled into a 404 nm output, or tripled into a 269 nm output, etc., simply by changing the crystal material, or a 976 nm source could be doubled to 488 nm. Other solid-state direct-emissive sources such as micro LED are limited in power and beam quality or coherent output capability. MicroLEDs typically will have a Lambertian intensity distribution from the emitting surfaces, which need collecting and focusing options with high NA to gather light and direct a small spot into the system. VCSEL lasers represent a much closer realization to a perfect point source and can be efficiently collimated and focused to a small spot size without requiring expensive (high-NA/high collection) optical systems.

In addition to the high beam quality of low-power VCSELs, an important aspect is the low beam divergence, compared with that of edge-emitting laser diodes, and the symmetric beam profile. This makes it easy to collimate the output beam with a simple lens, which does not have to have a very high numerical aperture. Due to the fact that the VCSEL sources are much closer to an ideal light source, relatively inexpensive optics (microlens arrays or equivalent) with equivalent center-to-center pitch placed over top of the VCSEL emitter die can be used to create the proper focused spot.

Figure 23A:
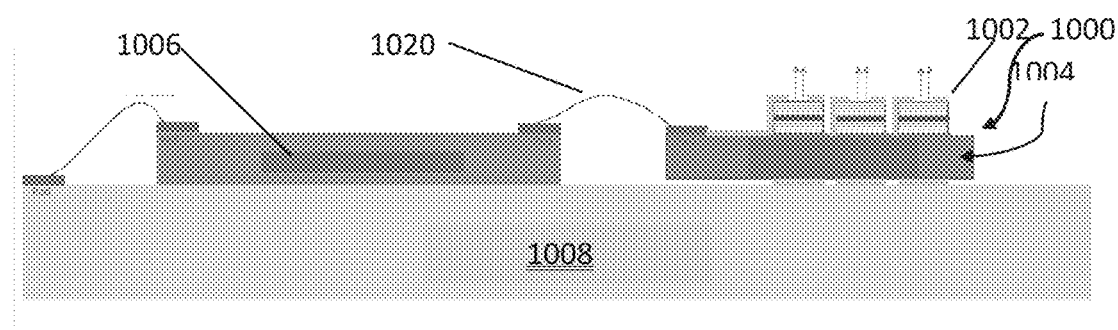
FIG. 23A shows a front sectional view of a first VCSEL chip configuration embodiment incorporating features of the present invention.
Figure 23B:
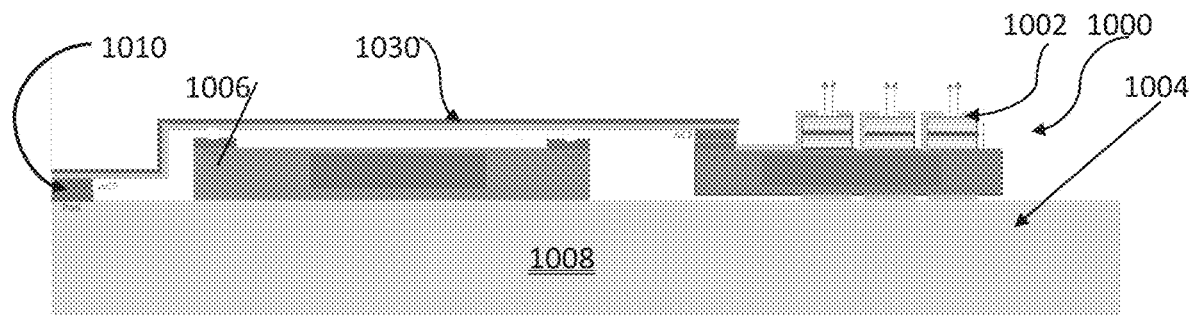
FIG. 23B shows a front sectional view of a second VCSEL chip configuration embodiment incorporating features of the present invention.

Specific embodiments utilizing VCSEL configurations integrated into 3D printing systems will now be described. Each of these light sources can be utilized and integrated into 3D printing systems, including any of the 3D printing systems disclosed herein and can replace the light sources disclosed above. FIGS. 23A-B show a chip-level sectional view of example configurations between chip-level the VCSEL light sources and the control drivers. FIGS. 23A and 23B show a VCSEL chip 1000 comprising one or more VCSEL emitters 1002 (three shown) on a common substrate 1004. A control driver 1006 is external to but communicatively coupled to the VSCEL chip 1000. Both the VSCEL chip 1000 and the control driver 1006 are bonded to a common heat spreading substrate 1008. In both FIG. 23A and FIG. 23B, the control driver 1006 is external to, and not in direct physical contact with, the VCSEL chip 1000. In FIG. 23A, the control driver 1006 is electrically communicatively coupled to both a contact 1010 by one or more wire bonds 1020 (two shown). In FIG. 23B, the control driver 1006 is electrically communicatively coupled to both a contact 1010 by one or more conductive bridges 1030 (one shown). Specific driver configurations are described in greater detail further herein.

Figure 24A:
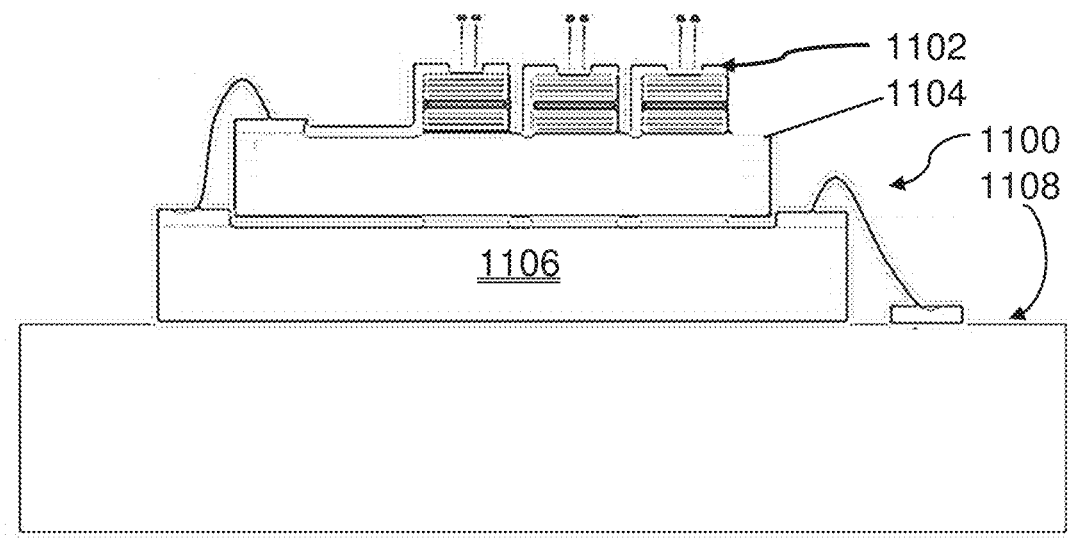
FIG. 24A shows a front sectional view of a third VCSEL chip configuration embodiment incorporating features of the present invention.
Figure 24B:
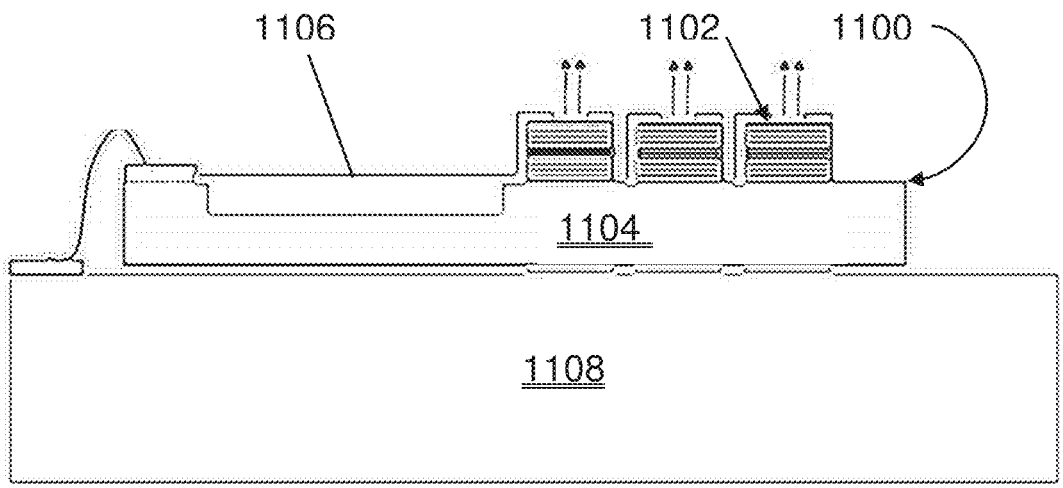
FIG. 24B shows a front sectional view of a fourth VCSEL chip configuration embodiment incorporating features of the present invention.

FIGS. 24A-B show a chip-level sectional view of example configurations between the VCSEL light sources and the control drivers. FIGS. 24A and 24B show a VCSEL chip 1100 comprising one or more VCSEL emitters 1102 (three shown) on a common substrate 1104. A control driver 1106 is communicatively coupled to the VSCEL chip 1100. Both the VSCEL chip 1100. The VCSEL chips 1100 are in thermal communication with a heat spreading substrate 1108. In contrast with FIG. 23A and FIG. 23B, the control driver2 1106 are in direct physical contact with the VCSEL chips 1100. In FIG. 24A, the control driver 1006 is stacked with the VCSEL chip 1100. In FIG. 24B, the control driver 1106 is integrated into the substrate 1104. The integrated monolithic driver 1106 of FIG. 24B provided a cost-effective integrated package.

Using VCSEL technology, a driver can be either external (e.g. CMOS ASIC) or can be integrated directly into the GaAs wafer for a completely monolithic structure. The latter offers benefits in terms of integration flexibility, reduced cost, fewer interconnects, increased reliability. Temperature sensing junctions could also be integrated into the die to allow precise feedback and control of the emitter temperature—for precise wavelength tuning/stabilization. This has applications for ensuring efficient second harmonic generation (SHG) processes. Other benefits of temp sensing junctions placed sparsely along the array include the ability to closely monitor and control emitters. Ability to overdrive specific emitters or emitter groups without negatively affecting the chip as a whole.

In some embodiments, each of the numerous emitters on the VCSEL chip is addressed individually channel-for-channel through direct connection to a configurable Complementary metal-oxide-semiconductor (CMOS) application specific integrated circuit (ASIC) driver chip functioning as a specialized n-channel constant-current input/output (I/O) expander, which is controlled via serial low-voltage differential signaling (LVDS) from the main system field-programmable gate array (FPGA). The CMOS driver chip provides the main FPGA an interface to control each channel with 10-bit control of current and 10-bit control of the duration of that current, yielding a total of 20 bits of exposure control per channel.

Figure 25:
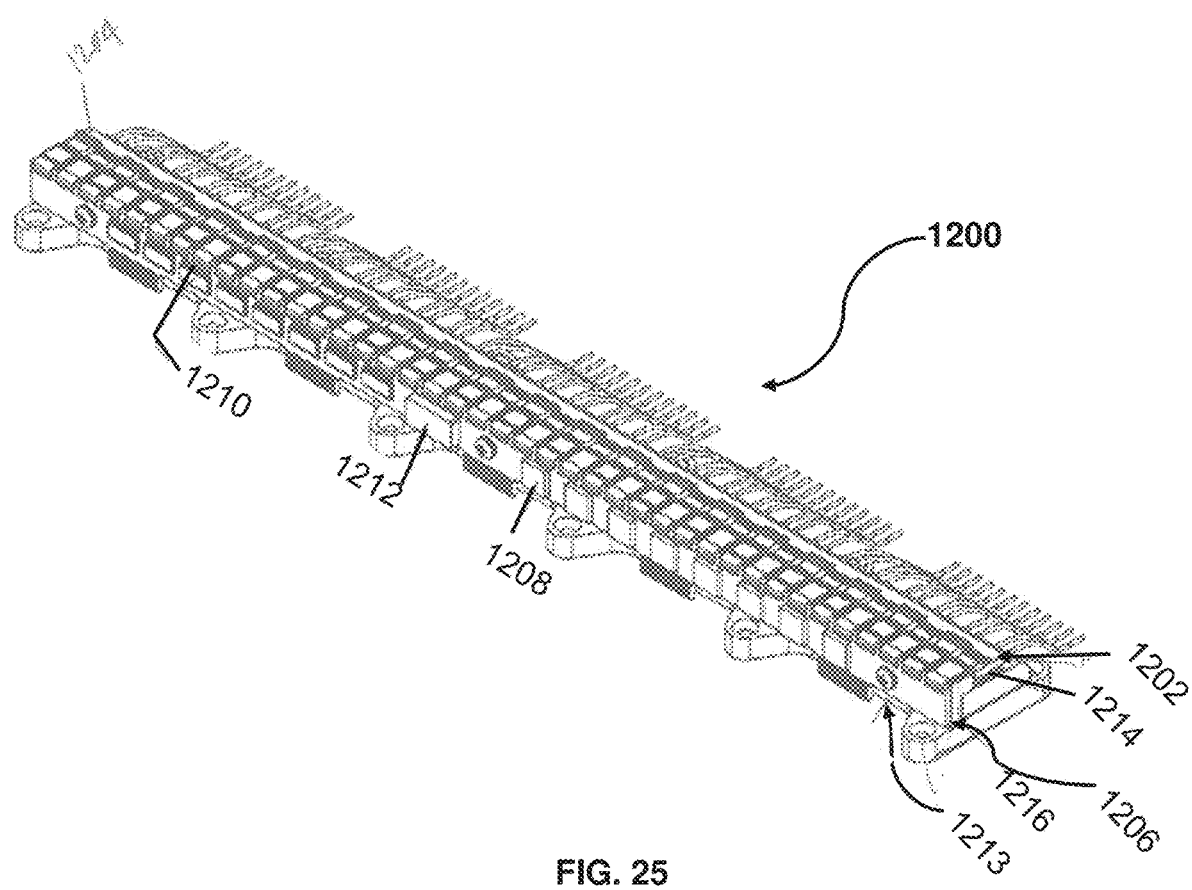
FIG. 25 shows a front perspective view of an embodiment of a print head with an integrated VCSEL array incorporating features of the present invention.

FIG. 25 shows a print head 1200, with one or more VCELs 1202 arranged thereon (a plurality in array shown). In the embodiment shown in FIG. 25, the VSCELs are arranged in a staggered array. The print head 1200 can comprise similar structure, materials and configuration as any of the materials dispensers 180, 184 described earlier herein. The print head 1200 can further comprise a VSCEL substrate 1204, which can be similar to the substrates 1004, 1104 described above with reference to FIGS. 23-24. The print head 1200 can further comprise VSCEL drivers 1206, similar to the VSCEL drivers 1006, 1106 described above with reference to FIGS. 23-24, which can be near and communicatively connected to the VSCELS 1202. The print head 1200 can also comprise memory, with the embodiment shown comprising driver random access memory (RAM) 1208 and flash memory 1210. The print head 1200 can also comprise an FPGA 1212 to provide further control over the VCSEL functions. The memory and processing components of the print head 1200 can be integrated into a print head printed circuit board (PCB).

VCSEL chips in an array may be staged from one another, for example, as shown in FIG. 25, and/or individual VCSEL emitters within the chips can be staggered from one another. The stagger of the VCSEL chips and emitters can be designed and optimized for factors such as, designed optics, emitter size and energy, fill factor, optical system, spot size, cooling, tiling strategies, overcoming dead or inactive emitters. Alternatively, the VCSEL chips can be configured in a non-staggered or linear array.

The print head 1200 in FIG. 25 can also comprise cooling elements, which are useful to provide cooling when a high-powered VSCEL array is utilized as a curing system. Some cooling elements the print head 1200 can comprise include a thermoelectric cooler (TEC) 1214, for example, a Peltier cooler, and thermal conduction modules 1216, which can sense temperature changes and electrically communicate with drivers controlling the TEC 1214. In the embodiment shown in FIG. 25, heat that is generated in the VSCEL emitter zone can be drawn through the VSCEL substrate 1204 and into a heatsinking mechanism. Some example heatsinking mechanisms include, for example, microchannel plates, Peltier coolers, air heat exchanger, or other heatsink methods. As discussed above, the TEC 1214 is the heatsink mechanism utilized in the embodiment of FIG. 25.

Heat loads on the print head 1200 are time-varying and print-specific. For example, a single emitter or 1,000 emitters could be active at any given moment to replicate a portion of data in physically cured polymer. Precise knowledge of local temperature allows optimization of print speed for a given object. The thermal management system is able to respond to changing heat loads on a timescale sufficient to ensure the junction temperature of the VCSEL chips 1202 stays within a narrow temperature window during operation to ensure stable wavelength and efficient SHG. The CMOS ASIC drivers have a more relaxed thermal operating window, requiring the junction temperature to remain below 125 C.

Utilizing a TEC to reduce the time constant of the cooling feedback loop allows the system to respond much faster to varying heat loads electrically and maintain a constant chip temperature. A general model of the system can be constructed, and used at run-time in conjunction with queued array data and a heat transfer function of the VCSEL emitter to feed-forward thermal control into the closed-loop system and help achieve tight response times.

This means that the system is not as reliant on the coolant loop to maintain the proper temperature—only to remove heat from the system in whatever quantity it is present at the hot end of the TEC. In order to minimize thermal resistance across the system and maximize thermal control loop response times, the number of thermal interfaces between emitter and ultimate heat removal is kept to an absolute minimum. Each thermal interface is joined with high-quality thermal paste or epoxy, which in some embodiments, comprises a layer that is 0.001" or thinner. A further benefit of the TEC-based system is the ability to pre-heat the VCSEL chips to 75 degrees Celsius for optimally-efficient SHG when first starting a print. Tight real-time control over heat flow through the system—VCSEL junction temperature should ideally be controlled to within under 5 degrees Kelvin. Care must be taken with placement of the temperature sensors to ensure accurate feedback. In some embodiments, temperature sensing junctions should be integrated directly into the VCSEL die for maximally-accurate feedback.

Figure 26:
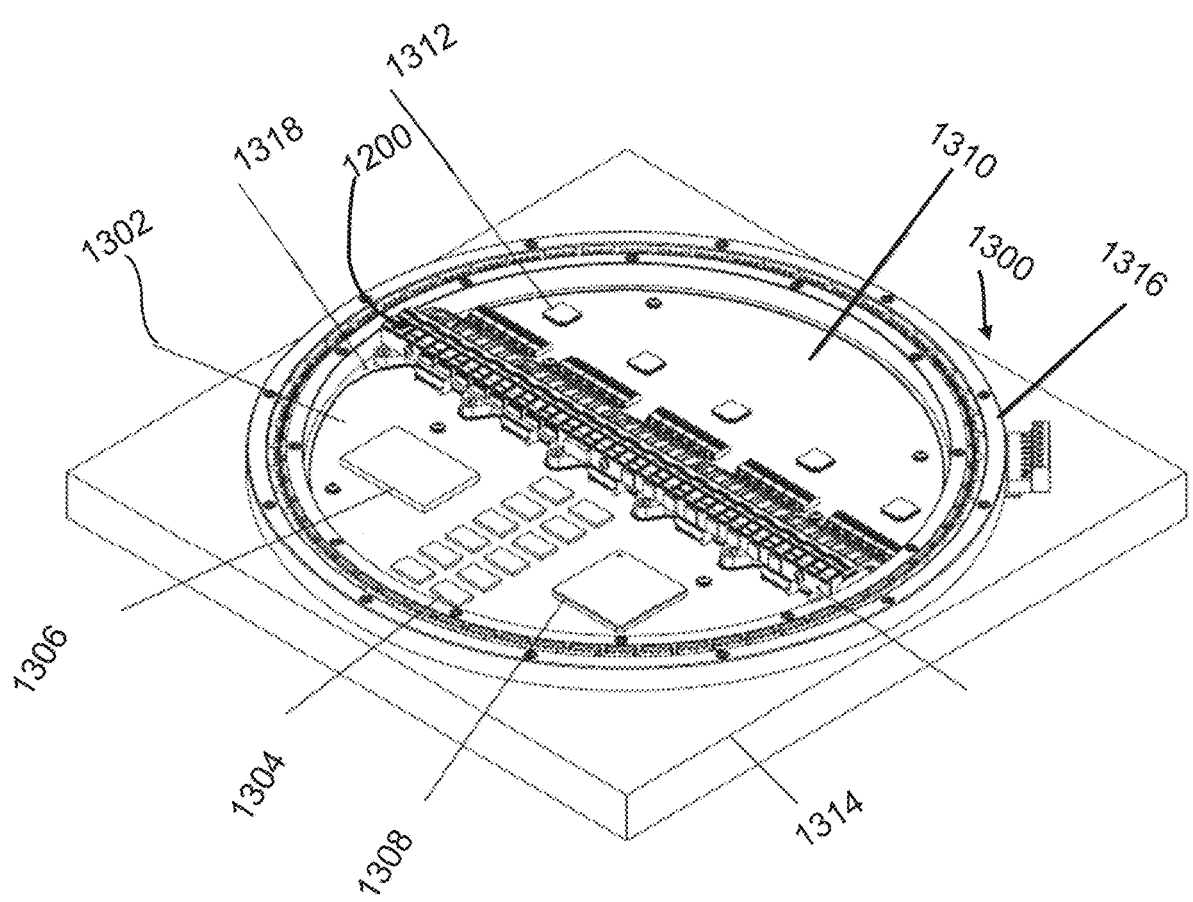
FIG. 26 shows the print head of FIG. 25 incorporated with rotational components to form an embodiment of a rotatable print head platform structure incorporating features of the present invention.

FIG. 26 shows the print head 1200 of FIG. 25 integrated into a rotatable print head platform structure 1300. The rotatable print head platform structure 1300 can comprise a print head main printed circuit board (PCB) 1302, which is coupled to the print head 1200, a main random-access memory 1304, a microprocessor 1306, a secondary controller 1308 (for example, a Flexray® controller), and a TEC controller PCB 1310 coupled to one or more TEC controllers 1312. Each of these structures can be mounted to a fixed base 1314, which can be configured with the above features to form a rotatable configuration utilizing a rotation motor 1316 and a rotary table 1318.

The rotation motor 1316 and the rotary table 1318 can comprise a rotational configuration similar to that of the build platform 16,18 herein. The resulting rotating VCSEL array provides necessary energy density at simultaneous point on a radial in a rotary system to induce close to instantaneous solidification of material, allowing for faster printing and the ability to solidify a greater range of materials with higher energy levels to induce a phase change. The print head 1200 on the separate rotary scanning system exposes larger areas, or increases the print speed of the system without increasing the rotational speed of the rotating build plate (described above). This allows the speed of rotation of the build plate to be optimized for adhesion removal, material distribution, or other factors without sacrificing print speed. This also allows for greater energy VCSELS to be used where if high enough energies were attained beyond the optimized build plate speed this energy can now be utilized through rotational scanning. A rotating light source also removes the need to have multiple fixed position polarly arranged arrays, which reduces cost of the machine and increase the number of possible cure zone areas as the position of the rotating light source is now configurable. Allows for printing in continuous and semi-continuous motion where some materials may have a longer cure reaction necessary for the build plate to be stationary before it moves.

It is important to note that while the present disclosure focuses on a rotating build plate and a rotating radiation source in the form of the VCSEL array, the rotating radiation sources disclosed here can be utilized in 3D printing systems without a rotating build platform 16,18, for example, stationary build plates. Furthermore, the rotating radiation source and the rotating build plate can be controlled separately or together and can comprise their own associated drivers. In some embodiments, the rotating radiation source and the rotating build plate can be configured to have different characteristics including rotational and angle characteristics and/or different speeds.

A rotating light source also opens up the option for various cure zone geometries as shapes to be used rather than simple pie shapes or radials. Individual islands or different vats with different cure zone geometries optimized for different materials with consideration of fluid dynamics based on viscosity or particle size, adhesion characteristics, allows for greater variety of vat segmentation for multiple materials (this compares to fixed VCSEL or a linear or rectilinear light source like laser with single galvo or projection system).

Figure 27:
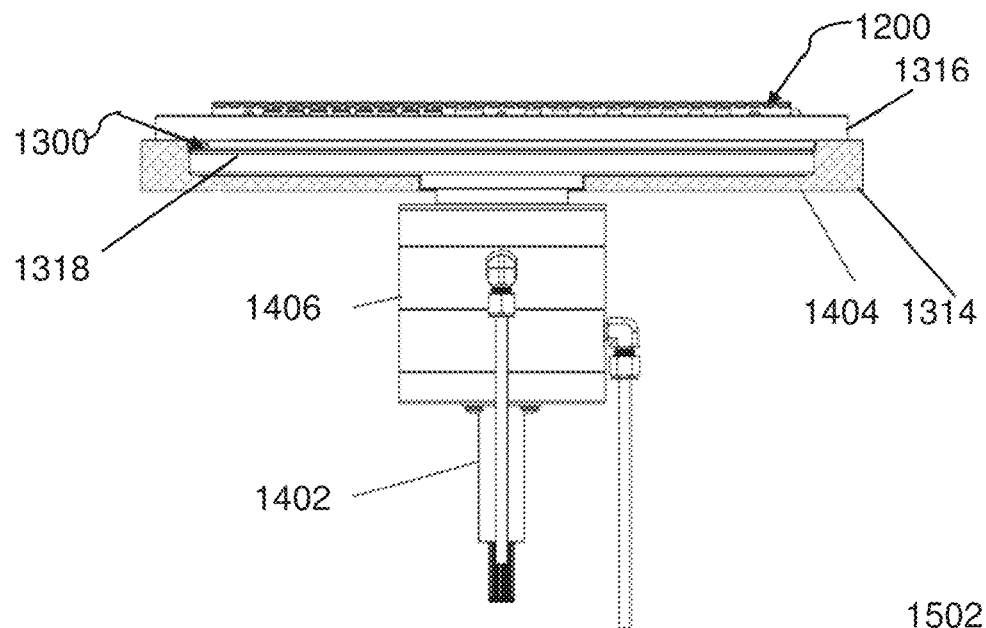
FIG. 27 shows a side view of the rotatable print head platform structure of FIG. 26.

FIG. 27 shows a side profile view of the rotatable print head platform structure 1300 of FIG. 27, which can comprise the print head 1200, the fixed base 1314, the rotation motor 1316, the rotary table 1318, a multichannel slip ring 1402, and a rotation bearing 1404. As can be seen in FIG. 27, The rotation motor 1316, is configured to impart rotary motion to the rotary table 1318 relative to the fixed based 1314. The rotary table 1318 is rotatably affixed to fixed base 1314 through the rotation bearing 1404. Power and signals are transferred to rotatable print head platform structure 1300 through the multichannel slip 1402.

In some embodiments rotatable print head platform structure 1300 further comprises a fluid delivery system for liquid cooling of the thermal conduction modules of the print head 1200, in which a cooling fluid, for example, water or any known cooling fluid, is conducted through a rotational fluid coupling 1406, for example, from a fluid cooling reservoir 1407. In some embodiments, such as the embodiment shown in FIG. 27, the heat sinking system utilized is not only a TEC, but is instead a hybrid thermoelectric/fluid cooling system. In this hybrid system, the heat produced by a VCSEL array is spread out via its heat spreader submount to the cold side of a TEC module heat pump. Geometry of the VCSEL heat spreader submount can be optimized using FEA techniques to ensure optimal heat throughput and even temperature profiles. One or more thermoelectrically-cooled submount modules are positioned with their hot sides on a larger water-cooled base block according to optical and electronic design considerations. Rotational fluid coupling allows for the liquid cooling of the print head while it rotates. Cooling fluid can be pumped into the outer portion of the print head 1200 to allow for the coldest fluid to be introduced to the outer emitters, which will be generating more heat than the inner emitters.

May different VCSEL array configurations are possible incorporating features of the present invention, both integrated into and separate from, a print head. FIG. shows a light engine 1500, featuring an 8-zone light engine structure. The light engine 1500 comprises arms 1502 (8 shown), upon which VCSEL arrays 1504 are arranged. The light engine 1500 can be configured with the same cooling features and/or the rotational features as the print head 1200 described above.

Figure 29:
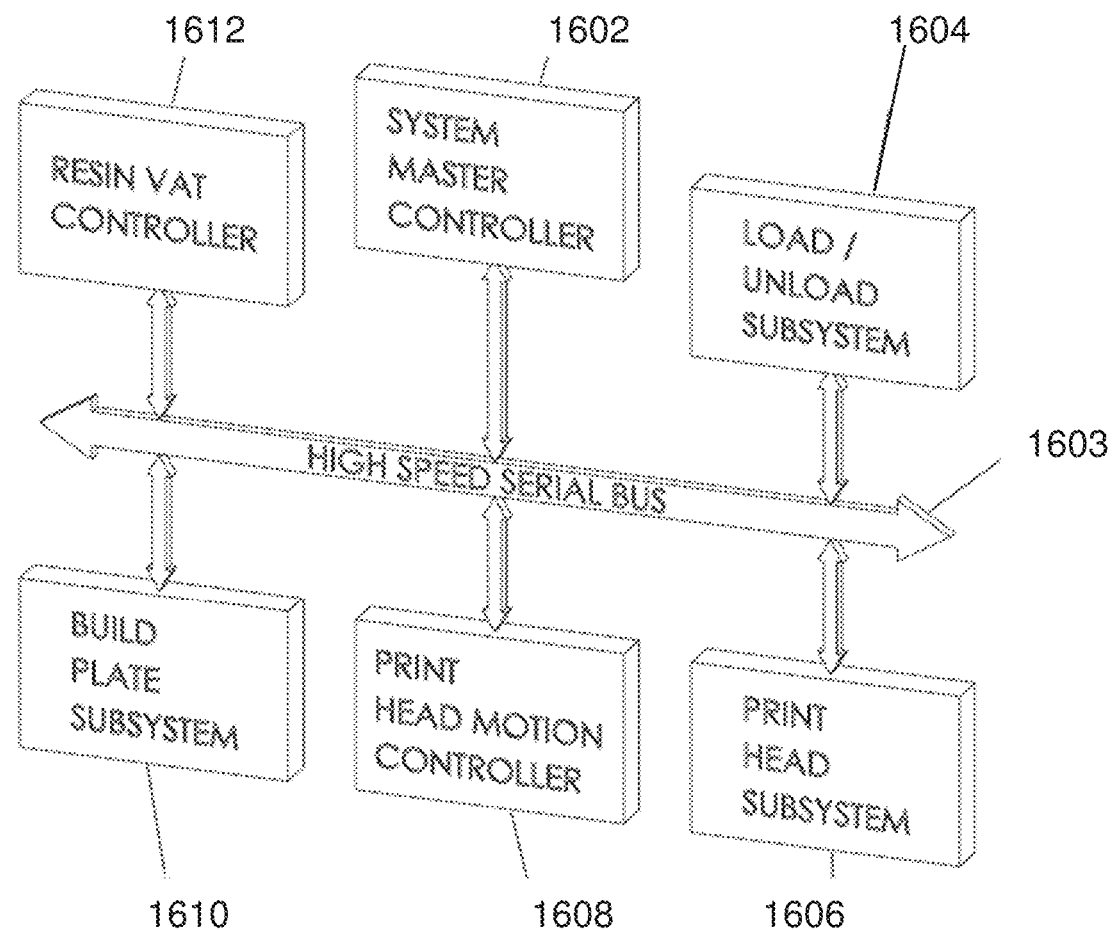
FIG. 29 shows a schematic diagram of an example operational configuration for a VCSEL light source printing system incorporating features of the present invention.

Various overall operational control schemes can be utilized with embodiments of VCSEL light sources incorporating features of the present invention. FIG. 29 shows an example operational configuration 1600, wherein a system master controller 1602, for example, a computing device such as a memory in communication with a processor, is configured to send commands to various subsystems and controllers and to receive user and machine inputs and deliver print specific data to print head subsystem. In some embodiments, the system master controller 1602 is communicatively coupled to the other subsystems and controllers via a high-speed serial bus 1603. A load/unload subsystem 1604 is configured to handle loading and unloading of the build plate to and from the machine.

A print head subsystem 1606 is configured to receives print-related data from system master controller, process this information to produce individual emitter pulses, to sense thermal condition of the array and feed info back to print head micro controller or system master controller. This information is processed and used to regulate array temp. The print head subsystem 1606 is configured to receive print data from system master controller, store print data in local memory, and send data to VCSEL drivers (where the VCSEL drivers covert this data into pulse commands for the individually addressable emitters which solidifies materials associated with desired 3d object). The print head subsystem 1606 also utilizes thermal sensors and relays information to print head driver FPGA and on to printhead subsystem microcontroller. This information can be processed at a microcontroller or passed to system master controller to regulate print head operations. Regulation is achieved through the adjustment of voltages of the TAC coolers by the TAC cooler controllers, which receive the adjustment commands from the FPGA, print head microcontroller or system maters controller. In some embodiments, a secondary controller, similar to secondary controller 1308, such as a Flex Ray® controller, sends and receives information to and from the system master controller.

A print head motion controller 1608 is configured to receive print level data for controlling the rotatory and linear advancement of the build plate, receive information from position sensors to monitor build plate theta and z-access distance, and to receive torque data. A build plate subsystem 1610 is configured to provide control to the build plate. A resin vat controller 1612 is configured to control and monitor the print-materials storage portions of the device.

Described herein are embodiments and materials suitable for creating trackable and identifiable parts constructed by a 3D printer. This provides an ability to render a manufactured part traceable, and certifiable as made from a specific material and or from a specific machine, and/or from a specific batch of build material 1704 and constructed parts, as well as additionally embedding specific information pertaining to the specific part made in a batch of parts.

With the greater adoption of additive manufacturing and the increasing prevalence of 3D scanners allowing individuals to capture the shapes and features of physical objects coupled with the already wide spread use of peer to peer data sharing and online 3D model file sharing sites currently available, the ability to copy and distribute physical objects represents a major concern for the uncontrolled dissemination and distribution of counterfeit part, parts not in compliance with regulatory and manufacturing standards, and products infringing ideas and inventions protected by patents, copyrights and trademarks.

Additionally, as new additive manufacturing processes and materials become available the ability to track the origin of parts and the materials of construction is critical to the establishment of reliable standards for the performance of the 3D manufactured products. The establishment of these emerging industrial standards and the ability to certify a part was created using a certified machine and authorized materials is critical for quality and product liability control, particularly for regulated industries such as the vehicle, aeronautical, dental, and medical industries.

Described herein are several methods and materials that can be used to render a part created though additive manufacturing, traceable without substantially effecting the structure or ascetics of a part. In a preferred mode two or more methods are combined to provide greater capability of identifying and tracking the tagged items. The information can be embedded in a hidden and readily retrievable manner even if a part is significantly damaged or pieces are missing. These methods, materials, and techniques are not limited to a particular additive manufacturing processes or the equipment or system used to produce the 3D objects, and thus have broad application.

The materials and methods described create a wide range of options that can be selected to allow for the creation of a rich library of uniquely identifiable signatures while also allowing for specific materials that are most suitable for their utilization in various 3D printing/additive manufacturing methods, so as not to affect the printing process or performance of the objects produced.

In one embodiment the information can be encoded in the fabricated object as a unique spectral signature created through the absorption, reflection, absorbance and re-emittance of a spectral signature or florescence of the specific additive materials or combination of materials and/or structures within the build materials 1704 used for construction. The encoding can be detected by using appropriate stimulation, such as electromagnetic, thermal, or chemical stimulation, and then recording detected emissions using appropriate sensors for retrieving that information. Specific materials or combinations of materials with unique detectable signatures can be added into a build material 1704 used in the construction by additive manufacture of the three-dimensional objects or those unique detectable signatures can be applied to the 3D object after formation by coating the object, after it is produced, with the materials providing the unique signature.

It is also possible to generate additional information density in a part by selectively dispensing this material at various location and intervals during a printing process such as shown in FIG. 33A and FIG. 33B so as to create localized embedded materials to produce a 2nd level of coding in the form of banding lines or segments of lines through multiple layers of an object being produced. The materials can also be dispensed with greater control to also create more sophisticated arrangements and markings within an object at it is produced.

Some specific materials that can be added include:
Dyes
    Florescent, absorbent, reflective
Color changing materials in response to
    Changes in PH or other chemical process
    Changes in temperature
Magnetic particles
    Change in orientation With reference to FIGS. 30A, 30B, 30C, 31 and 34, further level of control can be obtained by inducing one or more materials 1700 that change orientation during the printing process, said change providing a detectable signature, or provide additives which have combined spectral and orientation changes. This can allow for greater information density to be encoded into a material beyond just detecting the materials themselves.

One embodiment for producing the varying orientation is to include in the build material 1704 magnetic, paramagnetic or superparamagnetic materials that can respond to magnetic stimulation (referred to as magnetic particles 1700). By adjusting the magnetic stimulation applied to these materials in the exposure zone their orientation can be changed prior to the build material 1704 being solidified locking the orientation in place such as shown by the oriented magnetic materials 1702 inside the 3D printed object, also as shown in in FIG. 30A-30C. An embodiment would include a magnetic field responsive, two sided and dual colored particle known as Janus particles (Walter, Andreas; Müller, Axel H. E "Janus Particles: Synthesis, Self-Assembly, Physical Properties, and Applications" *Chem. Rev.* (2013), 113, 7, pp. 5194-5261; Incorporated herein by reference). Each of the sides of the particle are associated with a magnetic polarity. By changing the polarity of the magnetic field around the particles, the particles turn over or turn end-to-end (flip their orientation) to reveal the color dominated by the other side of the particle or opposite ends of the particle.

In another embodiment magneto chromatic materials that reflect, absorb or re-emit light at multiple frequencies, depending on their specific orientation can be used. By controlling the amplitude and frequency of the magnetic field applied, these particles can be orientated in a number of different ways, each representing a unique spectral signature. This material is capable of generating greater information density and can be used for color printing of an object if the magneto chromatic materials are used in sufficient quantities to generate wavelengths in the visible spectrum.

The devices and systems described herein have the unique capability of allowing direct coding of the embedded particles in the exposure zone 118 from the perimeter to the center of the build area by providing a suitable magnetic field to orient the magnetic field-sensitive particles added to the build material 1704. This allows orientation of the particles fed onto or into the exposure zone to be controlled, providing the ability to change the orientation of these particles throughout an entire 3D printed object and/or in multiple objects being printed simultaneously. This process can also be carried out during the build process without creating additional steps or delays between construction of layers.

The magnetic field can also be created, varied and controlled throughout the build area as well as during various stages of the build material 1704 solidification process in a number of ways. However, a preferred embodiment includes using an array of discrete and independently controllable electrical coils forming magnetic write heads 1706 positioned in a linear or staggered array adjacent to one or more exposure areas 118, in close proximity to the build material 1704 as it solidifies.

The array of magnetic write heads 1706 (electrical coils) allows localized control of the magnetic field throughout the print area so that the alignment of the magnetic field responsive materials (the magnetic particles 1702) at multiple positions within the build area can be controlled to encode unique information into individual 3D structures during production or at specific selected locations within the 3D structures while not encoding information where it is not desired.

The magnetic field can also be induced by a magnetic write head 1706 configured to travel back and forth along an exposure zone using a linear actuator. The magnetic write head 1706 or linear array of coils can also rotate around the build area and be controlled to generate magnetic fields at specific radial positions as it rotates adjacent to the construction material 1704. This allow greater control over where the magnetic field is applied as well as at various times during the construction process.

Figure 30A:
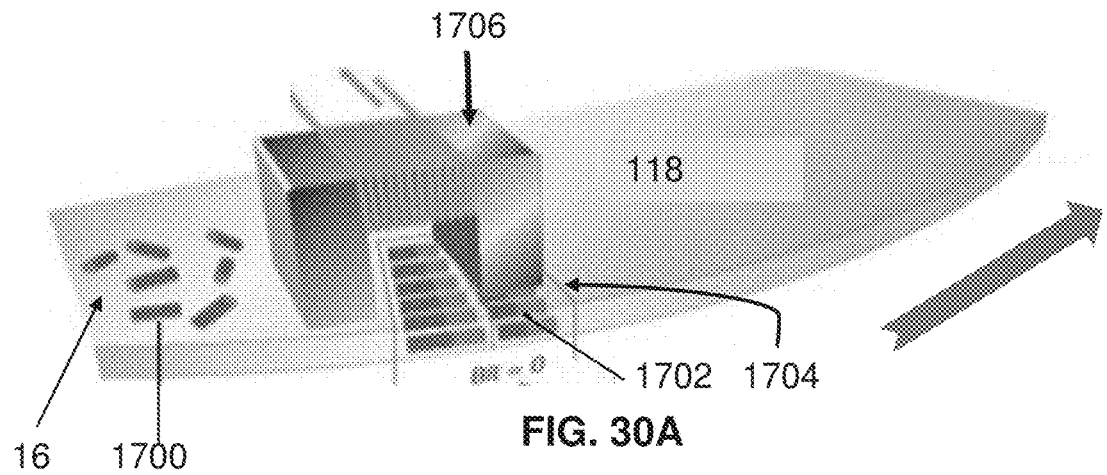
FIGS. 30A-30C are schematic diagrams illustrating three stages of dispensing and aligning magnetic encoding particles.
Figure 30B:
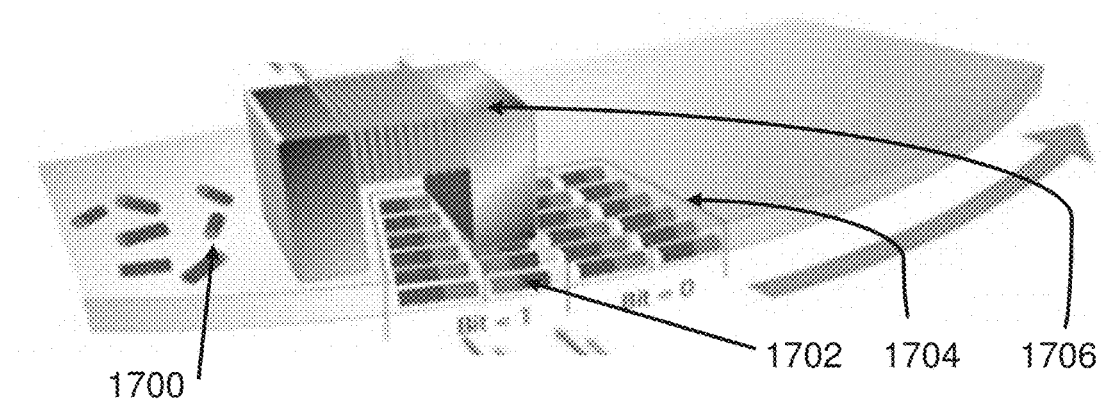
Figure 30C:
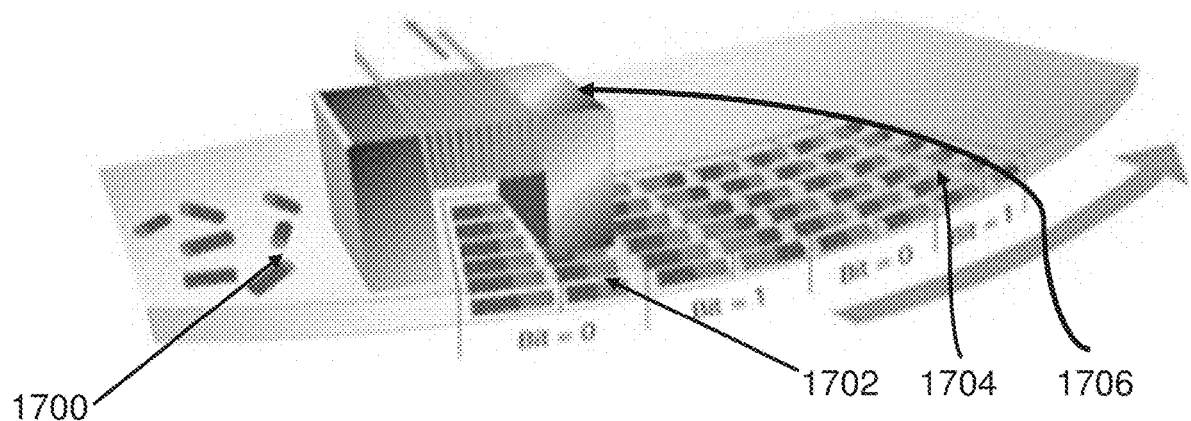

FIGS. 30A, 30B and 30C illustrate an example of the positioning and activation of a magnetic write head 1706 (a magnetic induction device). FIG. 30A illustrates a first step in orienting magnetic particles 1702, FIG. 30B illustrates a second step in orienting the magnetic particles 1702 and FIG. 30C illustrates a third step in orienting magnetic particles 1702 during the construction of an encoded 3D structure. The arrow represents the direction of rotation of the build platform 16,18 To the left of the magnetic write head 1706 in FIG. 30A are several unoriented magnetic particles 1700; under the magnetic write head 1706 are two rows of oriented magnetic particles 1704. To the left of the magnetic write head 1706 in FIG. 30B are several unoriented magnetic particles 1700; under the magnetic write head 1706 are two rows of oriented magnetic particles 1704 and to the right of the magnetic write head 1706 are the previously oriented magnetic particles 1704. To the left of the magnetic write head 1706 in FIG. 30C are several unoriented magnetic particles 1700; under the magnetic write head 1706 are two rows of oriented magnetic particles 1704 and to the right of the magnetic write head 1706 are multiple rows of previously oriented magnetic particles 1704.

Figure 31:
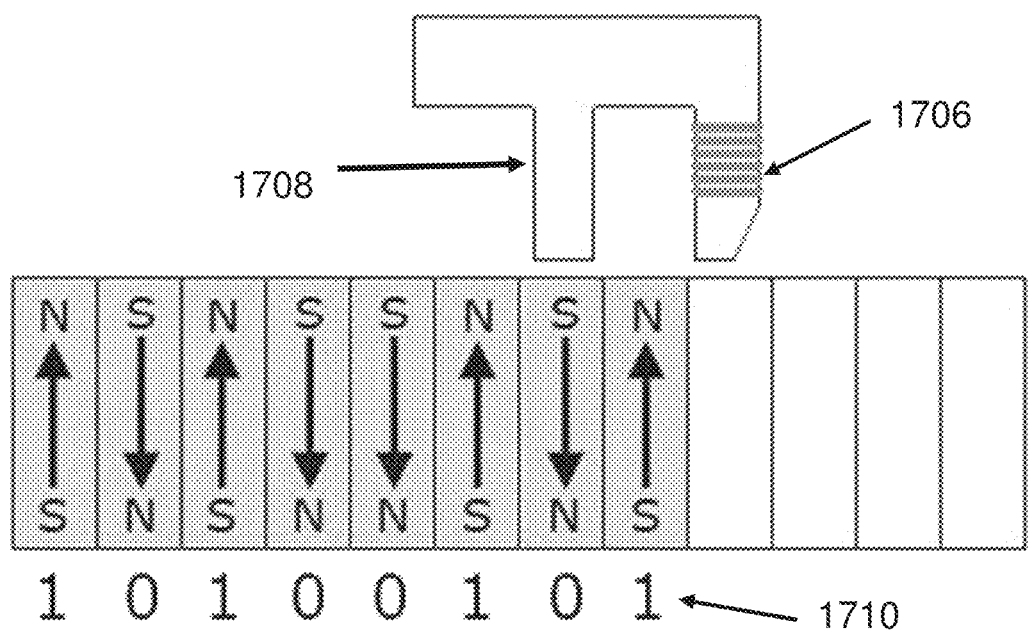
FIG. 31 is an enlarged schematic diagram illustrating one example of alignment of magnetic particles using an electromagnet to simulate the generation of a bar code.

FIG. 31 is a schematic diagram illustrating an enlarged view of an electromagnet write head 1706 in combination with an electromagnetic read head 1708 and orientated of magnetic particles 1702 following encoding to provide a readable embedded code 1710.

Figure 32:
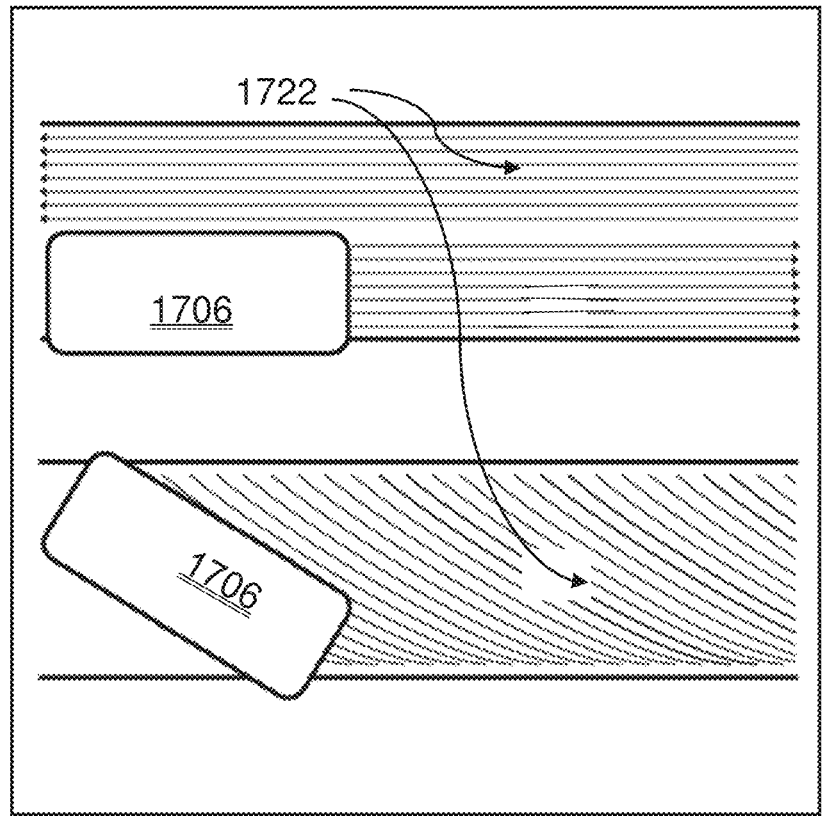
FIG. 32 is a schematic drawing illustrating the positioning a of a material dispensing head (a writing head) in a linear product forming mode versus formation of a 3D object in helical formation mode.

FIG. 32 illustrates a schematic representation of an encoded data track 1712 within a linear placement (upper image) and an encoded data track 1712 in a rotating (helical) build arrangement (lower image).

FIGS. 33A and 33B is a representation of a solidified 3D structure 780 with data tracks 1712 embedded therein.

FIG. 34 shows an alternative embodiment where the magnetic write head 1706 and the read head 1708 are separate structures.

As an alternative to magnetic alignment of the embedded particles Ultrasonic energy can be applied to the 3D object during formation, the harmonics and frequency of the ultrasonic energy causing alignment and orientation of the particles.

Other techniques for embedding detectable product codes addressed herein below utilize one or more particles which emit a readable spectrum. These particles can also be combined with the magnetically readable particles 1700 and these embedded materials can be detected and using controllable spectral imaging in combination with reading the magnetic signature.

The systems and devices disclosed herein provide and/or can be readily adapted to include the capability to generate and direct these magnetic fields and various frequency wavelengths throughout the print area during printing as long as the wavelengths selected do not interfere with the curing or sintering methods being applied Other benefits of controlling the orientation of embedded particles include improved strength by the inclusion of particles orientated in specific directions so as to act similarly to continuous fibers embedded in 3D object to provide structural strength.

Another method of embedding encoded information is to add to the build material 1704 or feed into the 3D structure during fabrication a small, controlled quantity, usually less than 1% by weight, of a material or combination of materials that have a specific photonic absorption, for example, but not limited to, the IR range between 4000 to 5600 nm. There are very few naturally occurring materials, which can be used as a build material 1704, that absorb in this specific wavelength range making it easy to identify if a build material 1704 has an additive which absorbs in this range. It is also possible to detect this absorbance even if a part is later painted or coated.

The following materials contain specific functional groups that can be attach to molecules, such as monomers or other additives, that create a readable spectral absorbance: Carbon dioxide, isocyanate, nitrile, alkyne, thiocyanate, azide, ketene, carbodiimide, alkyne, isothiocyanate, allene, ketenimine. Preferred materials would be thiocyanate and isothiocyanate functionalities. (See Table 1)

TABLE 1

SPECTRALLY ACTIVE MATERIALS
$2400 + 2000\ cm^{-1}$

| | | | | | |
|---|---|---|---|---|---|
| 2349 | strong | | O=C=O | stretching | carbon dioxide |
| 2275-2250 | strong | broad | N=C=O | stretching | isocyanate |
| 2260-2222 | weak | | C≡N | stretching | nitrile |
| 2260-2190 | weak | | C≡C | stretching | alkyne | disubstituted |
| 2175-2140 | strong | | S—C≡N | stretching | thiocyanate |
| 2160-2120 | strong | | N=N=N | stretching | azide |
| 2150 | | | C=C=O | stretching | ketane |
| 2145-2120 | strong | | N=C=N | stretching | carbodiimide |
| 2140-2100 | weak | | C≡C | stretching | alkyne | monosubstituted |
| 2140-1990 | strong | | N=C=S | stretching | isothiocyanate |
| 2000-1900 | medium | | C=C=C | stretching | allene |
| 2000 | | | C=C=N | stretching | ketenimine |

A preferred method is to add to the construction material 1704 additives that absorb and reflect and/or re-emit light at known peaks and amplitudes in the electromagnetic spectrum. It is further preferred to use multiple materials in various combinations and ratios to create a large registry of potential unique spectra with identifiable peaks and amplitudes.

In particular, it is preferred to use at least one combination of materials that have overlapping, or closely approximate absorbances peaks and where one of the materials fluoresces at a different wavelength. In such a system the peak amplitude in absorbance can be controlled by mixing ratios of the two or more materials to obtain a very specific peak amplitude in the range of florescence or re-emittance of light.

Alternatively, two or more materials that fluoresce or re-emit light at different wavelengths can be combined to create a composition with a unique spectra.

Examples of such materials and combinations include, but are not limited to the following combinations be:

Combination #1

3,3'-Diethylthiatricarbocyanine iodide; class Cyanine Dyes; Cass 3071-70-3; with an absorbance at 763 nm with no emission and H$_2$Pc(OBu); class Phthalocyanines; Cas 116453-73-7; with an absorbance at 763 nm and an emission at 780 nm.

Combination #2

H$_2$Pc, class Phthalocyanines; Cas 574-93-6; with an absorbance at 698.5 nm with no Emission and H$_2$Pc(tBu); class Phthalocyanines; Cas 35984-93-1; with an absorbance at 699 nm and an emission at 703 nm.

It is preferred that the additives selected for encoding do not strongly absorb in the same spectral ranges as specific additive employed to induce or control solidification of a build material 1704 or other wavelengths used in other stages of the printing process or the monitoring of the printing process.

An example of such wavelengths that could interfere with an additive manufacturing process would be those associated with free radical polymerization such as those employed to interact with photoinitiators and/or other photochemical elements, usually between the wavelengths of 360-500 nm. Another example would the same frequency regions employed by up-phase phosphors that absorb in the NIR or IR ranges which can in turn generate an excited wavelength at a higher wavelength such as 280-490 nm, which could also induce free radical polymerization.

Additives are preferably selected that do not greatly change the appearance or color of the constructed 3D object under normal visible light and illumination conditions, or, alternatively, use the additives in sufficiently small quantities so as to not greatly change the visible color of the produced object. Another alternative is to use an additive that when excited with a wavelength of light, such as 365 nm or further from the visible spectrum, re-emits light or fluoresce in the visible spectrum to provide an easily identify means to detect and record the encoding with the human eye and/or widely available cameras. This would not greatly affect the perceived color of an object produced with those materials under normal lighting conditions. Materials that absorb in the NIR and IR spectrum are ideal candidates as they do not greatly change the color in the visible spectrum of the printed objects and would absorb outside of most photo-initiating wavelengths.

Ideal materials to use are photo, thermally and chemically stable over time, or those having spectral characteristics that shift in a known and predictable manner and which then can be calibrated. Examples of some materials include: $H_2Nc$ (OnBu), Class Phthalocyanines, Cas 105528-25-4; 1,1'-Diethyl-4,4'-dicarbocyanine iodide, Class Cyanine Dyes, Cas 18300-31-7; Indocyanine Green, Class Cyanine Dyes, Cas 3599-32-4; $H_2Nc(tBu)$, Class Phthalocyanines, Cas 58687-99-3; Bacteriochlorophyll a, class Chlorins/dBacteriochlorins, Cas 17499-98-8; manufactures and suppliers of these dyes include: Biotium, Licor, Lumiprobe, TCI chemicals, HWsands.

Multiple methods and materials can also be used in combinations to enhance security and increase information density that can be encoded at various times prior to, during and after the production of a part is completed. Some construction materials 1704 and methods that can be used to encode information into 3D printed parts include but are not limited to liquids, powders, or solid forms of photopolymers, thermoplastics, metals, ceramics and composite materials. Many of the described materials and methods can be made to work with photopolymerization, chemical bonding, extrusion, thermal or pressure fusion, sintering, or a combination of these.

The scope of the invention is not limited to the specific materials cited above which are only examples of materials that exhibit the qualities needed for the operation and function of the encoding methods.

While it is preferred to use additive for encoding that are photo, thermal, and chemically stable over time, the use of materials which are known to have a well-defined detectable spectrum provide an added capable to determine when a product is manufactured.

Listed in Table 2 below are several IR and NIR absorbing dyes that can be employed.

TABLE 2

IR AND NIR ABSORBING DYES

Aromatic Hydrocarbons
Oligophenylenes
Polycyclic Aromatic Hydrocarbons
Polyenes/Polyynes
Heterocycles
Biomolecules
Quinones
Coumarins
Acridines
Azo Dyes
Cyanine Dyes
Arylmethane Dyes
Perylenes
Xanthenes
Miscellaneous Dyes
Dipyrrins
Porphyrins
Oligopyrroles
Phthalocyanines
Chlorins/Bacteriochlorins

| ID | Compound | Class | Absorption | Emission |
| --- | --- | --- | --- | --- |
| S08 | H2Nc(OnBu) | Phthalocyanines | 865 | NA |
| K08 | 1,1'-Diethyl-4,4'-dicarbocyanine iodide | Cyanine Dyes | 818 | 834 |
| K13 | Indocyanine Green | Cyanine Dyes | 789 | 817 |
| S09 | H2Nc(tBu) | Phthalocyanines | 784.37 | NA |
| T16 | Bacteriochlorophyll a | Chlorins/Bacteriochlorins | 780.2 | NA |
| K16 | 3,3'-Diethyl-thiatricarbocyanine iodide | Cyanine Dyes | 763.25 | NA |
| S05 | H2Pc(OnBu) | Phthalocyanines | 763 | 780 |
| K12 | 1,1'-Diethyl-3,3,3',3'-tetramethyl-indotricarbocyanine Iodide | Cyanine Dyes | 742.25 | NA |
| K03 | 1,1'-Diethyl-2,2'-dicarbocyanine Iodide | Cyanine Dyes | 711 | 735 |
| K05 | 1,1'-Diethyl-4,4'-carbocyanine Iodide | Cyanine Dyes | 709.5 | NA |
| S06 | H2Pc(tBu) | Phthalocyanines | 699 | 703 |
| S01 | H2Pc | Phthalocyanines | 698.5 | NA |

A further preferred embodiment is to prepare specific combinations of compounds used for encoding such that a particular combination has a specific readable spectrum, and each different specific combination has a different readable spectrum. Selected specific combinations can then be encapsulated in microcapsules, also referred to as microballoons, and the selected micro capsules or microballoons can be added to the build material 1704 or to the 3D structure at selected intervals or locations during the build process. Adding the microcapsules provides a very specific readable spectra and adding various different microcapsules to the build material 1704 and or 3D structure during construction provides the ability to manufacture parts with each part emitting a unique fingerprint traceable to the time and manufacture of the labelled part. The use of these microcapsules (or microballoons) makes it easier to establish consistent ratios of materials for application of spectrometric methods so that specific spectra and amplitudes can be preserved, eliminating or reducing the necessity for very carefully measuring of specific quantities of materials and thoroughly mix them into a large volume of construction material 1704.

Even if the micro encapsulations are not thoroughly mixed into the build material 1704 it is still possible to identify the intended spectra from the constructed object if at least some encapsulated microballoons are incorporated in the compositions. Various methods are known for forming emulsions or microencapsulation's, or swelling and infusing various materials into preformed microballoons, microspheres, or microcapsules, are well known in the art and are suitable for use as described herein. See U.S. Pat. No. 8,883,864 "Polymer Nanostructured Material For The Recording Of Biometric Features" Hung H. Pham, a Ilya Gourevich, a James E. N. Jonkmanb and Eugenia Kumacheva, US Published Application 20040068019 and Han, M., Gao, X., Su, J. et al. "Quantum-dot-tagged microbeads for multiplexed optical coding of biomolecules. *Nat Biotechno,* 19, pp 631-635 (2001), all incorporated herein by reference.

Preferred methods utilize preformed micro-capsules, microballoons or microspheres from 100 nm to 25 μm in diameter. A desired combination of the additives is added to a solvent suitable for swelling the microcapsules, microballoons or microspheres, such as, but not limited to benzyl alcohol and ethyl acetate, and the microcapsules, microballoons or microspheres are then added into the additive containing solvent, and the mixture formed is allowed to stand until the microcapsules, microballoons or microspheres swell and a suitable quantity so of the additives diffuse into the microspheres. The microcapsules, microballoons or microspheres and then removed from the solvent and the microcapsules, microballoons or microspheres are allowed to dry, trapping the additives within.

In a further method described in Hung ("Polymer Nanostructured Material For The Recording Of Biometric Features" Hung H. Pham, a Ilya Gourevich, a James E. N. Jonkmanb and Eugenia Kumacheva) (incorporate herein by reference) microspheres (microbeads) by preparing layers of acrylic and dyes. The dyes are chosen so that the absorbance peaks of each dye layer do not overlap resulting in them all being transparent to each other and making the combination of absorbance peaks readable with a spectrometry system.

FIG. 35A-35C illustrates an example of the formation of a nano structure (a microsphere 1726) with layers of three different dyes. FIG. 35A shows the absorption and fluorescence spectra of three selected dyes, namely 9-anthryl methacrylate (An), nitrobenzo-2-oxa-1,3-diazole-methacrylate (NBD) and Nile Blue. With reference to Hung et al. an An labeled core 1716 is first formed. That core is suspended in deionized water and then enclosed in an NBD shell 1718. A microsphere 1720 comprising the An and NBD is then enclosed, in the same manner, in a shell comprising the Nile Blue dye 1722 to form a 3-dye microsphere 1724 which can be further encapsulated to form the final microsphere 1726. That microsphere 1726 can then be added to the build material 1704. This is an example of a suitable microsphere used for encoding a 3D structure. Based on the teachings herein that microsphere can be formed using combinations of multiple different materials have the desired readable spectra.

Figure 36:
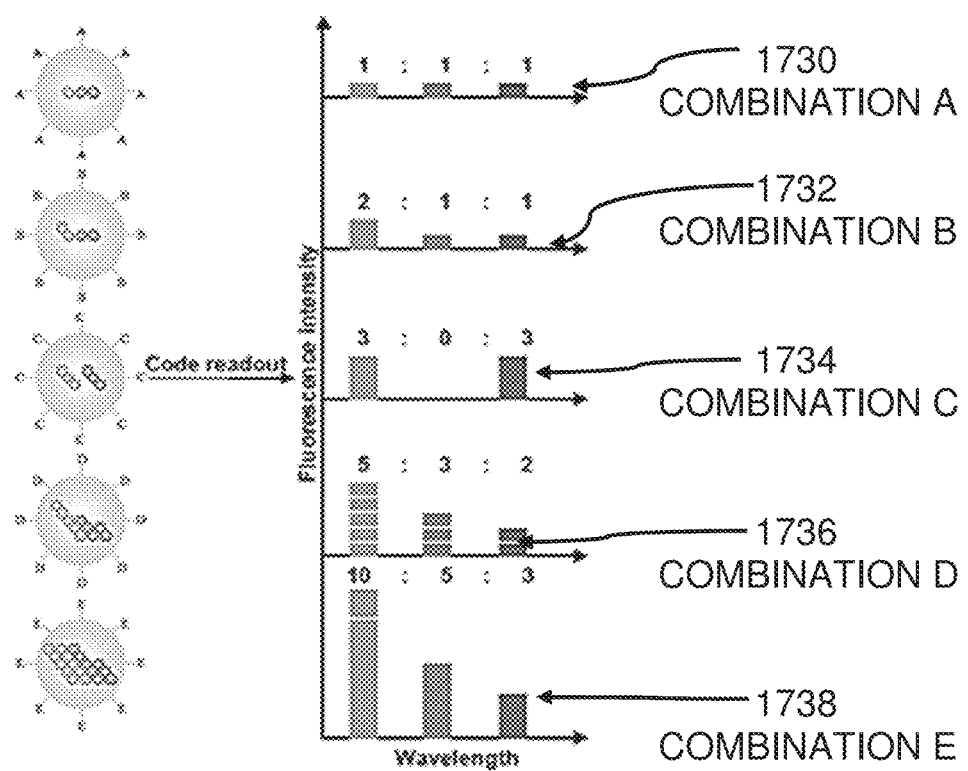
FIG. 36 illustrates five different combinations of 3 different dyes to encode a 3D object with five different readable signatures.

FIG. 36 illustrates 5 different combinations (Combinations A-E) 1730, 1732, 1734, 1736, 1738 comprising combinations of 3 different dyes (dye1 1740, dye2 1742 and dye 3 1744) each of which has a different spectrum and each combination displays a spectrum different from that of the individual dyes. Combination A 1730 comprises equal amounts of the three dyes, Combination B 1732 has twice the amount of dye1, combination C 1734 has equal amounts of only dye1 and dye3, Combination D 1736 comprise a 5:3:2 ratio of the three dyes and Combination E 1738 comprises a 10:5:3 ratio of the three dyes. As a result, each Combination will exhibit a different spectrum. Based on the teachings herein one skilled in the art will recognize that numerous combinations, and therefore numerous different spectra can be created and one or more of those combinations embedded in a 3D structure will generate a unique fingerprint which characterizes the history of the manufacture of that specific 3D structure.

It is also preferred that the spectra of selected materials be easily read with portable hand held scanners. Such scanners for example, can be NIR reflectance spectrometers, Raman spectrometers for use with raman active compounds or an FTIR spectrometer, preferably a portable handheld diffuse reflectance spectroscopy system. The dyes can be selected so that a spectra can be created that does not greatly affect the perceived color of the printed object but can still generate a unique visible spectrum that could be read, for example using a conventional cellphone camera with a flash.

Using these techniques an active tagging system can be employed that creates a unique identification pattern in 3D produced parts during a print cycle. The coding composition can be applied to multiple parts in the preparation of multiple duplicate parts (referred to as a "batch"). The ability to encode parts with information regarding print level data such as what machine was used, the build materials 1704 used, when and where a batch of parts t was made, etc. has many benefits in creating traceable parts. This is important for consistency as well as security and certifiability. This also provides the ability to encode different signatures into various parts in the same print cycle.

Figure 28:
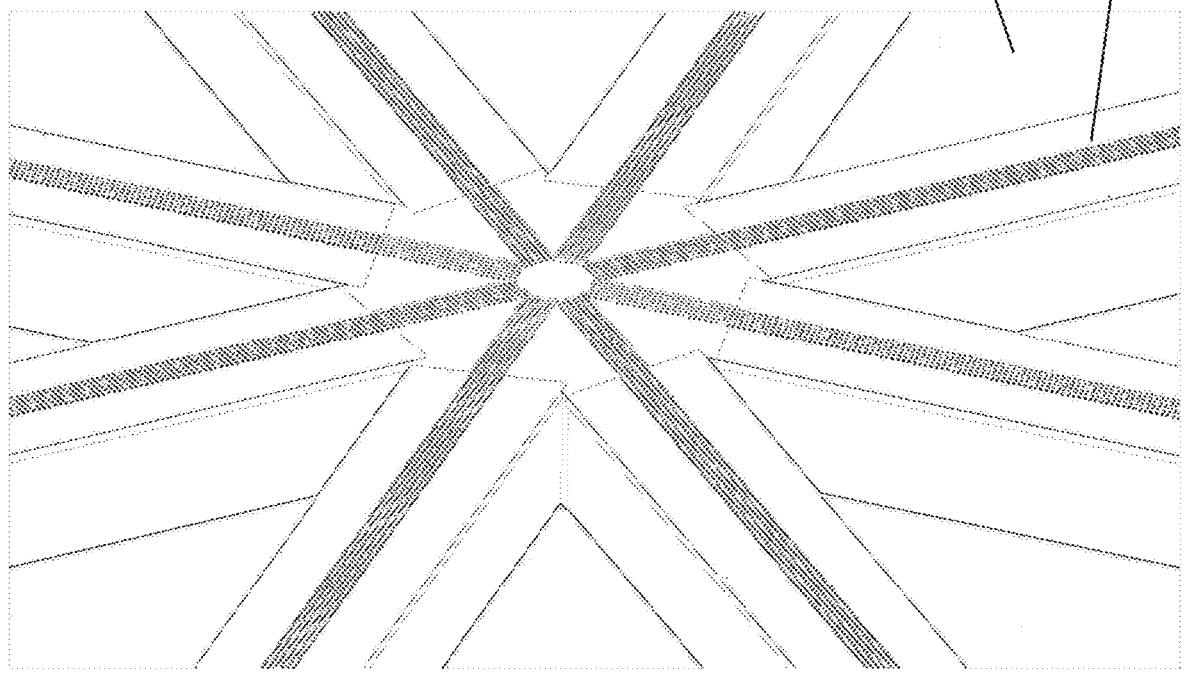
FIG. 28 shows a top, front, perspective view a variant embodiment of a VCSEL-based light source incorporating features of the present invention.

FIGS. 27 and 28, and the description thereof above provide an alternative means to feed viscous build material 1704 to the build and curing portion of a 3D printing system. Such an arrangement can also be used for the delivery and curing of higher viscosity build materials 1704 or simultaneously or substantially simultaneously delivering multiple different build materials 1704 or providing build materials 1704 containing, for example, different coloring agents, additives, or particles, such as metal, magnetic, or x-ray detectable particles, so that the resultant 3D object comprises a combination of materials including different encoding agents or inclusions for monitoring or identification purposes.

With reference to FIGS. 30A, 30B, 30C, 31, 32, 33A, 33B, and 34 the use of various encoding materials as described herein, that exhibits some change under an alternating or changing magnetic field is taught. A magnetic field applied during the construction of an object and the orientation of the magnetically aligned additives added to the build material 1704 are locked in place during the solidification process. The change in magnetic field applied in various ways during a print cycle renders a magnetic or other detectable change in the encoding material in a constructed object as it is produced. For example, in a ferrous or magnetic material the poles of a magnetic field could be flipped at a known interval creating a magnetic barcode (see FIG. 31, 34) that can be read with a magnetic sensitive scan device or probe applied across the surface of a constructed object.

Other examples incorporate a magneto-chromatic material into the 3D structure, said magneto-chromatic material changing color in response to a changing magnetic field. This approach also provides a full color object with writing system controlling the magnetic field. As pointed out, magnetic orientation can also be used to align nanoparticles in a specific orientation to enhance the mechanical/structural attributes of a constructed part. Embedded materials in the constructed object can also be altered by the introduction of a magnetic field after a part is constructed. In such an instance, using a flexible build material 1704 the shape of the final product can be changed by application of the magnetic field.

The addition of metal additives or magnetic or ferrous materials in sufficient concentrations also renders the constructed object detectable using metal detectors. This helps prevent the creation of undetectable weapons. In a similar manner, the ceramic knife industry has added sufficient metal additives to render ceramic knives visible to metal detectors. Additionally, an organic molecule containing iodine added to a build material 1704 would provide 3D printed objects detectable using X-rays. This would further enhance the safety and security feature of preventing individuals from creating undetectable weapons.

The list of other additives, some of which are addressed above, that can be employed in a construction material 1704 to render a 3D printed part traceable or identifiable include, include, but are not limited to one or more phosphors, Quantum dots, pigments, dyes, organic molecules bonded with iodine, lanthanide coordination polymers which use different lanthanide metals in various combinations and ratios of each to create unique absorption spectra.

Thermal coding can also be used by building the 3D object using controlled concentrations of materials with different melting points. As the ratios of materials are known, the final fabricated product can then be identified by using a differential scanning calorimeter (DSC) which detects the transitions due to temperature changes such as phase change or melting points of the constituent materials and energy is released as these transitions occur.

Other detection means are the use of isotopic tagging with different ratios of stable isotopes, using mass spectrometry to detect the presence of different metal ions, using molecular inks such as used for DNA tagging, encrypted microparticles such as used in explosives, and color changing dyes.

Examples of suitable color changing dyes include
Fluorescing materials
Sharp fluorescence, strong absorption below band gap ZnO, $TiO_2$, CdS, ZnS, Ag, Au, etc.
Multiplexed QDs "Quantum-Dot-Tagged Microbeads For Multiplexed Optical Coding Of Biomolecules", Mingyong Han, Xiaohu Gao, Jack Z. Su & Shuming Nie *Nature Biotechnology* volume 19, pages 631-635 (2001) https://www.nature.com/articles/nbt0701_631
Phosphors
Upconverting
$NaYF_4$, $NaGdF_4$, $LiYF_4$, etc. doped with lanthanides (https://en.wikipedia.org/wiki/Phosphor#Standard_phosphor_types1 (incorporated herein by reference
ZnS:Cu
$SrAl_2O_4$:Eu (III):Dy (III)
(Ca,Sr)S:Bi
$Y_2O_2S:Eu^{3+}$
$YVO_4:Eu^{3+}$
Simultaneous up and down conversion phosphors (Yanlan Liu, Kelong Ai and Lehui Lu, "Designing lanthanide doped nanocrystals with both up- and down-conversion luminescence for anti-counterfeiting" *Nanoscale* (2011) 3, pp 4804-4810)
Added thermal sensitivity—(Anna M. Kaczmarek Ying-Ya Liu Chunhua Wang Brecht Laforce Laszlo Vincze Pascal Van Der Voort Kristof Van Hecke Rik Van Deu "Lanthanide "Chameleon" Multistage Anti-Counterfeit Materials", Advanced Functional Materials, Volume 27, Issue 20 (May 25, 2017)
phosphorescence, upconversion, Kai Jiang, Dr. Ling Zhang, Junfeng Lu, Prof. Chunxiang Xu, Prof. Congzhong Cai, Prof. Hengwei Lin, "Triple-Mode Emission of Carbon Dots: Applications for Advanced Anti-Counterfeiting" 2 May 2016 Volume 55, Issue 25, Pages: 7009-7264 (Jun. 13, 2016),
Two photon absorbance (CdSe)
Dyes
Fluorescein
Rhodamine
Responsive (Leuco dyes)
Photochromic
Spiropyran, spirooxazine
Diarylethenes
Azobenzenes
HABI
Chemical
Vat dyes (anthroquinone derivatives, indigo)
pH
pH indicators
Crystal violet lactone
Thermal
Microcapsules with leuco dyes dissolved in solvent
Microcapsules with liquid crystals
Magnetic
Nanobrick
Mechanochromic
Static Dyes
Organic compounds
Azo dyes
Anthraquinone dyes
High conjugation
Metal complexes
Lanthanide ion complexes Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in any claims.

We claim:

1. A method of producing an encoded three-dimensional object produced in an additive manufacturing procedure wherein said three-dimensional object is formed by dispensing a build material into a construction area having an exposure zone on a platform or a build plate, the method comprising the steps of:

selecting one or more encoding materials selected from the group consisting of magnetic particles, spectral materials having tunable spectral properties, and a combination of both magnetic particles and spectral particles, the one or more encoding materials having a measurable characteristic, said characteristic being measurable after solidification of the three-dimensional object, comprising:

a. adding the one or more encoding materials to the build material before constructing the three-dimensional object,
b. adding the one or more encoding materials to the build material during or after dispensing the build material, or
c. adding the one or more encoding materials to the build material before constructing the three-dimensional object and adding additional one or more encoding materials to the build material during or after dispensing the one or more encoding materials to the build material, and
d. optionally adding the one or more encoding materials to selected portions of the three-dimensional object after the three-dimensional object is formed, dispensing the build material, the encoding material, or both in a controlled flowable state from one or more material dispensers to the exposure zone, the one or more material dispensers being selected from the group consisting of a stationary material dispenser, a moveable material dispenser and a rotating material dispenser; and delivering a solidifying media to the build material in or on the exposure zone thereby solidifying said build material;

wherein at least one of the one or more encoding materials is the spectral materials such that spectral properties of the spectral materials being added to the build material are modified during or after solidification of a layer of the three-dimensional object through optical stimulation; and wherein the one or more encoding materials provide an identifiable signature unique to the three-dimensional object produced, said identifiable signature providing information to a user.

2. The method of claim 1 wherein the one or more encoding materials further comprise alignable magnetic particles or magnetizable particles.

3. The method of claim 2 wherein the one or more encoding materials are aligned before the build material solidifies or is magnetized after the build material solidifies so as to provide a detectable signature.

4. The method of claim 3 wherein the magnetic particles are oriented or magnetized to produce a magnetic signature on or in the three-dimensional object, the signature detectable using magnetic field sensing.

5. The method of claim 3 wherein the magnetic particles comprise one or more of ferrous materials, paramagnetic metals, iron, iron oxides or other materials that are or can become magnetic, paramagnetic, or superamagnetic.

6. The method of claim 4 wherein the magnetic signature is detected using one or more magnetic sensitive devices or probes comprising devices configured to detect the presence a metal or a magnetic field.

7. The method of claim 5 wherein the paramagnetic material is magnetized and/or the magnetic particles are oriented by an external magnetic field applied by one or more external electrical coils.

8. The method of claim 5 wherein the magnetic particles are dispersed into one or more specified layers of the three-dimensional object, said magnetic particles oriented by the application of an external magnetic field to provide an oriented, detectable magnetic signature.

9. The method of claim 7 wherein the external coils are located adjacent the exposure zone.

10. The method of claim 7 wherein where the external electric coils are mounted on a moveable rotary device configured to provide the magnetic field to an identified portion of the build material during solidification.

11. The method of claim 2 wherein one or more encoding materials are dispensed from moveable dispensers into or onto the build material during solidification thereof, the one or more encoding materials added to the three-dimensional object in a quantity sufficient to be detected for encoding purposes by an external detection system after solidification of the three-dimensional object.

12. The method of claim 1 wherein the one or more encoding materials comprise both the magnetic particles that are responsive to or alignable by exposure to a magnetic field and said spectral materials that exhibit tunable spectral properties; and wherein said spectral materials are attached to the alignable magnetic particles to provide a signature readable optically.

13. The method of claim 12 wherein the tunable spectral properties comprise absorption, reflection, and/or re-emittance of light at defined peaks and intensities in the electromagnetic spectrum, said spectral properties variable based on orientation thereof so as to provide a controllable change in the spectral signature to the three-dimensional object.

14. The method of claim 12 wherein the variable spectral properties are provided by the presence of one or more Quantum dots, phosphors, dyes, crystals, multi-sided Janus particles, Quantum-dot-tagged microbeads, lanthanide metals and coordination polymers, magneto-chromatic materials, metals, or micro-encapsulations containing combinations thereof.

15. The method of claim 12 wherein the one or more spectral materials are combined with the magnetic or paramagnetic material so that the encoding material provides an alterable magnetic signature and an optical signature readable optically and magnetically.

16. The method of claim 12 wherein the spectral properties comprising reflection, absorption and/or re-emission of light characteristics are detectable by light sensing instruments when exposed to a light source.

17. The method of claim 16 wherein the light sensing instruments are selected from the group consisting of spectrometers for sensing ultra-violet, visible, near infrared, infrared, or x-ray fluorescence, UV and Visible spectrometer, IR and FTIR spectrometer, Raman spectroscopy, fluorescence spectroscopy, non-destructive chemical analyzers, NIR reflectance spectrometers, and diffuse reflectance spectrometers.

18. The method of claim 12 wherein one or more encoding materials with unique spectral properties that do not change with orientation are added to selected portions of the three-dimensional object during formation of the three-dimensional object on a rotating build platform or using a rotating dispensing system.

19. A method of producing an encoded three-dimensional object produced in an additive manufacturing procedure wherein said three-dimensional object is formed by dispensing a build material into a construction area having an exposure zone on a platform or a build plate, the method comprising the steps of:

selecting one or more encoding materials, wherein the one or more encoding materials include magnetic particles that are responsive to or alignable by exposure to a magnetic field and spectral materials that exhibit tunable spectral properties; and wherein said spectral materials are attached to the alignable magnetic particles to provide a signature readable optically; the one or more encoding materials having a measurable characteristic, said characteristic being measurable after solidification of the three-dimensional object, comprising:
a. adding the one or more encoding materials to the build material before constructing the three-dimensional object,
b. adding the one or more encoding materials to the build material during or after dispensing the build material, or
c. adding the one or more encoding materials to the build material before constructing the three-dimensional object and adding additional one or more encoding materials to the build material during or after dispensing the one or more encoding materials to the build material, and
d. optionally adding the one or more encoding materials to selected portions of the three-dimensional object after the three-dimensional object is formed,
dispensing the build material, the encoding material, or both in a controlled flowable state from one or more material dispensers to the exposure zone, the one or more material dispensers being selected from the group consisting of a stationary material dispenser, a moveable material dispenser and a rotating material dispenser; and
delivering a solidifying media to the build material in or on the exposure zone thereby solidifying said build material;
wherein the one or more encoding materials provide an identifiable signature unique to the three-dimensional object produced, said identifiable signature providing information to a user; and
wherein the one or more encoding materials include two or more spectral materials, said two or more spectral materials having partially or fully overlapping absorption peaks, said overlapping absorption Peaks defining a predetermined amplitude related to the ratio of quantities of spectral materials in the combination.

20. The method of claim 19 wherein at least one of the one or more spectral materials fluoresce at different wavelengths.

21. A method of producing an encoded three-dimensional object produced in an additive manufacturing procedure wherein said three-dimensional object is formed by dispensing a build material into a construction area having an exposure zone on a platform or a build plate, the method comprising the steps of:
selecting one or more encoding materials, wherein the one or more encoding materials include magnetic particles that are responsive to or alignable by exposure to a magnetic field and spectral materials that exhibit tunable spectral properties; and wherein said spectral materials are attached to the alignable magnetic particles to provide a signature readable optically; the one or more encoding materials having a measurable characteristic, said characteristic being measurable after solidification of the three-dimensional object, comprising:
a. adding the one or more encoding materials to the build material before constructing the three-dimensional object,
b. adding the one or more encoding materials to the build material during or after dispensing the build material, or
c. adding the one or more encoding materials to the build material before constructing the three-dimensional object and adding additional one or more encoding materials to the build material during or after dispensing the one or more encoding materials to the build material, and
d. optionally adding the one or more encoding materials to selected portions of the three-dimensional object after the three-dimensional object is formed,
dispensing the build material, the encoding material, or both in a controlled flowable state from one or more material dispensers to the exposure zone, the one or more material dispensers being selected from the group consisting of a stationary material dispenser, a moveable material dispenser and a rotating material dispenser; and
delivering a solidifying media to the build material in or on the exposure zone thereby solidifying said build material;
wherein the one or more encoding materials provide an identifiable signature unique to the three-dimensional object produced, said identifiable signature providing information to a user; and
wherein at least one of the one or more encoding materials is the spectral materials, which have a defined absorbance in the 4000-5600 nm IR range.

22. The method of claim 12 wherein the spectral properties of the spectral materials added to the build material are modified prior to solidification of the three-dimensional object.

23. A method of producing an encoded three-dimensional object produced in an additive manufacturing procedure wherein said three-dimensional object is formed by dispensing a build material into a construction area having an exposure zone on a platform or a build plate, the method comprising the steps of:
selecting one or more encoding materials, wherein the one or more encoding materials include magnetic particles that are responsive to or alignable by exposure to a magnetic field and spectral materials that exhibit tunable spectral properties; and wherein said spectral materials are attached to the alignable magnetic particles to provide a signature readable optically; the one or more encoding materials having a measurable characteristic, said characteristic being measurable after solidification of the three-dimensional object, comprising:
a. adding the one or more encoding materials to the build material before constructing the three-dimensional object,
b. adding the one or more encoding materials to the build material during or after dispensing the build material, or
c. adding the one or more encoding materials to the build material before constructing the three-dimensional object and adding additional one or more encoding materials to the build material during or after dispensing the one or more encoding materials to the build material, and
d. optionally adding the one or more encoding materials to selected portions of the three-dimensional object after the three-dimensional object is formed,
dispensing the build material, the encoding material, or both in a controlled flowable state from one or more material dispensers to the exposure zone, the one or more material dispensers being selected from the group consisting of a stationary material dispenser, a moveable material dispenser and a rotating material dispenser; and delivering a solidifying media to the build material in or on the exposure zone thereby solidifying said build material;

wherein the one or more encoding materials provide an identifiable signature unique to the three-dimensional object produced, said identifiable signature providing information to a user; and wherein the spectral properties of the spectral materials added to the build material are modified during or after solidification of at least one layer of the three-dimensional object by changing the orientation of the added spectral materials.

24. The method of claim 1 wherein the spectral properties of a spectral material are modified through directed electromagnetic radiation on or into the spectral materials, said electromagnetic radiation inducing a physical or chemical change to the spectral materials that modifies the spectral properties in a predictable manner.

25. A method of producing an encoded three-dimensional object produced in an additive manufacturing procedure wherein said three-dimensional object is formed by dispensing a build material into a construction area having an exposure zone on a platform or a build plate, the method comprising the steps of:

selecting one or more encoding materials, wherein the one or more encoding materials include magnetic particles that are responsive to or alignable by exposure to a magnetic field and spectral materials that exhibit tunable spectral properties; and wherein said spectral materials are attached to the alignable magnetic particles to provide a signature readable optically; the one or more encoding materials having a measurable characteristic, said characteristic being measurable after solidification of the three-dimensional object, comprising:
 a. adding the one or more encoding materials to the build material before constructing the three-dimensional object,
 b. adding the one or more encoding materials to the build material during or after dispensing the build material, or
 c. adding the one or more encoding materials to the build material before constructing the three-dimensional object and adding additional one or more encoding materials to the build material during or after dispensing the one or more encoding materials to the build material, and
 d. optionally adding the one or more encoding materials to selected portions of the three-dimensional object after the three-dimensional object is formed, dispensing the build material, the encoding material, or both in a controlled flowable state from one or more material dispensers to the exposure zone, the one or more material dispensers being selected from the group consisting of a stationary material dispenser, a moveable material dispenser and a rotating material dispenser; and delivering a solidifying media to the build material in or on the exposure zone thereby solidifying said build material;

wherein the one or more encoding materials provide an identifiable signature unique to the three-dimensional object produced, said identifiable signature providing information to a user; and wherein the spectral materials absorb strongly in the near and/or mid IR range and re-emit light in the visible or ultraviolet range.

26. The method of claim 1, further comprising the step of selectively controlling where and when the one or more encoding materials are added to the build material to form the identifiable signature during the formation of the three-dimensional object, wherein the identifiable signature is a two-dimensional structure or three-dimensional structure formed at predetermined location within or on the formed three-dimensional object.

27. The method of claim 2, further comprising the step of selectively controlling where and when the one or more encoding materials are added to the build material to form the identifiable signature during the formation of the three-dimensional object, wherein the identifiable signature is a two-dimensional structure or three-dimensional structure formed at predetermined location within or on the formed three-dimensional object.

28. The method of claim 12, further comprising the step of selectively controlling where and when the one or more encoding materials are added to the build material to form the identifiable signature during the formation of the three-dimensional object, wherein the identifiable signature is a two-dimensional structure or three-dimensional structure formed at predetermined location within or on the formed three-dimensional object.

29. The method of claim 23, further comprising the step of selectively controlling where and when the one or more encoding materials are added to the build material to form the identifiable signature during the formation of the three-dimensional object, wherein the identifiable signature is a two-dimensional structure or three-dimensional structure formed at predetermined location within or on the formed three-dimensional object.

* * * * *